(12) United States Patent
Haifa

(10) Patent No.: US 11,272,246 B2
(45) Date of Patent: Mar. 8, 2022

(54) SYSTEM AND METHOD FOR MANAGEMENT AND DELIVERY OF SECONDARY SYNDICATED COMPANION CONTENT OF DISCOVERED PRIMARY DIGITAL MEDIA PRESENTATIONS

(71) Applicant: Tunevu Inc., Waterloo (CA)

(72) Inventor: John Haifa, Waterloo (CA)

(73) Assignee: TUNEVU INC., Waterloo (CA)

( * ) Notice: Subject to any disclaimer, the term of this patent is extended or adjusted under 35 U.S.C. 154(b) by 0 days.

(21) Appl. No.: 16/978,160

(22) PCT Filed: Apr. 9, 2019

(86) PCT No.: PCT/CA2019/050430
§ 371 (c)(1),
(2) Date: Sep. 3, 2020

(87) PCT Pub. No.: WO2019/195931
PCT Pub. Date: Oct. 17, 2019

(65) Prior Publication Data
US 2021/0044863 A1    Feb. 11, 2021

Related U.S. Application Data

(60) Provisional application No. 62/654,597, filed on Apr. 9, 2018.

(51) Int. Cl.
*H04N 21/44* (2011.01)
*H04N 21/81* (2011.01)
(Continued)

(52) U.S. Cl.
CPC . *H04N 21/44008* (2013.01); *H04N 21/44016* (2013.01); *H04N 21/812* (2013.01);
(Continued)

(58) Field of Classification Search
CPC ....... H04N 21/44008; H04N 21/44016; H04N 21/812; H04N 21/8358; H04N 21/8547;
(Continued)

(56) References Cited

U.S. PATENT DOCUMENTS 8,775,321 B1 * 7/2014 Mooneyham ........... G06F 21/10
705/67
10,250,938 B1 * 4/2019 Jimenez ........... H04N 21/47214
(Continued)

FOREIGN PATENT DOCUMENTS

WO    2012051539 A2    4/2012

OTHER PUBLICATIONS

CIPO AS ISA, International Search Report and Written Opinion for PCT/CA2019/05043, dated Jun. 18, 2019.

*Primary Examiner* — Alexander Gee
(74) *Attorney, Agent, or Firm* — Own Innovation; James W. Hinton

(57) ABSTRACT

A system and method of providing secondary syndicated content on a client device includes detecting external Primary Source Content and Primary Source Content on the client device directly and identifying a Content Identifier and synchronization cue of the Primary Source Content on the client device. The method also includes subscribing to a channel associated with the Primary Source Content on the client device and generating and displaying secondary syndicated content on the client device as a function of the synchronization cue, such that the secondary syndicated content is synchronized to a current temporal segment of the Primary Source Content.

20 Claims, 61 Drawing Sheets

(51) Int. Cl.
  *H04N 21/8358* (2011.01)
  *H04N 21/8547* (2011.01)
  *H04N 21/858* (2011.01)
  *H04H 60/07* (2008.01)
  *H04H 60/40* (2008.01)
  *H04H 60/33* (2008.01)
  *H04H 60/37* (2008.01)

(52) U.S. Cl.
  CPC ....... *H04N 21/8358* (2013.01); *H04N 21/858* (2013.01); *H04N 21/8547* (2013.01)

(58) Field of Classification Search
  CPC ........... H04N 21/858; H04N 21/23418; H04N 21/4307; H04N 21/4331; H04N 21/435; H04N 21/4722; H04N 21/8126
  See application file for complete search history.

(56) References Cited

U.S. PATENT DOCUMENTS

| | | |
|---|---|---|
| 2010/0169910 A1 | 7/2010 | Collins et al. |
| 2010/0305730 A1 | 12/2010 | Glitsch et al. |
| 2011/0103763 A1* | 5/2011 | Tse .................. H04N 21/47815 386/201 |
| 2012/0144416 A1* | 6/2012 | Wetzer ................ H04N 21/812 725/14 |
| 2013/0014151 A1* | 1/2013 | Tallapaneni ....... G06Q 30/0241 725/23 |
| 2018/0034862 A1* | 2/2018 | Friend ................. H04L 65/1063 |
| 2018/0261212 A1* | 9/2018 | Jeong ..................... G10L 25/48 |
| 2018/0343476 A1* | 11/2018 | Loheide ................. H04L 65/60 |

* cited by examiner

530

| Device / Ref # Figure 5A | Handoff ID | Content ID | Device ID | Primary Source |
|---|---|---|---|---|
| 502 | R8N4 | CONTENT ID:1 | DEVICE ID:1 | Yes |
| 504A | R8N4 | CONTENT ID:1 | DEVICE ID:2 | No |
| 504B | R8N4 | CONTENT ID:1 | DEVICE ID:3 | No |
| 504C | R8N4 | CONTENT ID:1 | DEVICE ID:4 | No |

| Device / Ref # Figure 5D | Handoff ID | Sync Channel ID | Device ID | Content ID | Last Temporal Cue | Current Temporal Cue |
|---|---|---|---|---|---|---|
| 602A | R8N4 | SYNC ID: R8N4 | DEVICE ID:1 | CONTENT ID:1 | 10:10:10 | 10:10:15 |
| 602B | R8N4 | SYNC ID: R8N4 | DEVICE ID:2 | CONTENT ID:1 | 10:10:10 | 10:10:15 |
| 602C | R8N4 | SYNC ID: R8N4 | DEVICE ID:3 | CONTENT ID:1 | 10:10:10 | 10:10:15 |
| 602D | R8N4 | SYNC ID: R8N4 | DEVICE ID:4 | CONTENT ID:1 | 10:10:10 | 10:10:15 |

650B

| Device / Ref # Figure 5D | Handoff ID | Sync Channel ID | Device ID | Content ID | Last Temporal Cue | Current Temporal Cue |
|---|---|---|---|---|---|---|
| 602A | R8N4 | SYNC ID: R8N4 | DEVICE ID:1 | CONTENT ID:1 | 10:10:10 | 10:10:15 |
| 602B | R8N4 | SYNC ID: R8N4 | DEVICE ID:2 | CONTENT ID:2 | 11:20:20 | 11:20:25 |
| 602C | R8N4 | SYNC ID: R8N4 | DEVICE ID:3 | CONTENT ID:1 | 10:10:10 | 10:10:15 |
| 602D | R8N4 | SYNC ID: R8N4 | DEVICE ID:4 | CONTENT ID:1 | 10:10:10 | 10:10:15 |

650C

| Device / Ref # Figure 5D | Handoff ID | Sync Channel ID | Device ID | Content ID | Last Temporal Cue | Current Temporal Cue |
|---|---|---|---|---|---|---|
| 602A | R8N4 | SYNC ID: R8N4 | DEVICE ID:1 | CONTENT ID:2 | 11:20:20 | 11:20:25 |
| 602B | R8N4 | SYNC ID: R8N4 | DEVICE ID:2 | CONTENT ID:2 | 11:20:20 | 11:20:25 |
| 602C | R8N4 | SYNC ID: R8N4 | DEVICE ID:3 | CONTENT ID:2 | 11:20:20 | 11:20:25 |
| 602D | R8N4 | SYNC ID: R8N4 | DEVICE ID:4 | CONTENT ID:2 | 11:20:20 | 11:20:25 |

Figure 5F

```
┌─────────────────────────────────────────────────────────────────────────────┐
│ Select a "Show Title" from a table and select "Create New Episode" within the Admin Portal and populate │
│           "Episode Title" and "Episode Description" fields.                  │
└─────────────────────────────────────────────────────────────────────────────┘
                                      ▼
┌─────────────────────────────────────────────────────────────────────────────┐
│ 'Call To Action' items defined within the "Show Title" that the newly created 'Episode' is associated with such │
│  as website, social media links, email, etc., will auto populate within Episode fields. You have the option of │
│ changing or removing those fields for the 'Episode', and as with the 'Show', these elements will be populated │
│    within the 'Details' tab that will presented on the mobile app along with the "Episode Title" and "Episode │
│                     Description" that were defined in the first step..      │
└─────────────────────────────────────────────────────────────────────────────┘
                                      ▼
┌─────────────────────────────────────────────────────────────────────────────┐
│       The "Show Banner" is prepopulated form the associated 'Show' of the 'Episode'.        │
└─────────────────────────────────────────────────────────────────────────────┘
                                      ▼
┌─────────────────────────────────────────────────────────────────────────────┐
│ Meta data that was included as part of the associated 'Show' is inherited to the 'Episode' but can be changed │
│                              or added upon as desired.                      │
└─────────────────────────────────────────────────────────────────────────────┘
                                      ▼
┌─────────────────────────────────────────────────────────────────────────────┐
│ For Podcasts, Online Video Casts, Online Radio Streams, and Audiobooks. The "Add Events" section is used │
│   to specify a URL, or RSS feed (Primary Source Content) that will be used as the unique 'Content Identifier' │
│  (CONTENT-ID) and allow for Automatic Content Recognition (ACR) of the 'Primary Source Content' when the │
│  media is played within the Mobile App. The media is then fetched and played online within the Admin Portal │
│ using the URL or RSS feed to create associated ancillary/secondary events at specific intervals related to the │
│                              media (Primary Source Content).                │
└─────────────────────────────────────────────────────────────────────────────┘
                                      ▼
┌─────────────────────────────────────────────────────────────────────────────┐
│         You can save the 'Episode' and its configuration by clicking on 'Submit'            │
└─────────────────────────────────────────────────────────────────────────────┘
```

Create new Show

Show Information

Show Title
TuneVu The Show

Description
This is an example of the area to include as a description of the Episode titled "TuneVu The Show"

Website Url
tunevu.com

Facebook Url
https://www.facebook.com/tuneview/

Email
info@tunevu.com

Twitter Handle
https://twitter.com/tuneview

Show Banner(Recommended size: 375x350px

Show Thumbnail (Recommended size: 120x120px

Choose File | TuneVu21_9800_CircleOrange.png

Choose File | TuneVu21_9800_CircleWhiteTxt.png

Credits
(+) CREDITS

Genres and Keywords

| Episode's Genres | Target Devices | Keywords |
|---|---|---|
| ☐ All | ☐ All | Enagement ⊗  Interactive ⊗  Radio ⊗  TV ⊗ |
| ☑ Drama | ☐ TV | Audiobooks ⊗  Podcast ⊗  SecondScreen ⊗ |
| ☑ News | ☑ Multimedia Player | |
| ☐ Reality | ☐ Desktop | |
| ☐ Sitcom | ☑ Tablet | |
| ☐ Sports | ☑ Smartphone | |

Target Demographics

| Age | Gender | Ethnicity | Income |
|---|---|---|---|
| ☐ P2+ | ☑ Male | ☑ White | ☐ < $25,000 |
| ☐ P12-17 | ☑ Female | ☑ African American | ☐ $25k - $50k |
| ☑ P18-34 | | ☑ Latin Amercan | ☑ $50k - $75k |
| ☐ P35-55 | | ☑ Asian | ☐ $75,000 + |
| ☐ P55-64 | | | |
| ☐ P65+ | | | |

(✓) SUBMIT

Sidebar:
- Network
- Network Channel
- TuneVu The Show
- Add an Episode
- Advertisers
- Campaigns
- Events Preview

SYSTEM AND METHOD FOR MANAGEMENT AND DELIVERY OF SECONDARY SYNDICATED COMPANION CONTENT OF DISCOVERED PRIMARY DIGITAL MEDIA PRESENTATIONS

TECHNICAL FIELD

The embodiments disclosed herein relates to systems and methods for the management of Secondary Syndicated Content associated to Primary Source Content, and, in particular to systems, devices, and methods for generating and delivering ancillary content to companion devices from discovered primary media content.

INTRODUCTION

Traditional broadcast and/or online media content presented on the internet, podcasts, and audiobooks focus on providing broadcast and digital media (online & offline) content to audiences for viewing and listening in a passive manner. Advances in content delivery, media streaming and communications technology have resulted in an increasing number of devices being globally connected. Furthermore, users are increasingly relying on their portable devices to interact with media content such as movies, television shows, online audio/videos, digital signage, and podcasts. Users can also access websites and social media sites using their portable devices, and can share and comment on the media content that they view. Many of these activities can be tracked and can be used to target advertisements to the users.

With the development of portable electronic devices such as laptop computers, tablets, and smartphones, content providers are searching for systems and methods that provide for the creation and management of secondary syndicated content for purposes of interactivity and engagement on electronic devices allowing those devices to tether back to primary digital media content and messaging that keep audiences engaged and captivated with the primary digital content being presented. For example, a portable device can complement a user's viewing or listening experience of a primary source media by providing complimentary and socially immersive content elements such as trivia, polls, interstials, and information.

Further, interactivity is a proven way for digital media content owners to connect with their existing audiences and to create new ones. It allows for building an ongoing, personalized relationship which boosts loyalty and drives measurable value for broadcast and digital content media. Digital audio and visual media may be associated with a wealth of ancillary information. Additional revenue sources for content providers may also be facilitated; for example, the supplementary syndicated content may provide viewers and listeners with additional information related to the content they are listening or watching to (e.g., trivia, statistics, side notes, images, video clips, reviews, ratings, fan gear, actor and actress biographies, sound tracks online digital resources etc.) and/or may provide interactive opportunities (e.g., participating in social network feeds, voting, purchasing merchandise, etc.). Some may want to have immediate access to more information about whatever images or sounds are playing in the media at a given time, or call a function on the device such as pre-populating a number to call or a calendar item to save on the supplemental device.

Accordingly, there is a need for a system and methods that combine creative and editorial solutions with software that presents secondary syndicated content related to a primary media presentation delivering the right type of interactive experience to achieve engagement objectives. The system and method described here enables audiences to view and/or interact with Secondary Syndicated Content in synchronization with Primary Source Content that is being watched or listened to. In some embodiments, the supplementary syndicated content may be used for audience and interactivity measurement along with user analytics.

Also disclosed is a platform with tools to design, build, test, operate, and delivery of live or prescheduled interactive functionality and supplemental information to personal devices, that enhances the user's viewing and listening experience, allowing for engagement and monetization in a way that can be easily integrated with digital media content and live events.

SUMMARY

Provided is a method for providing secondary syndicated content on a client device, wherein the secondary syndicated content is associated to Primary Source Content, the method comprising: discovering the primary source content on the client device; recognizing a content identifier associated to the primary source content; subscribing to a communication channel associated with the primary source content based on the content identifier; recognizing at least one temporal cue associated with the primary source content, wherein the at least one temporal cue corresponds to a temporal segment of the primary source content; and providing secondary syndicated content to the client device as a function of the temporal cue, such that the secondary syndicated content is synchronized to a temporal segment of the primary source content.

The primary source content may include one of: broadcast media, digital online on-demand media, a podcast, music, an audiobook, digital signage, downloaded offline digital media or online streaming media.

The secondary syndicated content may include one of: prediction forms, polls, statistics, ratings, reviews, news, trivia, social media data, biographies, scheduled events, video clips, audio tracks, product placement, advertisements and interactive ads.

The primary source content may be rendered on the client device.

The primary source content may be rendered by an external device and is discoverable by the client device.

The Primary Source Content may be discovered by an automatic content recognition (ACR) technique.

The content identifier may be one of: a universal resource locator (URL), a uniform resource identifier (URI), an RSS feed, a database reference, a directory reference, an audio watermark or an audio fingerprint identifier.

The temporal cue may be one of: a timecode, a date-time stamp or a time-offset.

The communication channel may be maintained on a communication network through a WebSocket connection.

The communication channel may implement a publish-subscribe messaging pattern.

The secondary syndicated content may be provided via the communication channel.

The secondary syndicated content may be provided in near real-time to the client device upon recognition of the content and/or temporal cue.

The method may further include subscribing to an ancillary response channel.

The method may further include identifying the client device and monitoring real-time user responses and engagement with the secondary syndicated content.

The method may further include subscribing to an ancillary analytics channel.

The method may further include identifying the client device and monitoring real-time user and device analytics.

Provided is a method for providing secondary syndicated content associated to primary content on a client device, the method comprising: receiving pre-scheduled interactive content comprising secondary syndicated content associated to primary source content; storing the interactive content in a database; receiving from a client device a request to subscribe to a communication channel associated with the primary source content being received on the client device, the request specifying a content identifier and temporal cue associated to the Primary Source Content; matching the request to a Secondary Syndicated Content associated with the Primary Source Content; subscribing the client device to the communication channel associated with the Primary Source Content based on the content identifier; retrieving the secondary content from the database; and transmitting the Secondary Syndicated Content to the client device over the communication channel as a function of the identifying the primary source content and temporal cue, such that the Secondary Syndicated Content is synchronized to a current temporal segment of the Primary Source Content being delivered on the client device.

Provided is a device for providing secondary syndicated content associated to Primary Source Content, the device comprising: one or more user interfaces for receiving user inputs and providing outputs to the user; a communication interface for receiving and transmitting data over a communication network; a memory; and a processor operatively coupled to the memory, the one or more user interfaces, and the communication interface, the processor being configured for: discovering primary source content rendered by an external device or from within the device itself; recognizing a content identifier and temporal cue associated to the primary source content; subscribing to a communication channel associated with the content identifier; and displaying secondary syndicated content on the one or more user interfaces as a function of the temporal cue, such that the secondary syndicated content is synchronized to a current temporal segment of the primary source content corresponding to the temporal cue.

The communication channel may be maintained on the communication network through a WebSocket associated with the content identifier of the Primary Source Content.

The communication channel may implement a publish-subscribe messaging pattern.

Provided is a system for synchronous delivery of Secondary Syndicated Content across multiple client devices, the system comprising: a primary device for controlling the delivery of secondary syndicated content, wherein the primary client device is associated with a handoff identifier; at least one secondary client device for receiving secondary syndicated content, wherein each secondary device is associated with the handoff identifier; a server, the server comprising: a database for storing secondary syndicated content; a registry, for storing wherein the registry stores: a content identifier; a device identifier; a handoff identifier; and a sync identifier, wherein the server is configured to connect to the primary and at least one secondary device through a WebSocket connection.

According to a broad aspect, a method for providing secondary syndicated content on a client device is provided herein. The secondary syndicated content is associated to a primary content source. The method involves detecting Primary Source Content externally or directly on the client device and identifying a Content Identifier and synchronization cue of the Primary Source Content. The method also involves subscribing to a communication channel associated with the Primary Source Content on the client device and generating and displaying secondary syndicated content on the client device as a function of the synchronization cue, such that the secondary syndicated content is synchronized to a current temporal segment of the Primary Source Content presentation/play-out.

In some embodiments, the method further involves identifying the client device and monitoring real-time responses and statistics about user activity and engagement with the secondary syndicated content.

In some embodiments, the Primary Source Content is played on an external device

In some embodiments, the Primary Source Content is played on the client device.

In some embodiments, the Primary Source Content includes one of: broadcast media, digital online media, on-demand digital media, podcasts, audiobooks, live events, digital signage, or downloaded offline digital media.

In some embodiments, the Primary Source Content is detected by automatic content recognition (ACR) techniques such as audio watermarking and fingerprinting.

In some embodiment, the secondary syndicated content includes one of: prediction forms, polls, ratings, voting, trivia, social media data, product placement, and interactive ads synchronized with the Primary Source Content.

In some embodiments, the secondary syndicated content is published at times synchronized to time-offsets or current date-time stamps of Primary Source Content referenced by the Content Identifier such as an audio watermark, audio fingerprint.

In some embodiments, the secondary syndicated content is published at times synchronized to timecodes or current date-time stamps received over a public or private network from meta information provided by the media player presenting the Primary Source Content where automatic content recognition and the Content Identifier used may be the universal resource locator (URL), uniform resource identifier (URI), database/directory reference that is being used by the media player playing the Primary Source Content to identify the content it is presenting. In some embodiments, the communication channel is maintained on a communication network through a WebSocket associated with the Content Identifier of the Primary Source Content.

In some embodiments, the secondary syndicated content is generated in real-time and pushed to the device through the communication channel.

According a broad aspect, a device for providing secondary syndicated content associated to Primary Source Content is provided herein. The device includes one or more user interfaces for receiving user inputs and providing outputs to the user, a communication interface for receiving and transmitting data over a communication network, a memory, and a processor operatively coupled to the memory, the one or more user interfaces and the communication interface. The processor is configured for detecting Primary Source Content from an external device or Primary Source Content being presented on the device itself, identifying a Content Identifier and synchronization cue of the Primary Source Content, subscribing to a communication channel associated with the Primary Source Content; and generating and publishing secondary syndicated content on one or more user interfaces as a function of the synchronization cue, such that the secondary syndicated content is synchronized to a current temporal segment of the Primary Source Content presentation.

In some embodiments, the communication channel is maintained on the communication network through a Web-Socket associated with the Content Identifier of the Primary Source Content.

According a broad aspect, a system for providing secondary syndicated content associated to Primary Source Content on a client device or from an external source is provided herein. The system includes a communication network for communicating with a plurality of client devices, a content management and delivery server, a content storage unit, and a processor operatively coupled to content management and delivery server and the content storage unit. The processor is configured for receiving, from a content managing device or application, prescheduled interactive content comprising of secondary syndicated content that enhances a viewer's or listener's experience to Primary Source Content. The process can store the interactive content in the storage unit. The processor is configured for receiving, from a client device over the communication network, a request to subscribe to a communication channel associated with a Primary Source Content being discovered by a client device, the request specifying a Content Identifier and synchronization cue of the Primary Source Content. The processor is configured for matching the request to secondary syndicated content associated with the Primary Source Content. The processor is further configured for subscribing the client device to the communication channel associated with the Primary Source Content based on the Content Identifier. The processor is further configured for retrieving the secondary syndicated content on the content storage unit and transmitting the secondary syndicated content to the client device over the communication channel as a function of the synchronization cue, such that the secondary syndicated content is synchronized to the current temporal segment of the Primary Source Content being delivered to the client device.

In some embodiments, the communication channel is maintained on the communication network through a Web-Socket associated with the Content Identifier of the Primary Source Content being delivered to the client device.

In some embodiments, an event can be triggered a based only on the detection of a 'Content-identifier' and pushed to the device through the communication channel.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 5C is a table of hand off registry, in accordance with an embodiment;

FIG. 5F are tables of hand off registries, in accordance with embodiments;

Figure 16A:
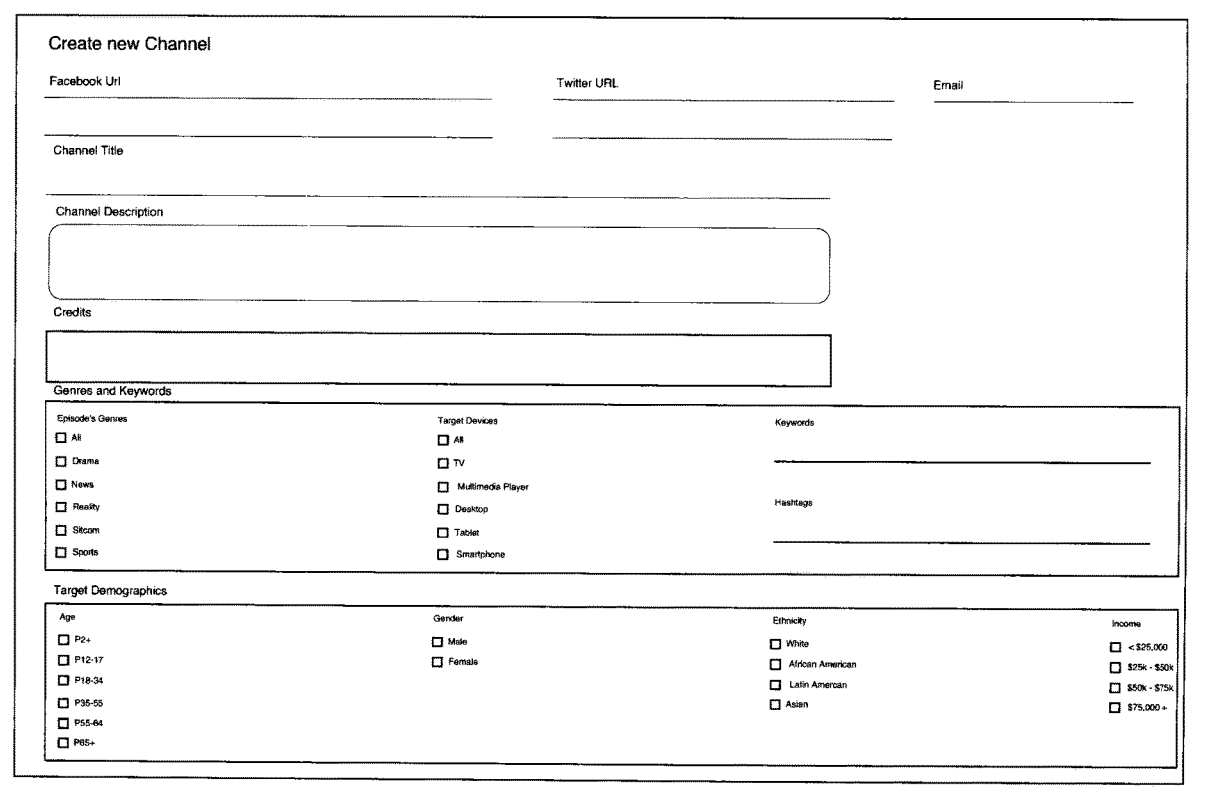

FIG. 16A to 16E are screen shots of a method for generating secondary syndicated content of an episode of primary syndicated content, in accordance with an embodiment.

DETAILED DESCRIPTION

Figure 1:
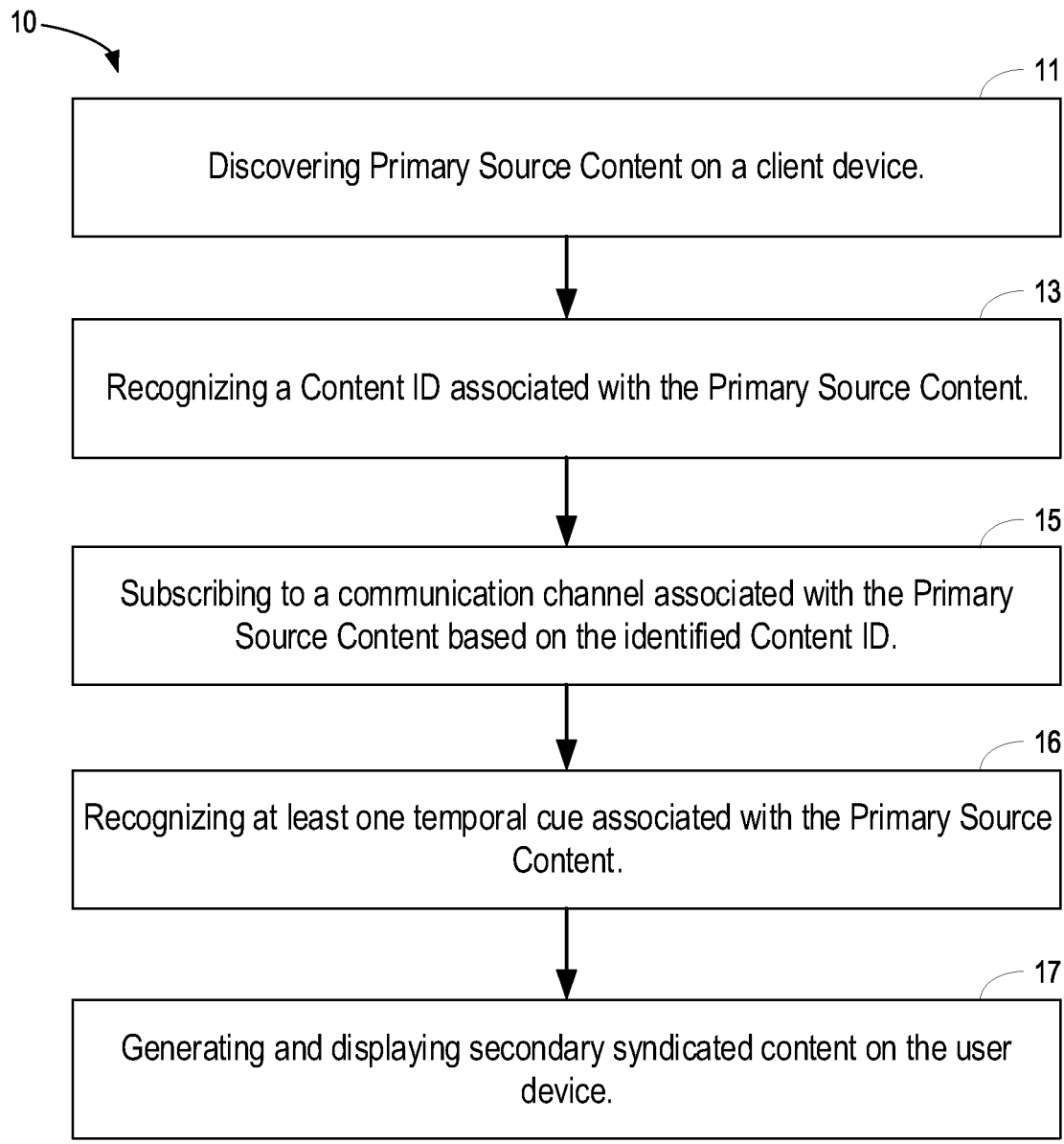
FIG. 1 is a flow chart of a method for providing secondary content on a user device, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural, object oriented, or functional programming and/ or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present subject matter.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

In software architecture, Publish-Subscribe ("Pub-Sub") is a messaging pattern where senders of messages, called publishers, do not program the messages to be sent directly to specific receivers, called subscribers, but instead categorize published messages into classes without knowledge of which subscribers, if any, there may be. In a publish-subscribe model, any message published to a topic/channel is immediately received by all of the subscribers to the topic/channel.

Pub-Sub is a messaging pattern employed within the architecture of this platform to enable event-driven architectures where a group of consumers subscribe to events of a given topic/channel and are notified whenever an event of that topic arrives. When an event is published into a channel (Content, Response, Analytic, Sync—Channels), the channel delivers a copy of the message to each of the output channels. The advantage is the platform can decouple the consumers from the producers. Neither party need knowledge of each other to communicate. The publish-subscribe is a pattern used to communicate messages between primary source media content playout and secondary devices/application without the components knowing anything about each other's identity. Pub-Sub includes other advantages. The producer of the message does not need to know how many subscribers there are to a secondary content channel and how to reach them. On the other hand, subscribers can be easily added and removed form secondary content channels without the need for the producer to change or decouple applications in order to increase performance, reliability and scalability.

In its very simplest definition, Automated Content Recognition ("ACR") technology gives a smart device such as a computer, tablet, smartphone, or smart TV the ability to become 'content-aware' and 'know' what content is being watched or listened to. The device can then deliver complementary content associated with the Primary Source Content being presented. The media viewing or listening experience is automatically enhanced without the need for any manual action to determine how to access the referenced supplementary elements or calls to action. The viewer/listener can then use the device which presents the supplemental content to access other applications and social networking tools (to share their experiences with friends, family and online communities) driving up audience engagement and interactivity.

Using ACR mechanisms described herein also has other benefits that differentiate from audio watermarking/fingerprinting mechanisms that include: 1) not having to continually use resources (memory, processing, microphone, camera) on the client device allowing for greater battery life, and allocation of those resources elsewhere within the client device; and 2) relieve privacy concerns for users of client devices that may arise with the use of ACR mechanisms. An example would be the continual recording from the microphone of the device for Audio Watermarking, and Audio Fingerprinting detection of content. Once the microphone on the client device has identified the primary media content there is no longer a requirement to continually record for the purpose of content identification.

System and methods are disclosed herein for providing for display, an activity feed that represents a timeline of Secondary Syndicated Content that is published in relation to the Primary Source Content being rendered within a client device itself or augmented from Primary Source Content being played on an external device. It is noted that as described herein, a client device displaying the Secondary Syndicated Content could itself be the source of playout for the Primary Source Content or in other embodiments it may include an additional electronic device or online media stream to play content that augments ancillary/supplementary content played on a primary (or external) device/feed.

The systems described herein provide management tools that allows for the introduction of interactive and visual elements to complement the viewing or listening experience that primary source content owners, and media producers can use to connect devices to Secondary Syndicated Content at extremely high volumes with Primary Source Content for broadcast media television, radio, sporting events, news, online streamed or on-demand media audio/video content, digital signage, podcasts and audiobooks that appear as users move through each piece of content show/episode, or ingest live content. It provides the infrastructure, analytics and live content management for high volume digital products that can't afford to fail allowing for setup of events on an easy to use timeline for automated or manual control of pre-show as well as live creation, editing and triggering all events to be published to subscribed users to the online ancillary content channel along with real time statistics and reports that scales to any capacity.

Herein, references will be made to "Primary Source Content". Primary Source Content includes broadcast media, digital online streamed or on-demand audio/video media, music, digital signage, podcasts, audiobooks, or downloaded offline digital media that is viewed and/or listened to on a client device. The Primary Source Content may be rendered from within a client device's media player itself or may be rendered by an external device and can be discovered by the client device through Automatic Content Recognition (ACR) techniques such as Audio Watermarking & Fingerprinting, or using meta information from the media player presenting the PSA, as will be discussed in more detail below.

Herein, references will be made to Secondary Syndicated Content. Secondary Syndicated Content includes informational, socially immersive, and interactive content associated with the Primary Source Content that enhances or supplements the Primary Source Content being viewed or listened to or discoverable by the client device. Secondary Syndicated Content includes, but is not limited to trivia, statistics, side notes, images, video clips, reviews, ratings, fan gear, actor and actress biographies, sound tracks online digital resources etc. Secondary Syndicated Content may provide interactive opportunities (e.g., participating in social network feeds, voting, purchasing merchandise, etc.). Secondary Syndicated Content may include a function such as pre-populating a number to call or a calendar item to save on the Secondary Syndicated Content device.

Herein, references will be made to Content Identifier(s) ("Content ID(s)"). Content IDs are unique identifiers associated with each item of Primary Source Content. The Content ID may be in the form of: an Audio Watermark or an Audio Fingerprint recognized by Automated Content Recognition (Collectively, "ACR ID"); Really Simple Syndication (RSS); a Universal Resource Locator (URL); a Uniform Resource Indicator (URI); or a database/directory reference that is being used by the media player rendering the Primary Source Content.

Herein, references will be made to "temporal cue(s)." Temporal cues are temporal indicators associated with Primary Source Content. Each temporal cue corresponds to a specific time point or temporal segment in an item of Primary Source Content. Temporal cues include timecode(s), date-time stamp(s) and time-offset(s) (i.e. a temporal segment measured from the start of the Primary Source Content or in the case of a live broadcast/stream, at the actual time point of live content commencing play on the device). Temporal cues may be associated with Content IDs.

Herein, references will be made to "client device(s)". Client devices are electronic devices having a display screen and capable of internet connectivity. Client devices include tablets, smartphones, smart televisions, and computers. A client device may be integrated within a vehicle.

Herein, references will be made to "external device(s)". External devices are electronic devices having a display screen and/or speaker that can render Primary Source Content. External devices include televisions, computers, smartphones, speakers, smart speakers (e.g. a home assistant system) or electronic informational displays (e.g. a menu at a restaurant).

Referring to FIG. 1, illustrated therein is a method 10 for providing Secondary Syndicated Content associated to Primary Source Content.

The method 10 includes discovering the primary Source Content on the client device (Act 11). The Primary Source Content may be rendered by the client device itself, or be rendered by an external device and received by the client device.

At Act 13, the method 10 includes recognizing a Content ID associated with the primary Source Content on the client device.

At Act 15, the method 10 includes subscribing to a communication channel associated with the primary Source Content based on the identified Content ID. The communication channel is a gateway to access Secondary Syndicated Content associated to the Primary Source Content. The communication channel may be a WebSocket having multiple channels as exemplified in other embodiments described below.

At Act 16, the method 10 includes recognizing at least one temporal cue associated with the primary Source Content. The at least temporal cue corresponds to a temporal segment of the primary Source Content. According to some embodiments, the method 10 may include recognizing multiple temporal cues associated with the Primary Source Content.

At Act 17, the method 10 includes generating and displaying Secondary Syndicated Content on the client device. In embodiments wherein Act 16 is performed, the Secondary Syndicated Content is displayed on the client device as a function of the temporal cue. The Secondary Syndicated Content is synchronized to the temporal segment of the primary Source Content that corresponds to the temporal cue, such that the Secondary Syndicated Content appears on the client device at or near the time the temporal cue occurs in the primary Source Content.

Figure 2:
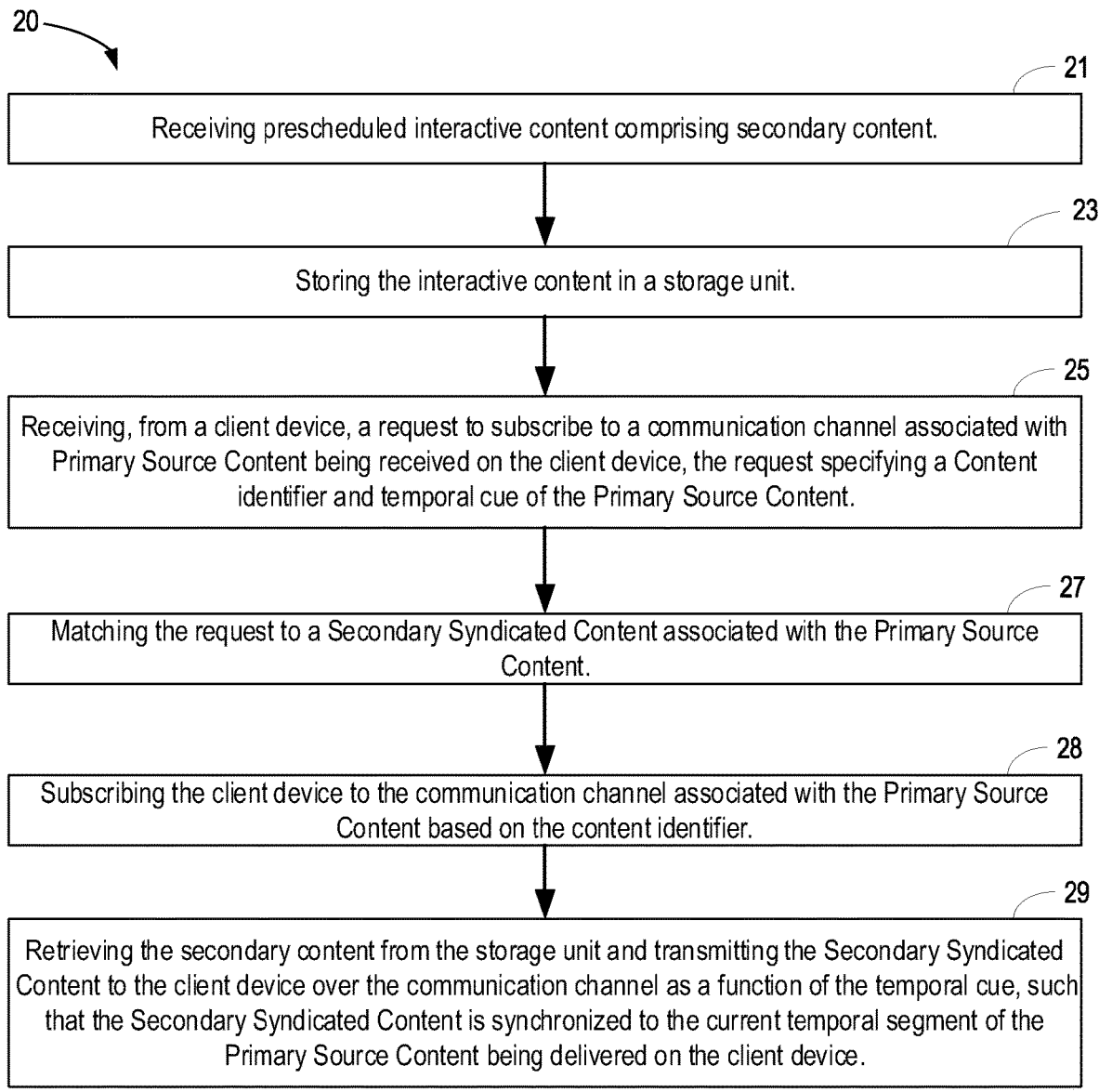
FIG. 2 is a flow chart of a method for providing secondary content associated to primary content, in accordance with an embodiment.

Referring to FIG. 2, illustrated therein is a method 20 performed by a system for providing Secondary Syndicated Content associated to Primary Source Content on a client device. The system may be system 100 of FIG. 3A.

At Act 21, the system receives, from a content managing device or application, prescheduled interactive content comprising Secondary Syndicated Content that enhances a viewer's or listener's experience of the Primary Source Content.

At Act 23, the system stores the interactive content in a storage unit (e.g. a database).

At Act 25, the system receives, from a client device over a communication network, a request to subscribe to a communication channel associated with the Primary Source Content being delivered to the client device, the request specifying a Content ID and a temporal cue of the Primary Source Content.

At Act 27, the system matches the request to Secondary Syndicated Content associated with the Primary Source Content.

At Act 28, the system subscribes the client device to the communication channel associated with the Primary Source Content based on the Content ID.

At Act 29, the system retrieves the Secondary Syndicated Content from the storage unit and transmits the Secondary Syndicated Content to the client device over the communication channel as a function of the temporal cue, such that the Secondary Syndicated Content can be synchronized to the current temporal segment of the Primary Source Content being delivered to the client device.

Figure 3A:
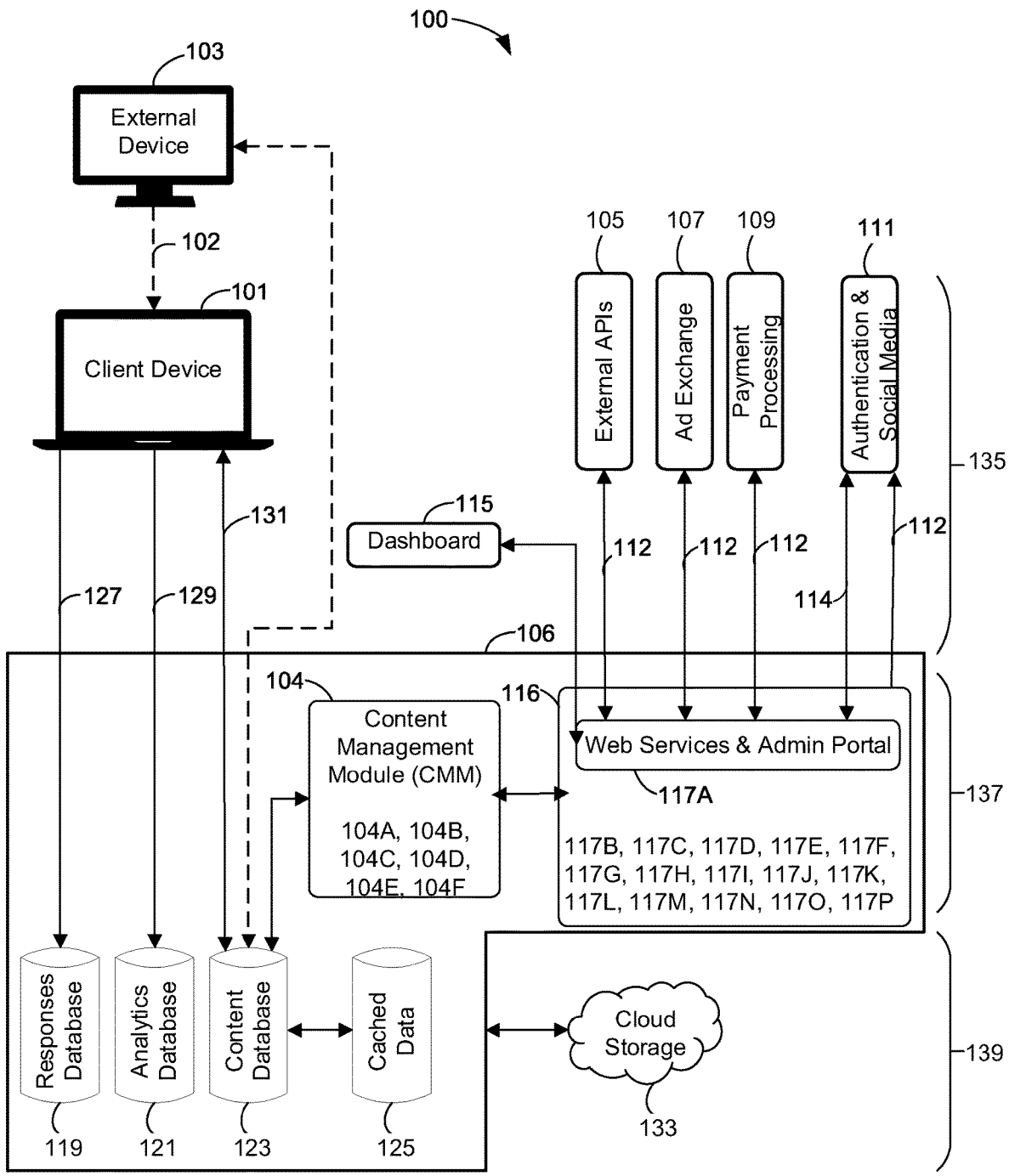
FIG. 3A is a block diagram of a system for managing and delivering secondary syndicated content, in accordance with an embodiment.

Referring to FIG. 3A, illustrated therein is a diagram of a system 100 for management and delivery of Secondary Syndicated Content, in accordance with an embodiment. The system may implement the method 10 of FIG. 1 and the method 20 of FIG. 2. For exemplary purposes, FIG. 3A is subdivided into 3 segments: an internet tier 135, a services tier 137 and a data tier 139. Components within the internet tier 135 may be located on one or more internet-capable devices connected to a communications network. Components within the services tier 137 are located on one or more servers. Components within the data tier 139 are located on one or more servers.

The system 100 includes a client device 101. The client device 101 is capable of connecting to the internet over a communications network and may be a tablet, a smartphone, a television, or a computer. The client device 101 may be integrated within a vehicle. According to other embodiments, the system 100 may include a plurality of client devices 101.

The client device 101 recognizes Primary Source Content. According to an embodiment, the Primary Source Content may be rendered from within the client device 101 as playout from a media player on the client device 101 itself. The Primary Source Content may be received via the internet. The Primary Source Content 102 may be received as the playout of an external device 103. The external device 103 may be any device that includes a display screen and/or a speaker. The client device 101 may implement Automatic Content Recognition (ACR) to identify the Primary Source Content 102 received from the external device 103.

The system 100 includes a core server 106. The core server 106 is connected to the client device 101 via a communications network (not shown).

The core server 106 includes a content management module (CMM) 104 managing and storing secondary syndicated content. The CMM 104 includes units to annotate temporal cues in the Primary Source Content so to provide Secondary Syndicated Content when those temporal cues are reached in the primary Source Content. Further, the CMM 104 may push live (i.e. not pre-programmed) Secondary Syndicated Content to users subscribed to a communication channel associated with the primary Source Content.

The CMM 104 includes a broadcast media unit 104A, a podcast unit 104B, an audiobook unit 104C and an online digital media unit 104D. Each unit 104A, 104B, 104C and 104D is for managing Secondary Syndicated Content relating to that respective form of media, and for annotating temporal cues in Primary Source Content relating to that respective form of media. For example, the broadcast media unit 104A is for managing Secondary Syndicated Content relating to broadcast media, and for annotating broadcast media Primary Source Content with temporal cues. The CMM 104 includes a digital media storage unit 104E for storing Secondary Syndicated Content and storing annotations to Primary Source Content. The CMM 104 includes an advertiser unit 104F for managing Secondary Syndicated Content in the form of ads.

The core server 106 includes a services module 116. The service module 116 includes a plurality of units, wherein each unit performs a function related to the generation of Secondary Syndicated Content, for example, generating interactive polls/trivia, advertising/branding, and pre-scheduled events for users to interactively engage with Primary Source Content. The services module 116 is in connection with the CMM 104 whereby the units 117B, 117C, 117D, 117E, 117F, 117G, 117H, 117I, 117J, 117K, 117L, 117M, 117N, 117O, 117P of the services module 116 may exchange data with the units 104A, 104B, 104C, 104D, 104E, 104F of the CMM 104.

The services module 116 includes a web services & administration portal 117A. The web services & administration portal 117A regulates the access of administrators and/or Primary Source Content owners to the system 100. According to another embodiment, the web services & administration portal 117A may be located on a web portal server connected to the core server 106.

The services module 116 includes a social network service unit 117B for integration of social media into Secondary Syndicated Content and for using social media accounts for authentication purposes. The services module 116 includes a session subscription manager 117C unit for managing subscriptions to content channels associated with Primary Source Content. The services module 116 includes a timer machine engine unit 117D for synchronizing the delivery of Secondary Syndicated Content to the playout of Primary Source Content. The services module 116 includes a messaging unit 117E for generating and pushing messages related to Secondary Syndicated Content. The services module 116 includes a time-based event creation unit 117F for generating time-based event Secondary Syndicated Content. The services module 116 includes a templates unit 117G for providing templates for Secondary Syndicated Content. The services module 116 includes a rating system unit 117H for live and offline rating of Primary Source Content. The services module 116 includes a text, calendar, telephone unit 117I for generating text, calendar and telephone alerts as Secondary Syndicated Content. The services module 116 includes a poll prediction unit 117J for real-time poll prediction. The services module 116 includes a reporting unit 117K for real-time reporting. The services module 116 includes a social media content unit 117L for providing social media interactivity in Secondary Syndicated Content. The services module 116 includes a purchase unit 117M for providing payment options for Secondary Syndicated Content. The services module 116 includes a commentary & bio unit 117N for providing creator and version information of Secondary Syndicated Content. The services module 116 includes a programmatic RTB unit 117O for integrating real-time bidding in Secondary Syndicated Content. The services module 116 includes a trivia & games unit 117P for providing trivia and games in Secondary Syndicated Content.

The system 100 includes a dashboard application 115. The dashboard application 115 is a web-based application for use by Primary Source Content owners through a device with internet connectivity (e.g. a computer, smartphone or tablet).

The dashboard application 115 operates according to a web content management system which allows Primary Source Content owners with little knowledge of programming language to effectively to annotate Primary Source Content and generate and manage Secondary Syndicated Content. The dashboard application 115 may access the core server 206 via the web services and admin portal 117A. Using the dashboard application 115, an administrator and/or Primary Source Content owner may generate and manage Secondary Syndicated Content by implementing the various units in the services module 116 and CMM 104.

The system 100 may include external Application Programming Interfaces (APIs) 105 for generating and editing Secondary Syndicated Content using external applications. The system 100 may include Ad Exchange 107 for advertisers to include ads in Secondary Syndicated Content. The system 100 may include payment processing 109 for entering payment information if desired for viewing/accessing the system 100 and/or the Secondary Syndicated Content. The payment processing 109 may be PayPal, online banking, and the like. The system 100 may include social media 111 whereby a social media account may connect to the system 100 for user authentication purposes. The social media 111 may be Instagram, Facebook, Snapchat, Twitter, Google, and the like.

The external APIs 105, Ad Exchange 107, payment processing 109 and access the core server 106 by via the webservices and admin portal 117A using a set of WebSockets 112 implementing Representational State Transfer (REST)/Javascript Object Notation (JSON) architecture. The social media content unit 117L also uses the WebSocket 112 to connect to the social media 111. For authentication purposes, the social media 111 connects to the social network service unit 1176 by implementing the OAuth standard protocol 114.

The server 106 includes a response database 119, an analytics database 121, a content database 123 and a cache 125. According to other embodiments, each database 119, 121 and 123 may be located on separate servers connected to the core server 106. The response database 119 receives and stores user interactive response data sent from the client device 101 in real-time via a WebSocket response channel 127. The analytics database 121 receives and stores user analytics sent from the client device 101 in real time via a WebSocket analytics channel 129. The content database 123 receives and stores Content IDs (e.g. an identifier recognized by ACR on client device 101) and temporal cues from the primary Source Content playout on the client device 101 via a WebSocket content channel 131. The content database 123 receives and stores Secondary Syndicated Content and annotations to Primary Source Content from the CMM 114. The Secondary Syndicated Content and temporal cue annotations are grouped and stored according to the corresponding Content ID for that Primary Source Content. Secondary Syndicated Content stored in the content database 123 is sent to the client device 101 via the WebSocket content channel 131.

WebSockets are an advanced technology that makes it possible to open an interactive communication session between the client device 101 and the core server 106. Each WebSocket channel 127, 129, 131 implements a Pub-Sub messaging pattern. Implementation of WebSockets and a Pub-Sub architecture enable event-driven architectures where a group of users subscribe to events (i.e. Secondary Syndicated Content) of a given channel (i.e. content channel 131) and are notified whenever an event on the content channel 131 arrives. When Secondary Syndicated Content is published into the content channel 131, the content channel 131 delivers the Secondary Syndicated Content to the client device 101. According to other embodiments (discussed below with reference to FIG. 5A, 5B, 5C), Secondary Syndicated Content may be published to the external device 103 when published to the client device 101. Client devices 101 subscribed to the content channel 131 can send messages to the core server 106 and receive temporal cue-driven Secondary Syndicated Content without having to continuously poll the core server 106 for a reply.

Secondary Syndicated Content are event based and presented in an activity feed timeline on the client device 101 which is the reverse-chronological display of a user's temporally synchronized events to the Primary Source Content along with branding elements. This is facilitated through a content & timeline management system accessible through the dashboard web application 115 to configure, prepare, produce and publish all interactivity, branding, and graphics. Events are setup on an easy to use timeline for automated or manual control. Elements are interactive building-blocks that every experience uses to create a unique engagement experience on top of a platform that provides the infrastructure, analytics and live content management for the deployment of high volume companion events, voting, gaming, and other real-time events that are suitable for audience spikes which can't afford to fail.

The solution provided herein addresses the challenge where infrastructure handles extraordinary spikes in traffic for rich, interactive experiences instantaneously and with low latency that coincide with media broadcasts as hundreds of thousands of viewers or listeners opening their apps for a real-time interactive experience or ancillary content, simultaneously along with tooling for building fault-tolerant systems.

For example, media content can be presented external to a mobile device from multimedia systems such as TV, Radio, Smart Speakers/Home Assistants, digital signage or as online streamed or on-demand media, where the device is able to detect content being played externally through ACR (Automatic Content Recognition) technology, or by subscribing to a WebSocket channel associated to the Primary Source Content from a mobile device. The device rendering the ancillary/supplemental content augments ancillary/supplementary content played on a primary (or external) device/feed.

The external media player or system that presents the primary source media content will include an imbedded Content Identifier and time-codes, or time-stamps for live content, using ACR mechanisms. In some embodiments, the mobile device that is secondary to the Primary Source Content being played external to the device uses an RSS feed/subscription or sends the URL/URI, directory or database reference that uniquely identifies the content, together with time-stamps, where the user on the mobile device can also manually search and subscribe to the published channel within an application for the external content being played to relay secondary ancillary content related to the Primary Source Content being presented externally.

One of the benefits that is part of all embodiments is using real-time streamed content channels that clients connect to through WebSockets. This allows clients to subscribe to secondary syndicated content channels that are event driven allowing for the presentation of rich, interactive, and socially immersive experiences within an activity feed based on timed triggers or manually activated events published to the subscribed client.

The external media player or system that presents the primary source media content will include an imbedded content identifier and time-codes, or time-stamps for live content, using ACR mechanisms. In some embodiments, the mobile device that is secondary to the primary source content being played external to the device uses an RSS feed/subscription or sends the URL/URI, directory or database reference that uniquely identifies the content, together with time-stamps, where the user on the mobile device can also manually search and subscribe to the published channel within an application for the external content being played to relay secondary ancillary content related to the primary source content being presented externally. Network Time Protocols (NTP) is used to assure that the content playout from the feed, on the server, and the user device are using the same date/time reference and their internal clocks are synchronized.

One of the benefits that is part of all embodiments is using real-time streamed content channels that clients connect to through WebSockets. This allows clients to subscribe to secondary syndicated content channels that are event driven allowing for the presentation of rich, interactive, and socially immersive experiences within an activity feed based on new content being identified to trigger an event, timed triggers for events, or manually activated events published to the subscribed client.

The solution addresses the challenge where advertisements or notifications that may be presented through Dynamic Advertisement Insertion (DAI) in media playout feeds can be identified and have corresponding events triggered and published as secondary syndicated events/content to a device based on a 'Content Identifier' being detected for inserted advertising (dynamic or static) within primary source playout of a media player (local or external playout detection). DAI uses different methods that aids audience-based advertisement targeting not only for online video/audio, but also across platforms for linear broadcast, Ad-based Video-On-Demand (AVOD), mobile and Over-the-top (OTT) and connected TV (CTV), enabling targeting by platform, device, audience, and geography. As an example; a manifest (or playlist), is sent alongside the stream and picked up by the media player. The manifest contains URLs (pointers) to the video/audio files contained within the stream. In addition to identifying the bit rates available, the manifest contains metadata which identifies the type of content (programming, advertising, public service announcement (PSA), etc.) being delivered to a client media player. The manifest is parsed and the metadata may provide an alternative manifest which identifies the bespoke advertising, or geographic content to play out. In this way, the URLs (pointers) to the video/audio advertising/programming/PSA being inserted within the media playout to the client can be used as the 'Content Identifier' (Content-ID) that triggers the publishing of an event (without a timecode/datetime stamp trigger) that can be delivered to a user device locally or secondary device (external content recognition) through the 'Content Channel' that the devices are subscribed to.

Any client subscribed to a channel will be streamed newly triggered secondary content elements instantaneously. In the case of a live media presentation such as a live television or radio show, content events are published in real-time regardless of how the device that renders the ancillary/supplemental content has initially discovered or subscribed to the ancillary content/event channel (ACR, RSS, URL, etc.). The activity feed that is presented as a time lined supplemental content stream, is synchronous with the Primary Source Content with focused ancillary/secondary syndicated content/event elements, that represent a contained, event experience. These activated events synchronized to the Primary Source Content allow for advanced interactions such as polls, trivia, rating, predictions, social media, ecommerce, call functions on the device itself (dial a number, populate a calendar/text message), and multimedia elements that can be prescheduled or published live, and all clients subscribed to an ancillary content channel would receive the content published to that channel instantaneously.

With the subscribe & publish system and methods modeled within this platform, an effective mechanism is offered for live content that rely on ACR's that are able to recognize content proficiently but are not as adept in determining specific time offsets within various types of media that are broadcast without a significant delay (live media broadcast or online live stream).

Using ACR mechanisms to simply identify the live media presentation allows the platform to subscribe a client device to a channel through a WebSocket based on an identification associated to the live broadcast or online stream which then relays ancillary/secondary syndicated content/events up to the point of time of the device subscribing to the ancillary/secondary channel, as well as receive new content/events that may have been prescheduled or published live, having been triggered by the current date and time. This technique also has other benefits that include; 1) not having to continually use resources (memory, processing, microphone, camera) on the client device allowing for greater battery life, and allocation of those resources elsewhere within the client device; 2) relieve privacy concerns for users of client devices that may arise with the use of ACR mechanisms. An example would be the continual recording from the microphone of the device for Audio Watermarking, and Audio Fingerprinting detection of content. Once the microphone on the client device has identified live media content and has subscribed to the ancillary/secondary syndicated content/event channel, there is no longer a requirement to continually record the external audio for the purpose of synchronizing with the Primary Source Content playout all client devices/applications that are subscribed to the channel, will receive relayed events in real-time, as well at the desired time/date intervals.

While subscribed to an ancillary content/event channel, event payloads of any type, or size can go both directions— incoming and outgoing. Channel connections also persist beyond a single request/response cycle. The present subject matter includes response channels to obtain real-time responses to interactive event elements from client devices and user interactions, and analytic channels to retrieve real-time analytics form the client device which are subscribed to as the client subscribes to an ancillary content/event channel in relation to Primary Source Content. The system maintains a repository for the collection, storage, analysis and reporting of responses to interactive event times such as polls, predictions, and trivia.

For example, an additional ACR mechanism has been developed as part of this platform which uses RSS feeds to identify content and meta data associated with primary digital media content. RSS stands for "Really Simple Syndication", a standard for subscribing to content on the Internet. Using RSS, the platform can access updated content and ancillary information related to digital media content. One embodiment includes Podcasts and the use of RSS feeds to identify digital media content as a Primary Source Content source that is then used to subscribe to real-time streamed ancillary/secondary syndicated content channels that clients connect to through WebSockets.

RSS uses a specially formatted xml formatted document that lists podcast episodes with the latest post/episode at the top. Media files are referenced within each item (podcast episode) listed in the RSS feed. When the device references a RSS URL, the device is "subscribing" to the feed, which in turn is used to subscribe to ancillary/secondary syndicated content, response and analytics channels through a WebSocket on the platform delivery ancillary/secondary syndicated content/events presented within an activity-feed/timeline as timed triggers. Further benefit is gained by retrieving personalized RSS feed settings such as, customizing the feed title and author name, adding or changing a category or keywords, adding a stats service prefix, defining a website, email address, or social media feeds, choosing a language, and content artwork that can be used for branding, and association to ancillary content feeds.

In embodiments wherein the client device 101 does not have an active internet connection while playing or discovering content (offline or downloaded media of files being presented), the client application will store in the cache 125 the Content Identifiers and time-codes, or datetime-stamps that the client device 101 has traversed while playing the primary Source Content and then connect to the WebSocket content channel 131 and subscribe to the published SCC associated to the primary Source Content they were watching or listening to offline. Content relevant to time offsets that the client has consumed while offline will be presented within the activity feed up to the last time-code or timestamp reached of the primary Source Content that was presented.

The system 100 may include a cloud storage 133 connected to the core server 106 via a communications network. The cloud storage 133 may be a remote server. The cloud storage 133 may back up information on the databases 119, 121 and 123.

Figure 3B:
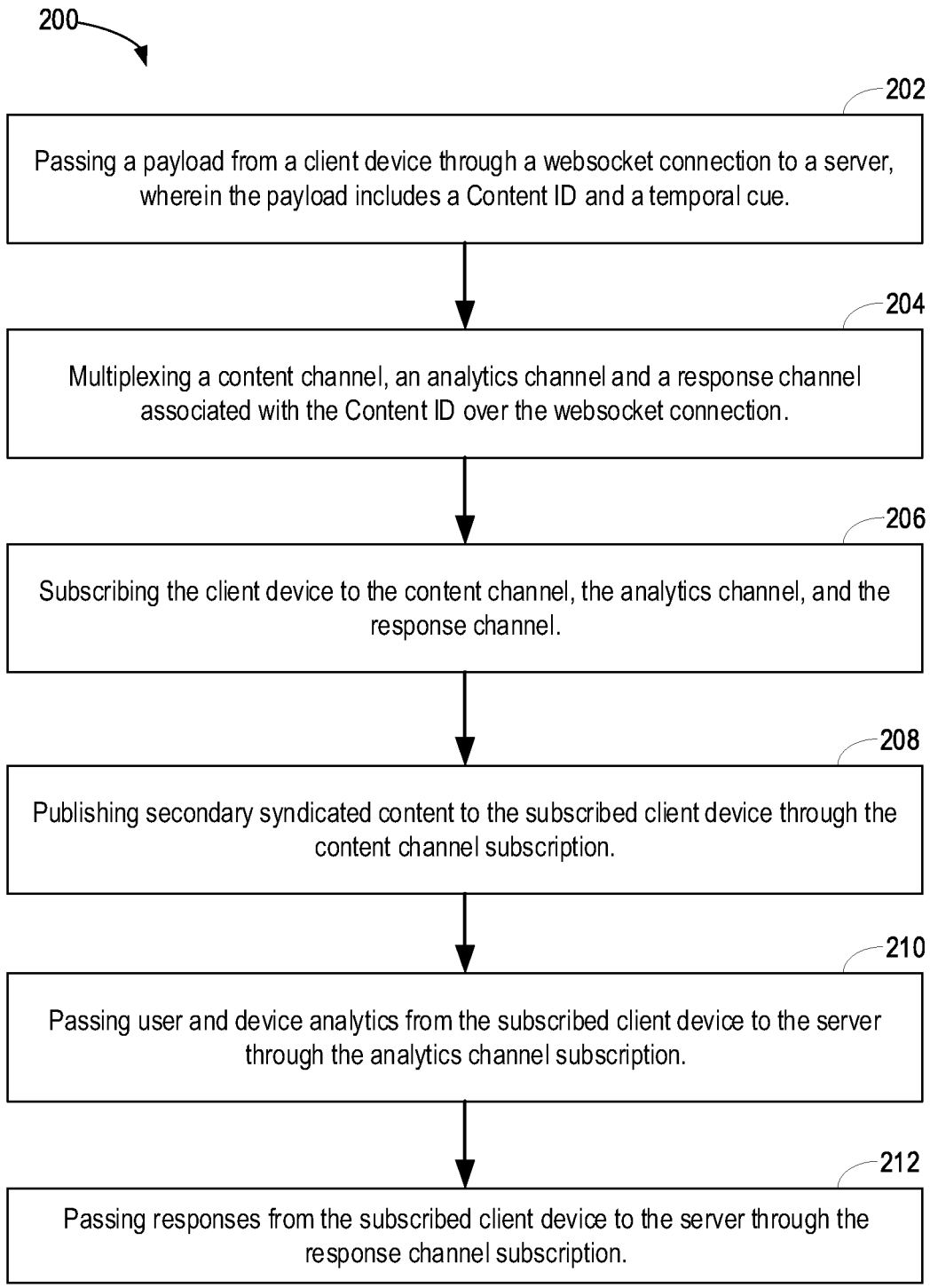
FIG. 3B is a flow chart of a method for publishing secondary syndicated content to a subscribed device, in accordance with an embodiment.

Referring to FIG. 3B, illustrated therein is a method 200 for publishing Secondary Syndicated Content to a subscribed device and receiving responses and analytics, in accordance with an embodiment. The method 200 may be performed by a system including a server and a client device (i.e. system 100, core server 106 and client device 101 in FIG. 3A).

At 202 a payload is passed from a client device to a server through a WebSocket connection. The payload is associated to Primary Source Content and includes a Content ID and a temporal cue.

At 204 the server, according to a backend transport dispatch protocol, multiplexes a content channel, an analytics channel and a response channel (i.e. content channel 131, analytics channel 129, response channel 127 in FIG. 3A) associated with the Content ID over the WebSocket connection. The content channel, the analytics channel and the response channel implement a Pub-Sub architecture over the WebSocket connection.

At 206, the server subscribes the client device to the content channel, the analytics channel and the response channel.

At 208, Secondary Syndicated Content stored in a database (i.e. content database 123 in FIG. 3A) or cloud storage (i.e. cloud storage 133 in FIG. 3A) is published to the subscribed client device through the content channel subscription at the time intervals in the payload. The subscribed client device displays the Secondary Syndicated Content on a timeline/activity feed within the subscribed client device.

At 210, user and device analytics are passed from the subscribed user device to the server through the analytics channel subscription. The user and device analytics may be stored in a database (i.e. analytics database 121 in FIG. 3A) on the server. The user and device analytics are passed to the database in real-time.

At 212, responses are passed from the subscribed client device to the server through the response channel subscription. The responses may interactive content/event responses entered on the subscribed client device by a user. The responses are stored in a database (i.e. response database 119 in FIG. 3A) on the server. The responses are passed to the database in real-time.

Figure 3C:
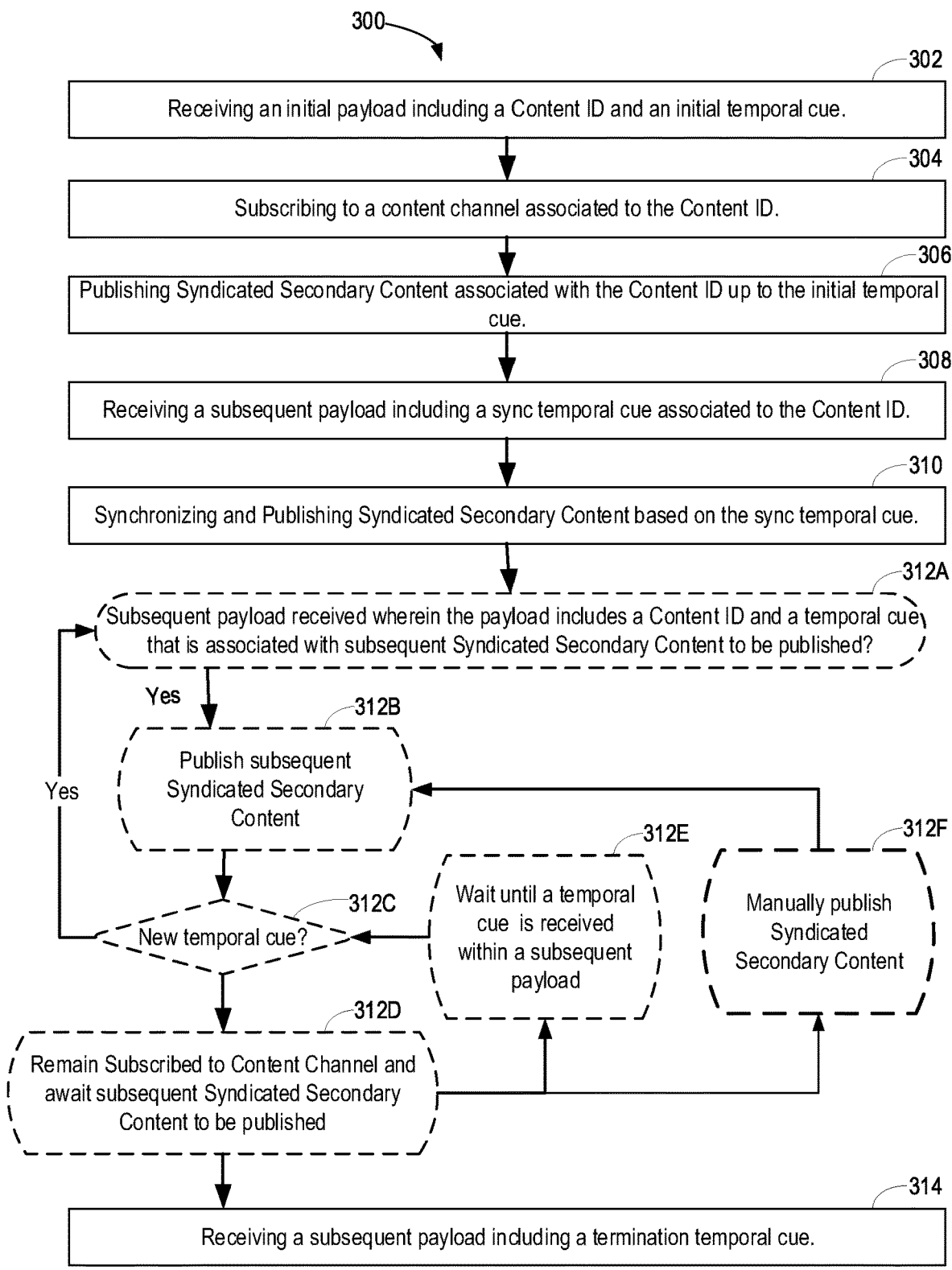
FIG. 3C is a flow chart of a method for publishing secondary syndicated content on a client device through a content channel subscription, in accordance with an embodiment.

Referring to FIG. 3C, illustrated therein is a method 300 for publishing Secondary Syndicated Content on a client device through a content channel subscription, in accordance with an embodiment. The method 300 may be performed by the system 100 in FIG. 3A.

At 302 a subscribed client device receives an initial payload. The initial payload is received from a media player on the client device during playout of Primary Source Content or received from an external device (i.e. external device 103 in FIG. 3A) rendering Primary Source Content. The payload includes a Content ID and initial temporal cue. The initial temporal cue may be a timecode, date-time stamp or time-offset corresponding to a temporal segment of the Primary Source Content.

At 304, the client device is subscribed to a WebSocket content channel associated to the Content ID. The client device is subscribed to the content channel according to, for example, method 200 in FIG. 3B.

At 306, Secondary Syndicated Content associated to the Content ID is published through the content channel to the subscribed client device up to the initial temporal cue. That is, the Secondary Syndicated Content published at Act 306 is Secondary Syndicated Content associated to a temporal segment(s) of the primary Source Content that has been played-out up to the initial temporal cue.

At 308, the method 300 may include receiving a subsequent payload including a sync temporal cue. The sync temporal cue may be received in the form of an ARC-ID or URL-ID from a media player on the subscribed client device or received from an external device. The sync temporal cue may be a time-code, date-time stamp or time-offset corresponding to a temporal segment of the Primary Source Content. The sync temporal cue is received during playout of the Primary Source Content on the client device.

At 310, the method 300 may include publishing Secondary Syndicated Content through the content channel to the subscribed client device. The Secondary Syndicated Content published at Act 310 is synchronized to the temporal segment(s) of Primary Source Content corresponding to the synch temporal cue. The synchronizing and publishing of Secondary Syndicated Content at Act 310 involves a series of queries as described below.

At 312A, if the subsequent payload includes a Content ID and temporal cue that is associated with Secondary Syndicated Content that can be published (i.e. Secondary Syndicated Content corresponding to the Content ID and temporal cue), the Secondary Syndicated Content is published at 312B. At 312C, if a new temporal cue is received, the method 300 reverts to Act 312A and also remains subscribed to the content channel to await subsequent Secondary Syndicated Content to be published (Act 312D) and waits until a temporal cue is received within a subsequent payload (Act 312E). According to an embodiment, the method 300 may include manual publishing of Secondary Syndicated Content by an administrator/Primary Source Content owner at 312F.

At 314, a subsequent payload including a termination temporal cue is received. The termination temporal cue corresponds with the termination of Primary Source Content playout and/or the temporal end point of the Primary Source Content.

Figure 4A:
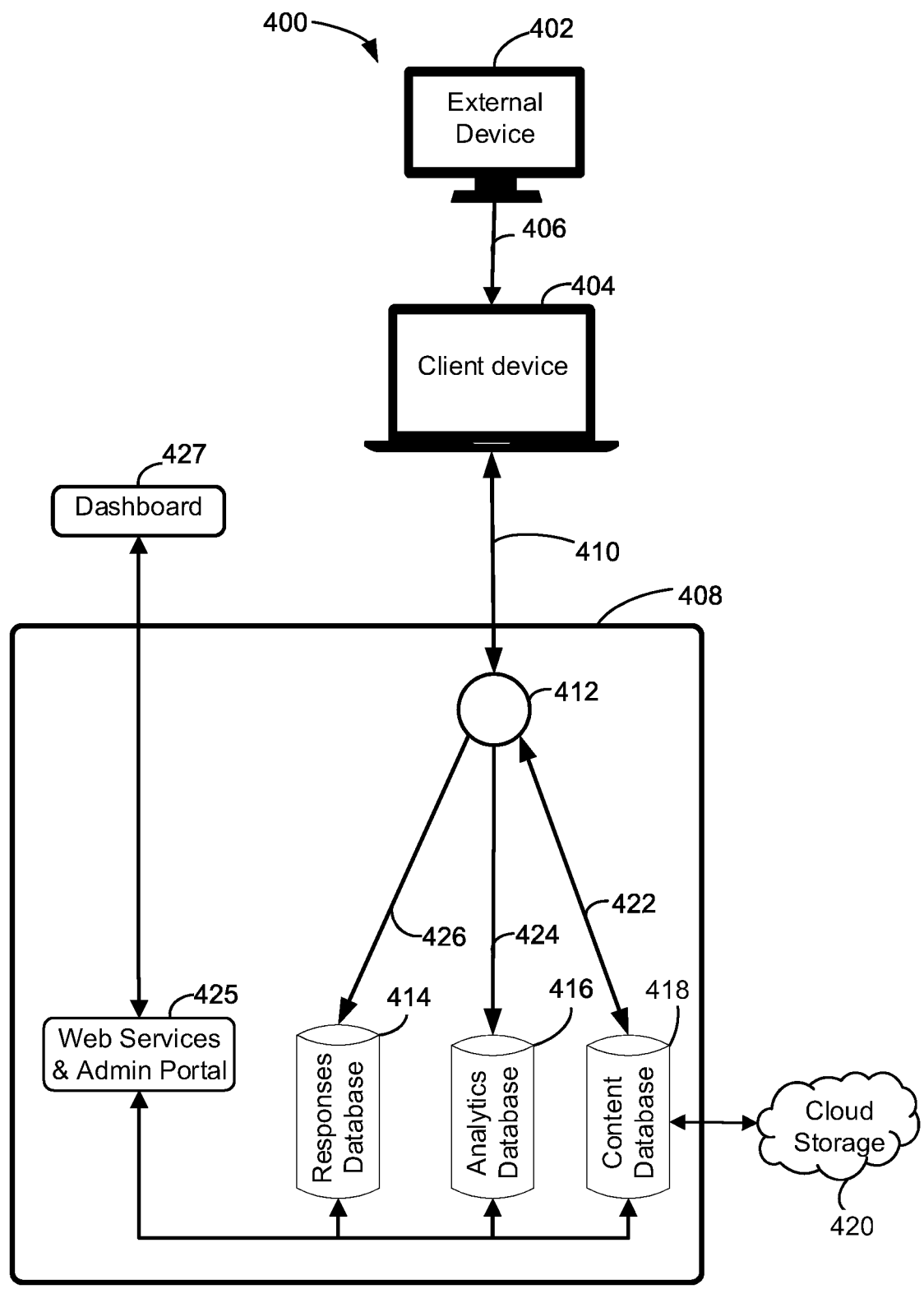
FIG. 4A is a block diagram of a system for discovering primary source content, in accordance with an embodiment.

Referring to FIG. 4A, illustrated therein is a system 400 for discovering Primary Source Content and publishing associated Secondary Syndicated Content on a client device.

The system 400 includes a client device 404. The client device 404 includes a media player (not shown) for rendering Primary Source Content. Accordingly, the client device 404 may "discover" Primary Source Content rendered by itself. The client device 404 includes a timeline/activity feed application (not shown) for displaying Secondary Syndicated Content. The client device 404 is capable of internet connectivity and may be a computer, a smartphone, a tablet or a smart television. The client device 404 may be integrated within a vehicle.

The system 400 may include at least one external device 402. The external device 402 is capable of internet connectivity and may be a computer, a smartphone, a tablet, a smart television, or a smart speaker (e.g. a home assistant). The external device 402 includes a media player (not shown) for rendering Primary Source Content.

The client device 404 may discover Primary Source Content rendered by the external device 402. The primary Source Content may be broadcast media, digital online streamed or on-demand audio/video media, digital signage, podcasts, audiobooks, music, or downloaded offline digital media. The client device 404 may implement automatic content recognition (ACR) 406 to identify the Primary Source Content rendered by the external device 402.

The system 400 includes a core server 408. According to other embodiments, the system may include a plurality of core servers. The core server 408 is connected to the client device 404 through a WebSocket connection 410 over a communications network (not shown). The core server 408 includes a responses database 414 for storing user interactive responses to Secondary Syndicated Content. The core server 408 includes an analytics database 416 for storing user and device analytics. The core server 408 includes a content database 418 for storing Secondary Syndicated Content. According to other embodiments, the responses database 414, the analytics database 416 and the content database 418 may be located on separate servers connected to the core server 408.

The core server 408 includes a backend server transport dispatch 412. According to other embodiments, the backend server transport dispatch 412 may be located on another server connected to the core server 408. The backend server dispatch 412 is connected to the client device 404 through a WebSocket connection 410 over a communications network (not shown). The backend server dispatch 412 is configured to subscribe the client device 404 to a content channel 422, an analytics channel 424 and a response channel 426. Payloads relating to Primary Source Content discovered by the client device 404 and sent by the client device 404 over the WebSocket connection 410 may be routed to the content database 418 when subscribed to the content channel 422. Secondary Syndicated Content stored in the content database 418 may be uploaded to the client device 404 through the WebSocket connection 410 when subscribed to the content channel 422. Payloads relating to user and device analytics sent from the client device 404 may be routed to the analytics database 416 when subscribed to the analytics channel 424. Payloads relating to user interactive responses to Secondary Syndicated Content sent from the client device 404 may be routed to the responses database when subscribed to the responses channel 426.

The core server 408 includes a web services & admin portal 425. According to another embodiment, the web services & admin portal 425 may be located another server connected to the core server 408. The web services & admin portal 425 is connected to the responses database 414, the analytics database 416 and the content database 418.

The system 400 includes a dashboard web application 427. The dashboard web application 427 may be used by administrators and/or Primary Source Content owners to access the data stored in the response database 414, the analytics database 416 and the content database 418 via the web services & admin portal 425. The dashboard web application 427 may be used to view user and device analytics, view user interactions/responses to Secondary Syndicated Content and to edit, manage and publish Secondary Syndicated Content in real-time.

The system 400 may include cloud storage 420. The cloud storage 420 may be connected to the content database 418 for backup of Secondary Syndicated Content stored in the content database 418. The cloud storage may be located on a remote server.

Figure 4B:
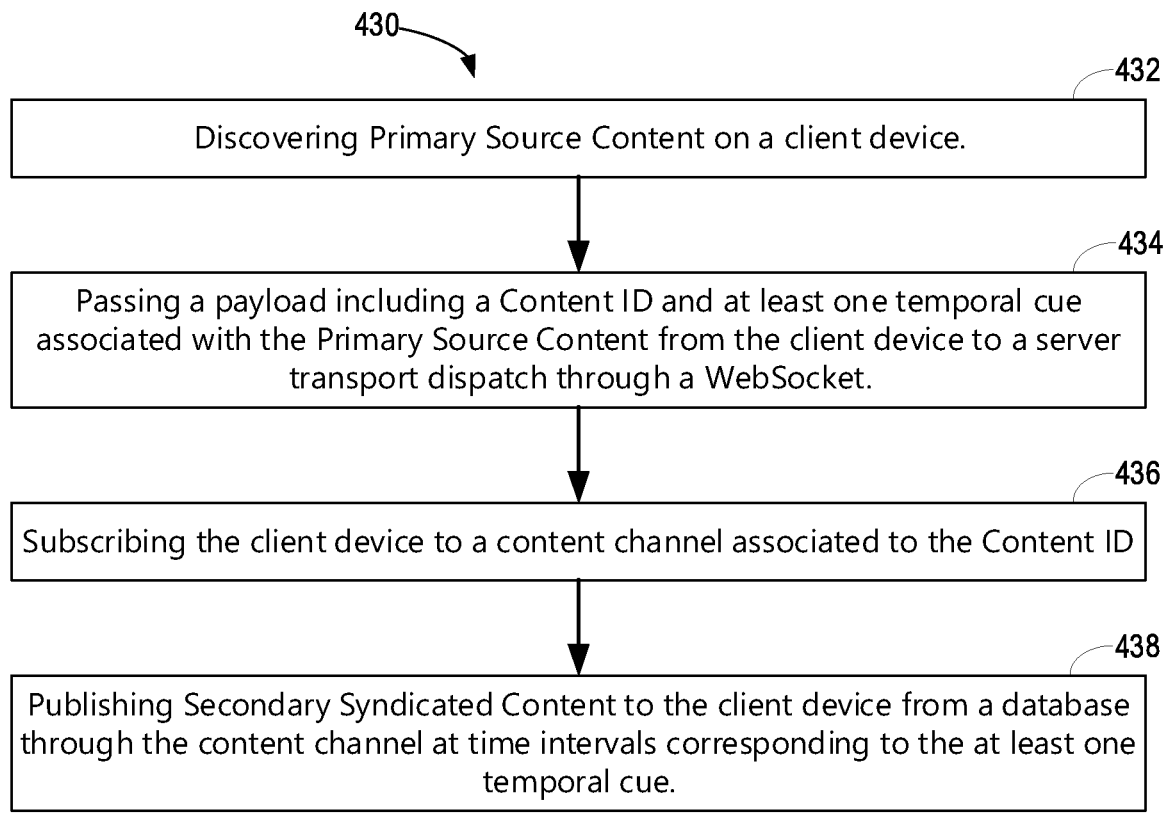
FIG. 4B is a flow chart of a method for discovering primary source content, in accordance with an embodiment.

Referring to FIG. 4B, illustrated therein is a method 430 for discovering Primary Source Content and publishing associated Secondary Syndicated Content to a client device, in accordance with an embodiment. The method 430 may be performed by system 400 in FIG. 4A. The elements from FIG. 4A are identified in parenthesis for reference.

At 432, Primary Source Content rendered is discovered on a client device (404). The Primary Source Content may be rendered by an external device (402) and discovered by ACR (406) mechanisms on the client device (404). The Primary Source Content may be rendered by a media player within the client device (404) itself.

At 434 a payload including a Content ID and at least one temporal cue associated with the Primary Source Content is passed from the client device (404) to a server transport dispatch (412) through a WebSocket connection (410). The Content ID may be an ACR ID, URL, URI RSS or database/directory reference. The temporal cue may be a timecode, date-time stamp or time-offset corresponding to a temporal position in the Primary Source Content.

At 436, the server transport dispatch (412) subscribes the client device (404) to a content channel (422) associated to the Content ID.

At 438 Secondary Syndicated Content is published to the client device (404) from a database (418) through the content channel (422) at time interval(s) corresponding to the at least one temporal cue. The Secondary Syndicated Content is presented within the timeline/activity feed on the client device (404) at the time interval(s) corresponding to the at least one temporal cue.

Figure 4C:
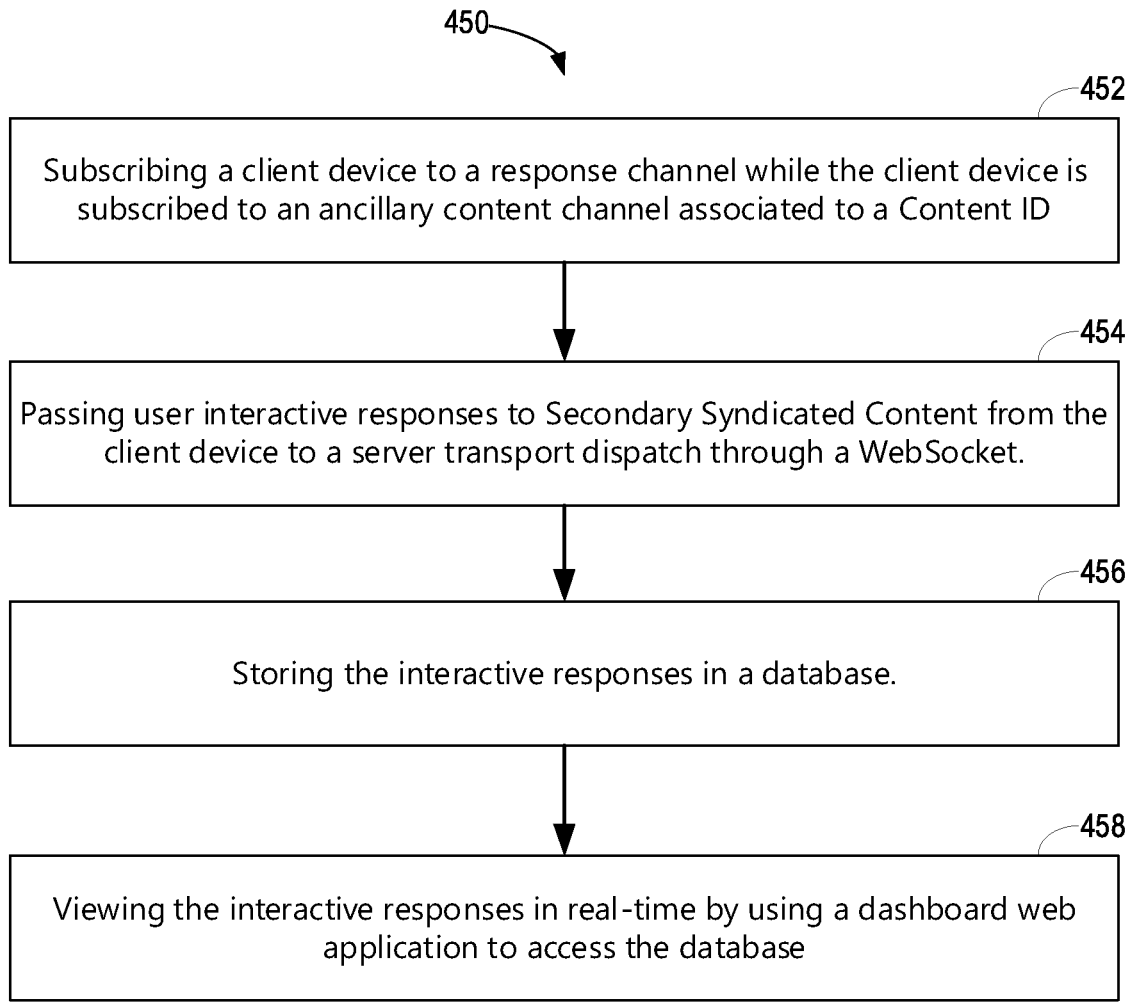
FIG. 4C is a flow chart of a method for user response to secondary content, in accordance with an embodiment.

Referring to FIG. 4C, illustrated therein is a method 450 for receiving, storing and viewing user responses to Secondary Syndicated Content presented on a client device, according to an embodiment. The method 450 may be performed by system 400 in FIG. 4A. The elements from FIG. 4A are identified in parenthesis for reference.

At 452 a client device (404), already being subscribed to an ancillary content channel (422) associated with a Content ID (for example, according to method 430 in FIG. 4B), is subscribed to a response channel (426) by a server (408) transport dispatch (412).

At 454, user interactive responses to Secondary Syndicated Content presented on the client device is passed from the client device to the server (408) through a response channel (426) over a WebSocket connection (410). The WebSocket connection (410) may be the same WebSocket connection (410) for the content channel (422). The user interactive responses may be responses to scc in the form of polls, trivia, predictions, ratings or estimates.

At 456, the user interactive responses are stored in a responses database (414).

At 458, an administrator and/or a Primary Source Content owner views the interactive responses in real-time by using a dashboard web application (427) to access the responses database (414). According to another embodiment, a user of the client device (404) may view the interactive responses stored in the responses database (414) by using a dashboard web application (427) to access the responses database (414). According to yet another embodiment, users of a plurality of user devices (404) subscribed to the ancillary content channel (422) may view the interactive responses stored in the responses database (414) by using a dashboard web application (427) to access the responses database (414).

Figure 4D:
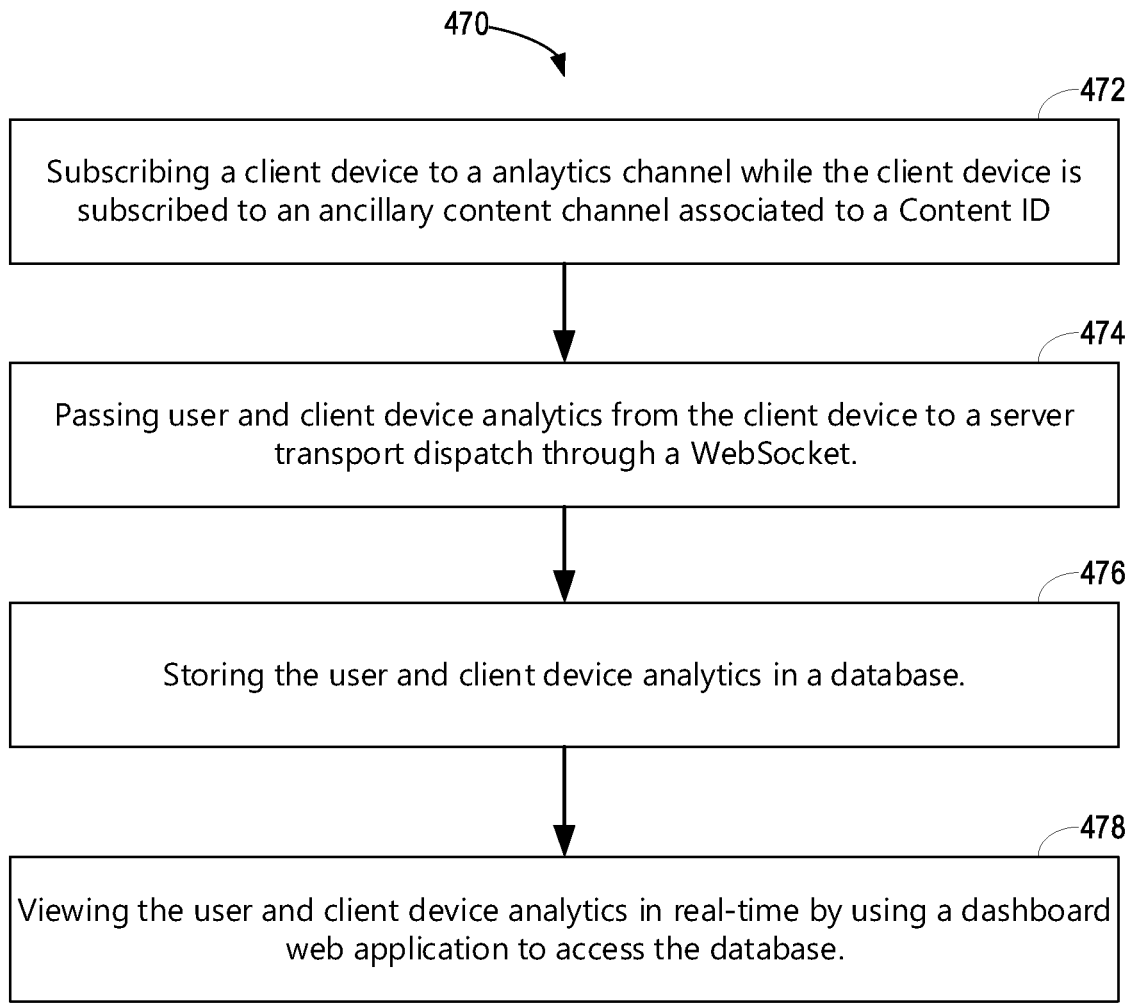
FIG. 4D is a flow chart of a method for client device analytics, in accordance with an embodiment.

Referring to FIG. 4D, illustrated therein is a method 470 for receiving, storing and viewing user and client device analytics, according to an embodiment. The method 470 may be performed by system 400 in FIG. 4A. The elements from FIG. 4A are identified in parenthesis for reference.

At 472 a client device (404), already being subscribed to an ancillary content channel (422) associated with a Content ID (for example, according to method 430 in FIG. 4B), is subscribed to an analytics channel (424) by a server (408) transport dispatch (412).

At 474, user and client device analytics are passed from the client device to the server (408) through the analytics channel (424) over a WebSocket connection (410). The WebSocket connection (410) may be the same WebSocket connection (410) for the content channel (422). The user and client device analytics may include content channels subscribed to, impressions, interactions, sharing, ancillary content measurement and interactivity measurement information about the user and/or client device for the duration of the ancillary content channel (422) subscription.

At 476, the user and client device analytics are stored in an analytics database (416).

At 478, an administrator and/or a Primary Source Content owner views the user and client device analytics in real-time by using a dashboard web application (427) to access the analytics database (416).

A further aim of the present disclosure is to provide systems and methods for synchronously porting and sharing Primary Source Content and associated Secondary Syndicated Content across multiple client devices with minimal manual intervention and delay.

Figure 5A:
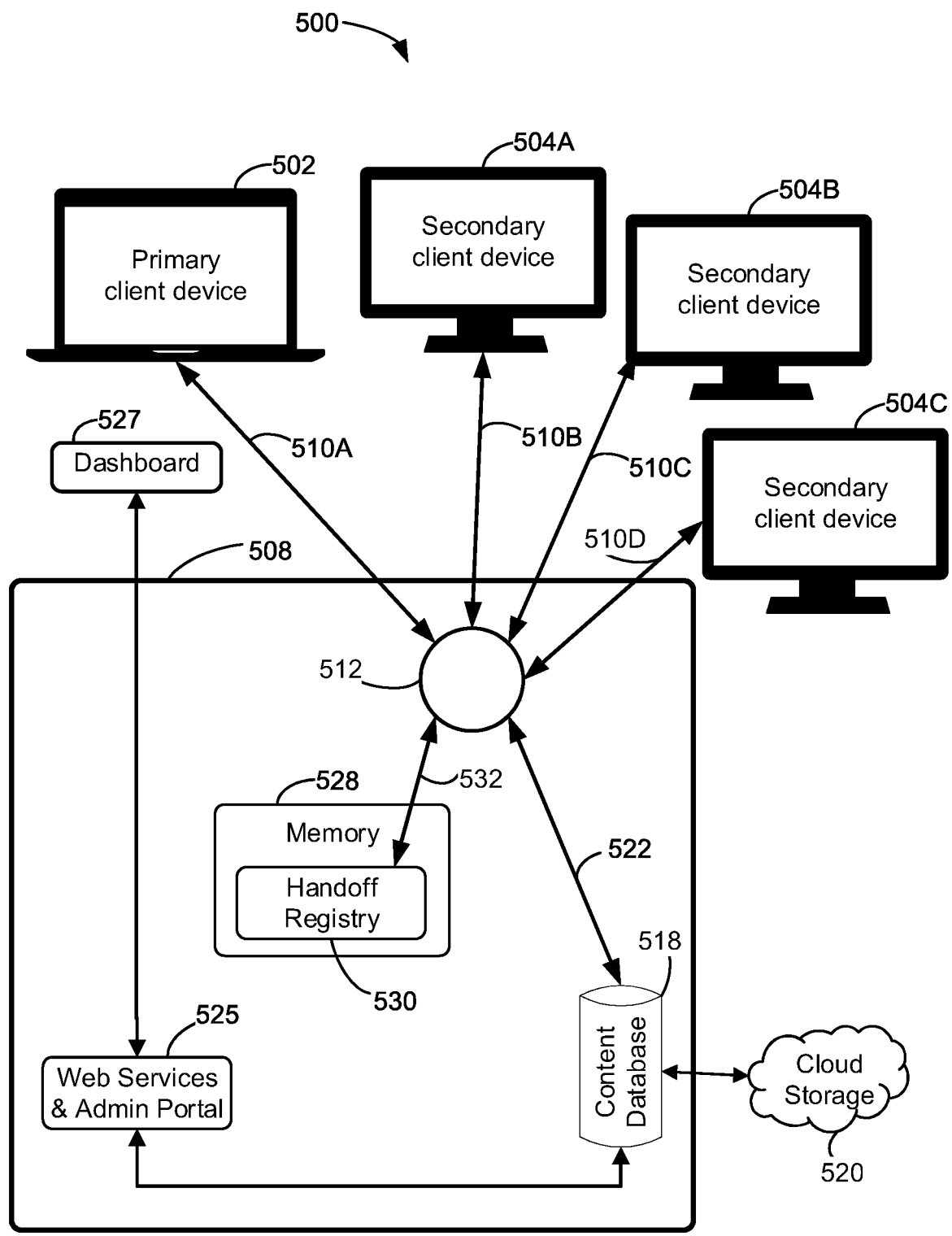
FIG. 5A is a block diagram of a system for synchronous delivery of secondary content, in accordance with an embodiment.

Now referring to FIG. 5A, illustrated therein is a system 500 for synchronous delivery of Secondary Syndicated Content across multiple client devices, according to an embodiment. The system includes a primary client device 502 for controlling the playout of Primary Source Content. The primary client device 502 includes a media player (not shown) for rendering Primary Source Content. The primary client device includes a timeline/activity feed application (not shown) for displaying Secondary Syndicated Content. The primary client device 502 is capable of internet connectivity and may be a computer, a smartphone, a tablet or a smart television.

The system 500 includes at least one secondary client device 504A. As depicted, the system 500 includes three secondary devices 504A, 504B, 504C. The secondary devices 504A, 504B, 504C are capable of internet connectivity and may be a computer, a smartphone, a tablet or a smart television. Each of the secondary client devices 504A, 504B, 504C includes a timeline/activity feed application (not shown) for displaying Secondary Syndicated Content.

The system 500 includes a core server 508. The core server 508 includes a content database 518 for storing Secondary Syndicated Content. According to another embodiment, the content database 518 may be located on another server connected to the core server 508. The core server includes a memory 528. The memory 528 includes a Handoff registry 530. The core server includes a web services & admin portal 525. The web services & admin portal 525 is connected to the content database 518.

The core server 508 includes a backend server transport dispatch 512. According to another embodiment, the backend server transport dispatch 512 may be located on another server connected to the core server 508. The backend server transport dispatch 512 is connected to the primary client device 502 through a WebSocket connection 510A over a communications network (not shown). The backend server transport dispatch 512 is connected to each of the secondary client devices 504A, 504B, 504C through a WebSocket connection 5106, 510C, 510D over a communications network (not shown). The backend server transport dispatch 512 is configured to subscribe each client device 502, 504A, 504B, 504C to a content channel 522 and a registry channel 532. Payloads sent from each device 502, 504A, 504B, 504C over the WebSocket connections 510A, 5106, 510C, 510D may be routed to the content database 518 via the content channel 522 or may be routed to the Handoff registry 530 via the registry channel 532. Secondary Syndicated Content stored on the content database 518 may be uploaded to each client device 502 504A, 504B, 504C subscribed to the content channel 522 over the WebSocket connections 510A, 5106, 510C, 510D.

The system 500 includes a dashboard web application 527 for allowing administrators and/or Primary Source Content owners access the Secondary Syndicated Content stored in the content database 518 via the web services & admin portal 525.

The system 500 may include a cloud storage 520 for backing up data stored in the content database 518. The cloud storage 520 is in connection with the content database 518. The cloud storage 520 may be located on a remote server.

Figure 5B:
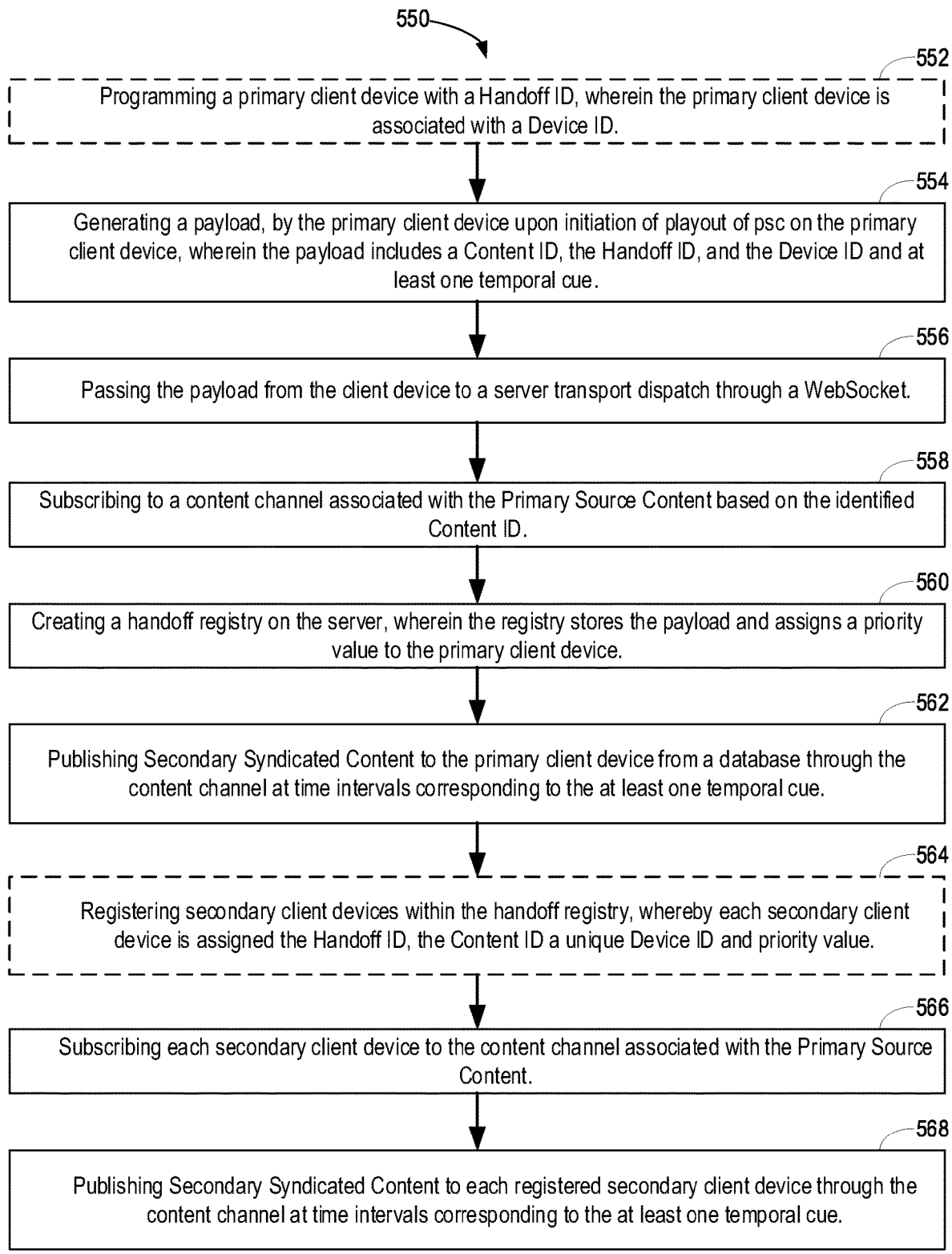
FIG. 5B is a flow chart of a method for synchronous delivery of secondary content, in accordance with an embodiment.

Referring to FIG. 5B, illustrated therein is a method 550 for synchronous delivery of Secondary Syndicated Content across multiple client devices, in accordance with an embodiment. The method 550 may be performed by the system 500 in FIG. 5A. The elements from FIG. 5A are identified in parenthesis for reference.

At 552, a primary client device (502) is programmed with a unique Handoff ID. The Handoff ID may be a user login, a 4-character PIN, a QR code, a string of character, and the like. The primary client device (502) is also associated with a Device ID. The Device ID may be the MAC address of the primary client device. Act 552, may only be performed on the first occasion the method 550 is implemented. Subsequently, Act 552 will not need to be performed unless the Handoff ID is lost, for example, when the primary client device (502) is reset or when a new user and/or different account uses the primary device (502) to implement the method 550.

At 554, a payload is generated by the primary client device upon the initiation of Primary Source Content playout on the primary client device (502). The payload includes the Handoff ID, the Device ID, a Content ID and at least one temporal cue. The Content ID may be an ACR-ID, URL, URI or database/directory reference associated to the Primary Source Content. The at least one temporal cue may be a timecode, a date-time stamp or a time-offset corresponding to a temporal position in the Primary Source Content. The Handoff ID and Device ID may be in a JavaScript Object Notation (JSON) format.

At 556, the payload is passed from the primary client device (502) to a server transport dispatch (512) over a WebSocket connection (510A).

At 558, the server transport dispatch (512) subscribes the primary client device (502) to a content channel (522) associated to the Content ID.

At 560, a Handoff registry (530) is created on the server memory (528). The server transport dispatch (512) subscribes the primary client device (502) to a registry channel (532) and passes the payload to the Handoff registry (530). An exemplary Handoff registry (530) is shown in FIG. 5C.

Now referring to FIG. 5C, the Handoff 530 registry stores a portion of the payload (i.e. the Content ID 536, Device ID 538 and Handoff ID 534). The Handoff registry 530 associates the primary client device that initiated the creation of the Handoff registry 530 with its corresponding Device ID 538 and the Content ID 536. As described above, the Content ID 536 is used to reference Primary Source Content that is currently being played-out or was last played on the primary client device 502. The Handoff registry 530 assigns a priority value 540 to the primary client device 502. The primary client device 502 is assigned the priority value 540 designating the primary client device as the single primary source to reference for Primary Source Content playout.

Referring back to FIG. 5B, at 562, Secondary Syndicated Content is published to the primary client device (502) from a database (518) through the content channel (522) at time interval(s) corresponding to the at least one temporal cue. The Secondary Syndicated Content is presented within the timeline/activity feed on the primary client device (502) at the time interval(s) corresponding to the at least one temporal cue. Once Secondary Syndicated Content is published to the primary client device (502), secondary client devices (504A, 504B, 504C) may register with the Handoff registry (530).

At 564, secondary client devices (504A, 504B, 504C) are registered within the Handoff registry (530). The server transport dispatch (512) subscribes each secondary client device (504A, 504B, 504C) to the registry channel (532). Each secondary client device (504A, 504B, 504C) is assigned the Handoff ID and the Content ID associated to the content channel (522) corresponding to the Primary Source Content. Each secondary client device (504A, 504B, 504C) has an associated Device ID (i.e. a MAC address). The Handoff registry (530) stores the Device ID for each secondary client device (504A, 504B, 504C) registered. The Handoff registry (530) assigns a priority value to each secondary client device. Each secondary client device is assigned a priority value designating the secondary client device (504A, 504B, 504C) as not the source to reference for Primary Source Content playout.

Act 564, may only be performed on the first occasion method 550 is implemented. Act 564 will not need to be performed unless the Handoff ID is lost, for example, when the client devices (502, 504A, 504B, 504C) are reset and/or when a new user/account uses the client devices (502, 504A, 504B, 504C) to implement the method 550.

At 566, each secondary client device (504A, 504B, 504C) registered to the Handoff registry (530) is subscribed to the content channel (522) associated with the Content ID.

At 568, Secondary Syndicated Content is published to each registered secondary client device (504A, 504B, 504C) through the content channel (522) at time intervals corresponding to the at least one temporal cue. An administrator and/or Primary Source Content owner may use a dashboard web application (527) to access the database (518) via a web services & admin portal (525) to manually publish Secondary Syndicated Content through the content channel (522) to each device (502, 504A, 504B, 504C) registered to the Handoff registry (530).

Following Act 568, the method 550 may conclude if playout of Primary Source Content on the primary client device is terminated. Otherwise, if playout of Primary Source Content is continued, subsequent payloads including subsequent temporal cues generated by the primary client device are received on the server 508 and associated Secondary Syndicated Content will be published to the secondary client devices so long as the secondary client device remains subscribed to the content channel (522).

In the implementation of method 550, each secondary client device (504A, 504B, 504C) is able to identify the Primary Source Content playout on the primary client device (502) and receive Secondary Syndicated Content in synchrony with the Primary Source Content being rendered on the primary client device (502). During playout of Primary Source Content, the primary client device (502) will continuously send the Content ID and temporal cues within payloads while subscribed to the content channel (522) according to, for example, Acts 312A-312F of method 300 in FIG. 3B. If the primary client device (502) changes the Primary Source Content playout (i.e. the primary client device starts to play different Primary Source Content that is associated with a different Content ID), the primary client device (502) and each secondary client device (504A, 504B, 504C) that are members of the Handoff registry will be subscribed to the new content channel (522) associated to the new Primary Source Content playout on the primary client device (502).

In the embodiments described below, media devices can recognize content being played on other devices and have that same content played on another device or multiple devices concurrently and in synchrony with the playout position of the media presentation. This includes devices adjusting changes to the content being played out, along with the adjusting the media playout to the position of the playout on another device with all devices in synchrony with the playout over a private or public network. Many of today's homes are inundated with connected devices and having a seamless and continual experience of content being played out as one transitions between the use of these devices is a common desire. Setting up an entertainment network is an arduous process of gathering disparate devices, applications, IP addresses, logins, navigation of content within devices, positioning to the last reference playout point/position, and configuring each component to talk to the others.

The systems and methods described below allow synchronization of audio and video playout, media presentations, along with synchronized commands directly to televisions and other devices on public and private networks with ease. The communication and interoperability between devices are managed through a publish and subscription model allowing devices of different types and in different locations to continuously playout media while a user transitions between different devices and applications seamlessly.

In a typical scenario a person could start watching a live television feed in one room, and resume that same television feed in another room seamlessly, or play on-demand video or music on a device such as a smart-phone while walking to their car and continue on a different type of device such as the in-car entertainment system exactly at the point of playout from the mobile device without having to manually adjust select the content or playout position the device that is being transitioned to, and vice versa.

Figure 5D:
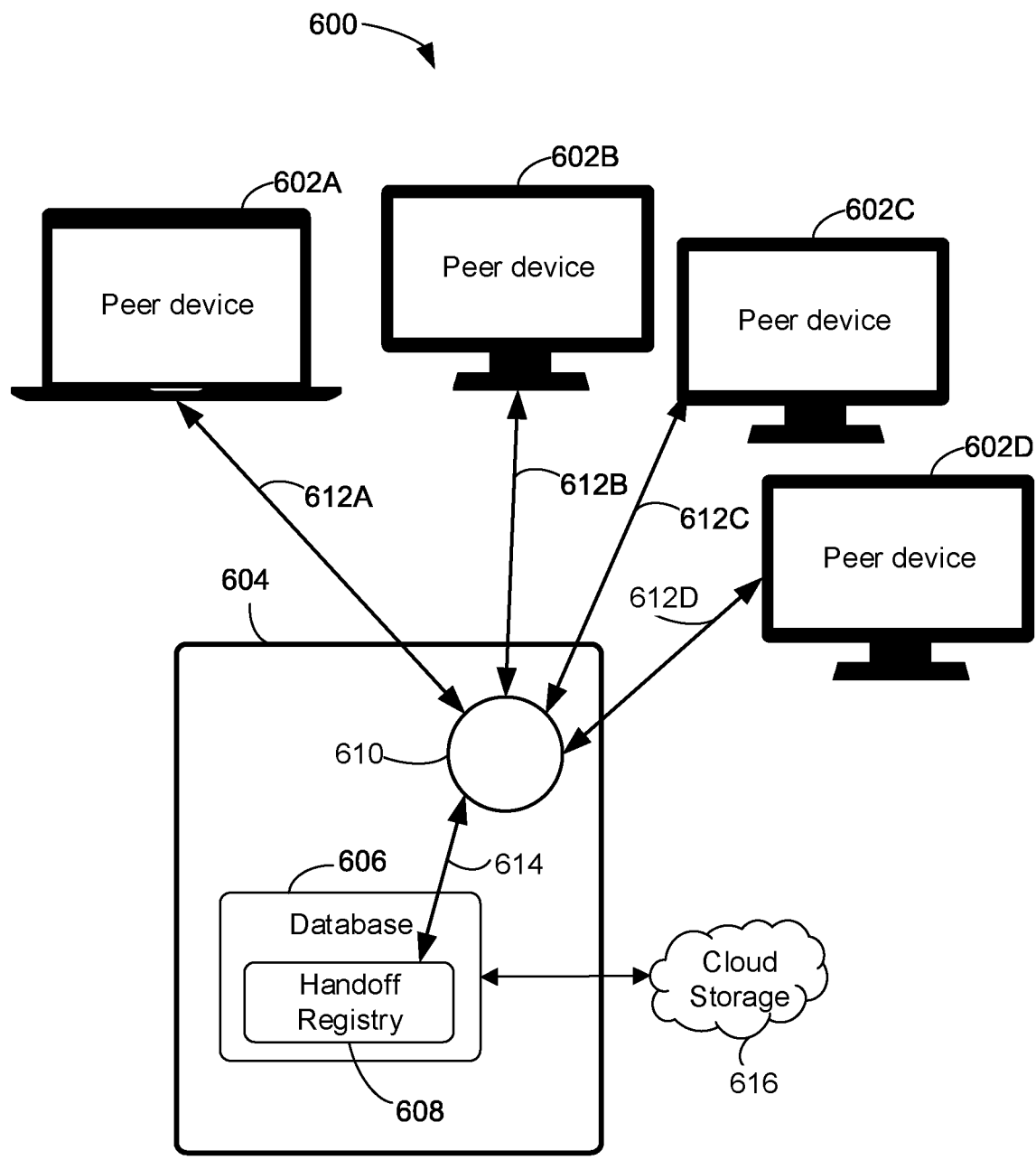
FIG. 5D is a block diagram of a system for synchronous playout of media content, in accordance with an embodiment.

Now referring to FIG. 5D, illustrated therein is a system 600 for synchronous playout of media content across multiple devices within a Handoff group, according to an embodiment. The system 600 is a peer-to-peer system.

The system 600 includes at least two peer devices 602A, 602B. As depicted, the system 600 includes four peer devices 602A, 602B, 602C, 602D. According to other embodiments, the system 600 may include a plurality of peer devices. The peer devices 602A, 602B, 602C, 602D are capable of internet connectivity and may include but are not limited to computers, TVs, set-top boxes, AV receivers, game consoles, mobile handheld devices, smartphones, tablets, smart speakers and automotive entertainment systems. Each peer device 602A, 602B, 602C, 602D includes a media player (not shown) for rendering media content.

The peer devices 602A, 602B, 602C, 602D are capable of rendering the same form of media content. For example, if the rendered media content includes images and/or video, all peer devices 602A, 602B, 602C, 602D include a display screen. For example, if the rendered media content is offline media content stored on a storage medium within the peer devices 602A, 602B, 602C, 602D, the offline media content is stored on each of the peer devices 602A, 602B, 602C, 602D.

The system 600 includes a core server 604. The core server includes a database 606. According to another embodiment the database 606 may be located on another server connected to the core server 604. The database 606 includes a Handoff registry 608 for storing identifiers related to the peer devices 602A, 602B, 602C, 602D and the media content being rendered.

The core server 508 includes a backend server transport dispatch 610. According to another embodiment, the backend server transport dispatch 610 may be located on another server connected to the core server 604. The backend server transport dispatch 610 is connected to each peer device 602A, 602B, 602C, 602D through a WebSocket connection 612A, 612B, 612C, 612D over a communications network (not shown). The backend server transport dispatch 610 is configured to subscribe the each peer device 602A, 602B, 602C, 602D to a sync channel 614. Payloads sent from each peer device 602A, 602B, 602C, 602D over the WebSocket connections 612A, 612B, 612C, 612D are routed to the Handoff registry 608 over the sync channel 614.

The system may include cloud storage 616 for backing up data stored in the database 606. The cloud storage 520 is in connection with the database 606. The cloud storage 616 may be a remote server.

Figure 5E:
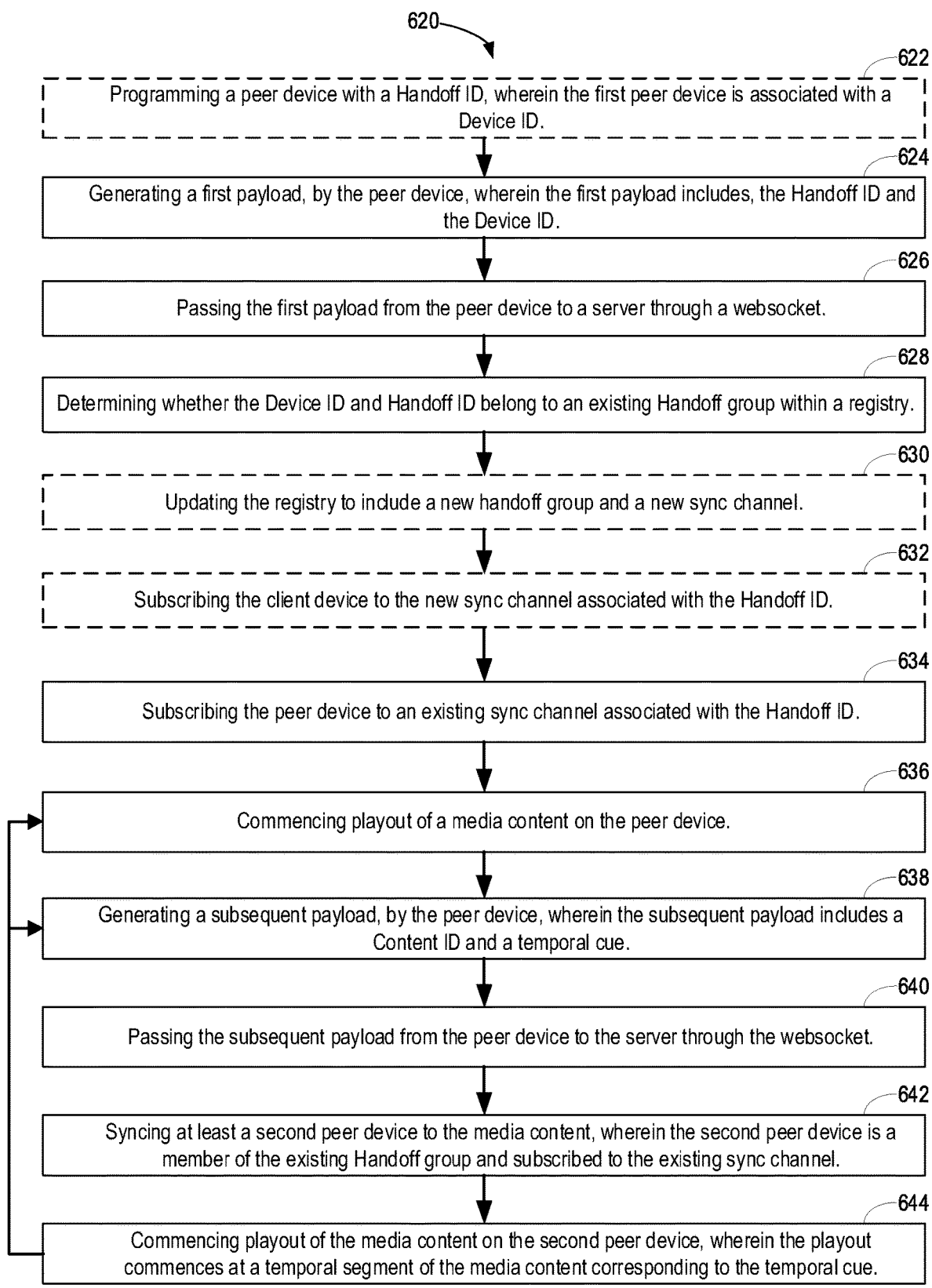
FIG. 5E is a flow chart of a method for synchronous playout of media content, in accordance with an embodiment.

Referring to FIG. 5E, illustrated therein is a method 620 for synchronous playout of media content across multiple devices within a Handoff group, according to an embodiment. The method 620 may be performed by system 600 in FIG. 5D. The elements from FIG. 5D are identified in parenthesis for reference.

At 622, a peer device (i.e. any one of 602A, 602B, 602C, 602D) is programmed with a unique Handoff ID. The Handoff ID may be a user login, a 4-character PIN, a QR code, a string of character, and the like. The peer device is also associated with a Device ID. The Device ID may be the MAC address of the first peer device. Act 652, may only be performed on the first occasion the method 620 is implemented. Subsequently, Act 622 will not need to be performed unless the Handoff ID is lost, for example, when the peer device is reset or when a new user and/or different account uses the peer device to implement the method 620.

At 624, a first payload is generated by the peer device. The first payload includes the Handoff ID and the Device ID. The Handoff ID and Device ID may be in a JavaScript Object Notation (JSON) format.

At 626, the first payload is passed from the peer device to a server database (606) Handoff registry (608) over a WebSocket connection (any one of 612A, 612B, 612C, 612D).

At 628, it is determined whether the Handoff ID and Device ID in the first payload is presently associated/registered to an existing Handoff group within the Handoff registry (608). If the Device ID of the peer device is registered as a member of an existing Handoff group with the same Handoff ID, the method 620 proceeds to Act 634.

At 630, if the Device ID of the peer device is not registered as a member of an existing Handoff group within the Handoff registry (608), the Handoff ID received in the first payload is used to initiate the creation of a new Handoff group and a new sync channel within the Handoff registry (608). Also, the Device ID may only be associated to a single Handoff group. If the Device ID is found to be registered to an existing Handoff group that is different than the Handoff ID included in the first payload, the Device ID is removed from the existing registration within the registry (608) and either a) initiates the creation of a new Handoff group and WebSocket connection (612A); or b) joins an existing Handoff group with the new WebSocket connection (612A) that matches the Handoff ID included in the first payload. Accordingly, the Handoff registry is updated to include the new Handoff group and new sync channel corresponding to the Handoff ID. Further authorization mechanisms, to authorize new peer devices/applications to join Handoff groups, can be employed to authorize new membership of peer devices to a Handoff group within the Handoff registry (608).

At 632, the peer device is subscribed to the new sync channel associated with the Handoff ID. Acts 630 and 632, may only be performed on the first occasion the method 620 is implemented. Subsequently, Acts 630 and 632 may not need to be performed unless the Handoff ID is lost, for example, when the peer device (602A) is reset or when a new user and/or different account uses the peer device (602A) to implement the method 620.

At 634, if the Handoff ID of the peer device was found to be an associated/registered to an existing Handoff group at Act 628, the peer device is subscribed to an existing sync channel associated with the Handoff ID.

At 636, playout of media content is commenced on the peer device.

At 638, a subsequent payload is generated by the peer device. The subsequent payload includes a Content ID and a temporal cue. The Content ID may a URL, a URI or a database/directory reference associated to the media content rendered on the peer device. The temporal cue may be a timecode, a date-time stamp or a time-offset corresponding to a temporal position in the media content.

At 640, the subsequent payload is passed from the peer device to a server database (606) Handoff registry (608) over a WebSocket connection (612A) subscribed to the existing sync channel.

At 642, at least a second peer device (any one of 602A, 602B, 602C, 602D that have already performed Acts 622, 624, 626, 628 and 634) is synced to the media content. The second peer device (602B, 602C, 602D) is a member of the existing Handoff group and is subscribed to the existing sync channel. As noted above, the second peer device (602B, 602C, 602D) can render the form of media content associated with the Content ID and played-out on the peer device. The second peer device retrieves the temporal cue from the Handoff registry.

At 644, playout of the media content is commenced on the second peer device at a temporal segment of the media content corresponding to the temporal cue.

Once, Act 644 is performed, the method 620 may terminate when one of the peer devices stops playout of the media content. Otherwise, if media content playout continues, the method 620 may revert to Act 638. If new media content is commenced by a peer device, the method 620 reverts to Act 636.

Now referring to FIG. 5F, illustrated therein is an exemplary Handoff registry at three instances 650A, 650B, 650C. The Handoff registry includes the Handoff ID 656, corresponding to a Handoff group, the sync channel ID 658, the Device ID 600, the Content ID 662 the last temporal cue 664 (i.e. a temporal cue received in an earlier payload) and the current temporal cue (i.e. the temporal cue received in a latter payload). In all three instances 650A, 650B, 650C, the peer devices 602A, 602B, 602C, 602D have all performed the method 620 and are members of the same Handoff group according to the Handoff ID 656 and are subscribed to the same sync channel 658. In instance 650A, all peer devices are playing-out media content associated with Content ID 662. In instance 650B peer device 602B switches to new media content associated with the Content ID:2 (shown shaded). In instance 650C, peer devices 602A, 602C, 602D have synced their Content ID:2.

System 600 in FIG. 5D and method 620 in FIG. 5E are embodiments whereby there are no primary or secondary devices within a Handoff group as all devices are peers. Whichever peer device has sent the last command or any change in the media content being presented, or change in the temporal position of the playout of media content being presented, is immediately published to all subscribed devices to the Handoff group sync Channel, that in turn apply those commands locally on each peer device updating the media content playout in synchrony with all other members of the Handoff group. Hence, a practical application of system 600 and method 620 may be, for example, a user playing a music on-demand from an internet directory on a smart speaker, will continue that same media playout in their car entertainment systems without having to manually adjust the media player to find the content or adjust playout of the media to the current position of music being played on the smart speaker, if those devices are registered and subscribed to the same Handoff group sync Channel. This allows for a continuum of the media presentation across multiple devices that is seamless for a user as they transition across devices.

While the above description provides examples of one or more apparatus, methods, or systems, it will be appreciated that other apparatus, methods, or systems may be within the scope of the claims as interpreted by one of skill in the art.

Figure 6A:
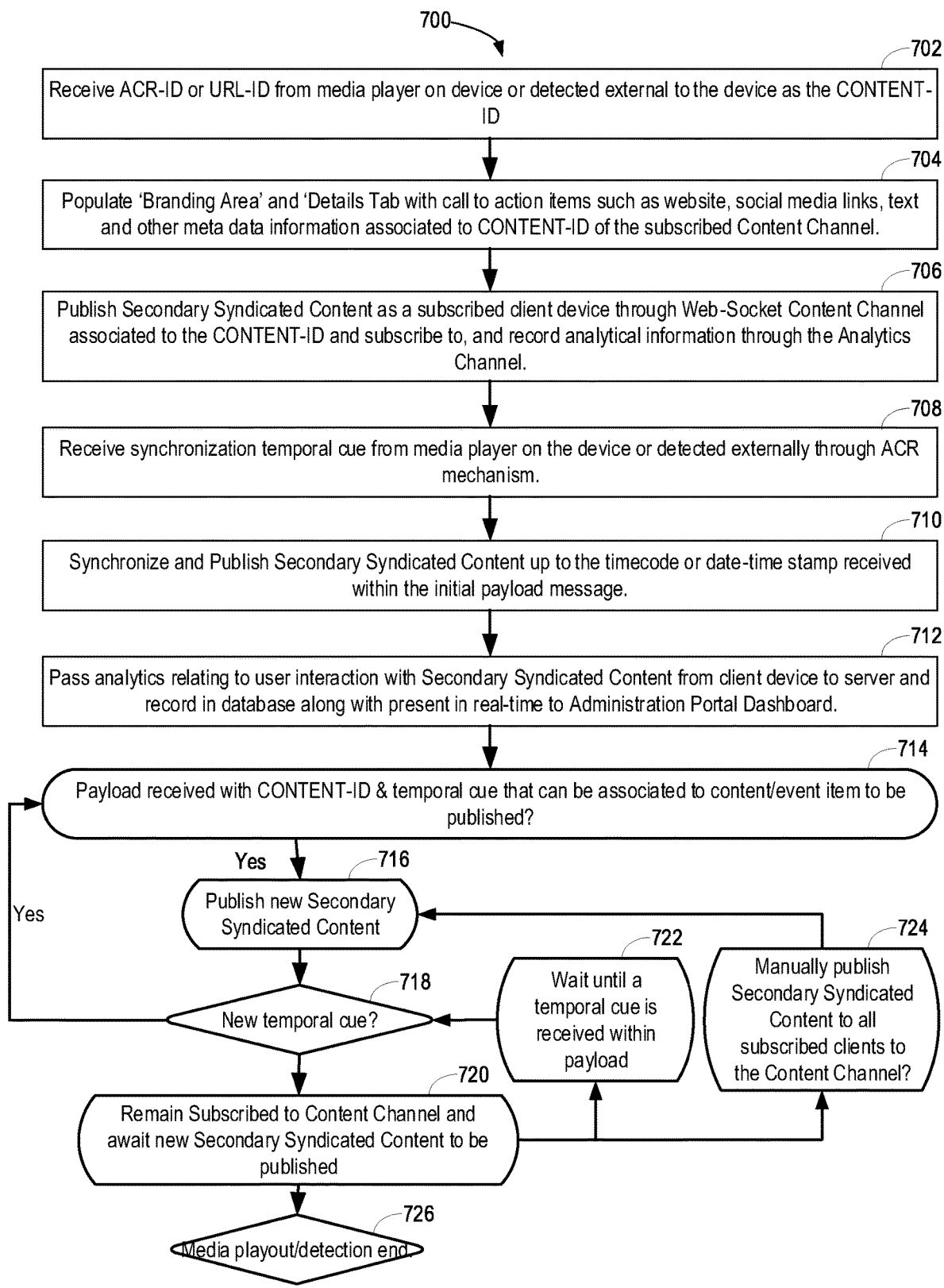
FIG. 6A is a flow chart of a method for providing secondary content in an activity feed, in accordance with an embodiment.

Referring to FIG. 6A, illustrated therein is a method 700 for providing Secondary Syndicated Content in a timeline/activity feed after discovering Primary Source Content on a client device and subscribing to a content channel. The method 700 may be performed by system 100 in FIG. 3A or system 400 in FIG. 4A. The elements from FIG. 4a are identified in parenthesis for reference.

At 702 an ACR-ID (406) or URL-ID is received from a media player on a client device (404) or detected from an external device (402) as the Content ID. The Content ID is associated to Primary Source Content discovered by the client device (404). The device (404) is subscribed to a Websocket (410) content channel (422) associated with the Content ID.

At 704 a 'Branding Area' of a timeline/activity feed on the client device (404) is populated with image, video or audible Secondary Syndicated Content. A Details Tab of the timeline/activity feed on the client device (404) is populated with call to action items such as website, social media links, text and other meta data information associated to the Content ID of the subscribed Content Channel (422).

Figure 6B:
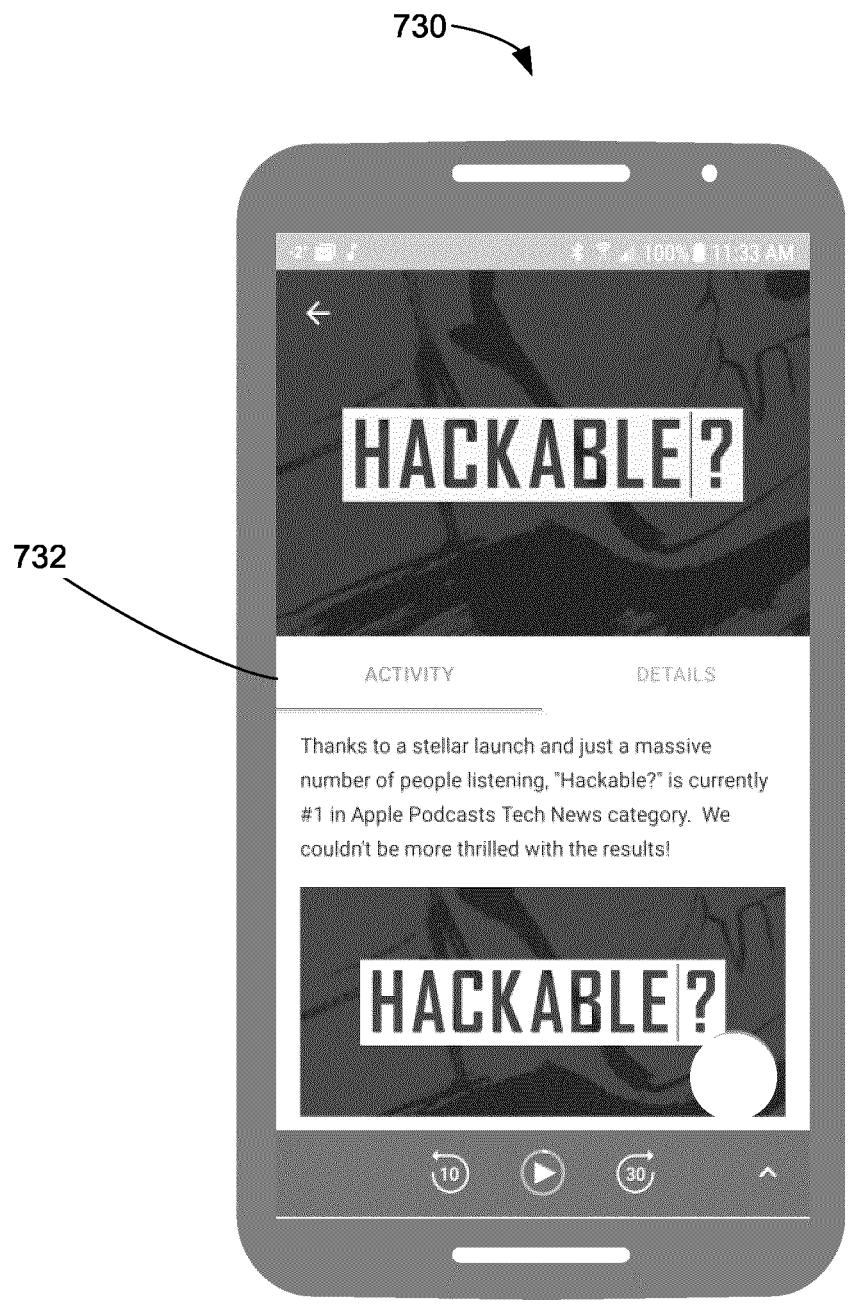
FIGS. 6B to 6D are mobile devices displaying secondary content in an activity feed, in accordance with an embodiment.

Now referring to FIG. 6B, illustrated therein is an exemplary timeline/activity feed 732 on a client device 730. The client device 730, may be the client device 404 in FIG. 4A. The timeline timeline/activity feed 732 may be an application with a user interface. A user of client device 730 may interact with the timeline timeline/activity feed 732 by, for example, scrolling through, viewing, and selecting items presented within the user interface including audio, video or audible Secondary Syndicated Content and website links, social media links, text and other meta data information associated to the Content ID (i.e. the Content ID of method 700 discussed above).

Figure 6C:
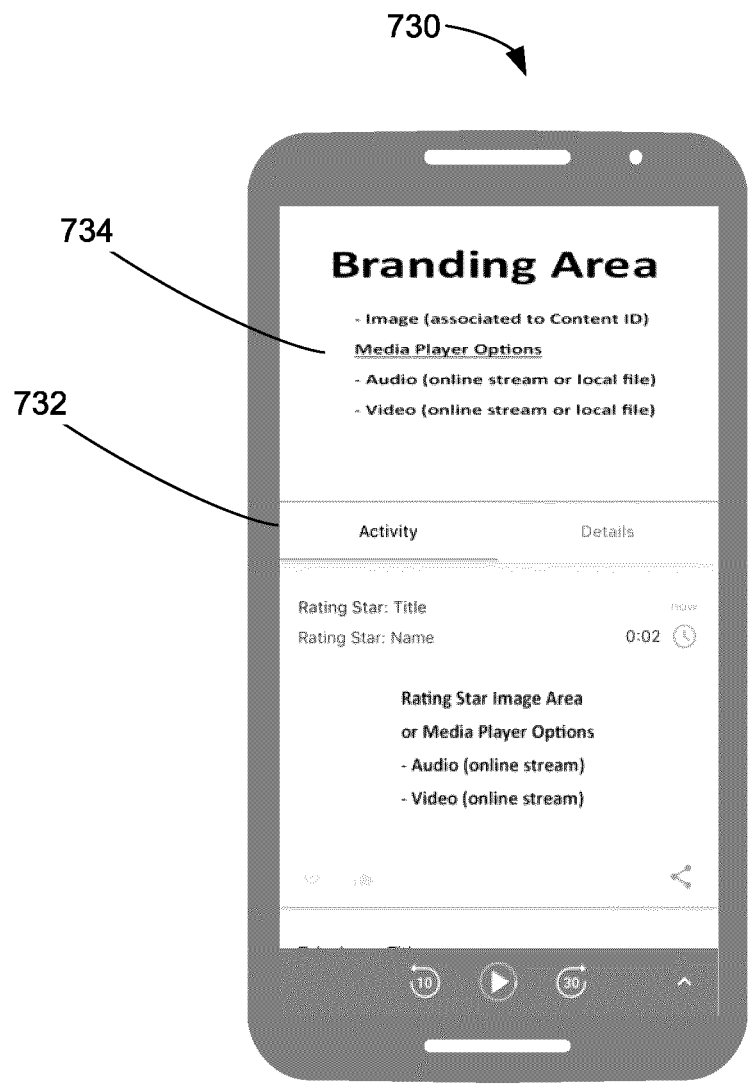

Now referring to FIG. 6C illustrated therein is an exemplary Branding Area 734 of a timeline/activity feed on a client device 730. The client device 730, may be the client device 404 in FIG. 4A. The Branding Area 734 appears within the timeline timeline/activity feed 732. The Branding Area 734 displays image, video or audible Secondary Syndicated Content that may be viewed by a user of client device 730.

Figure 6D:
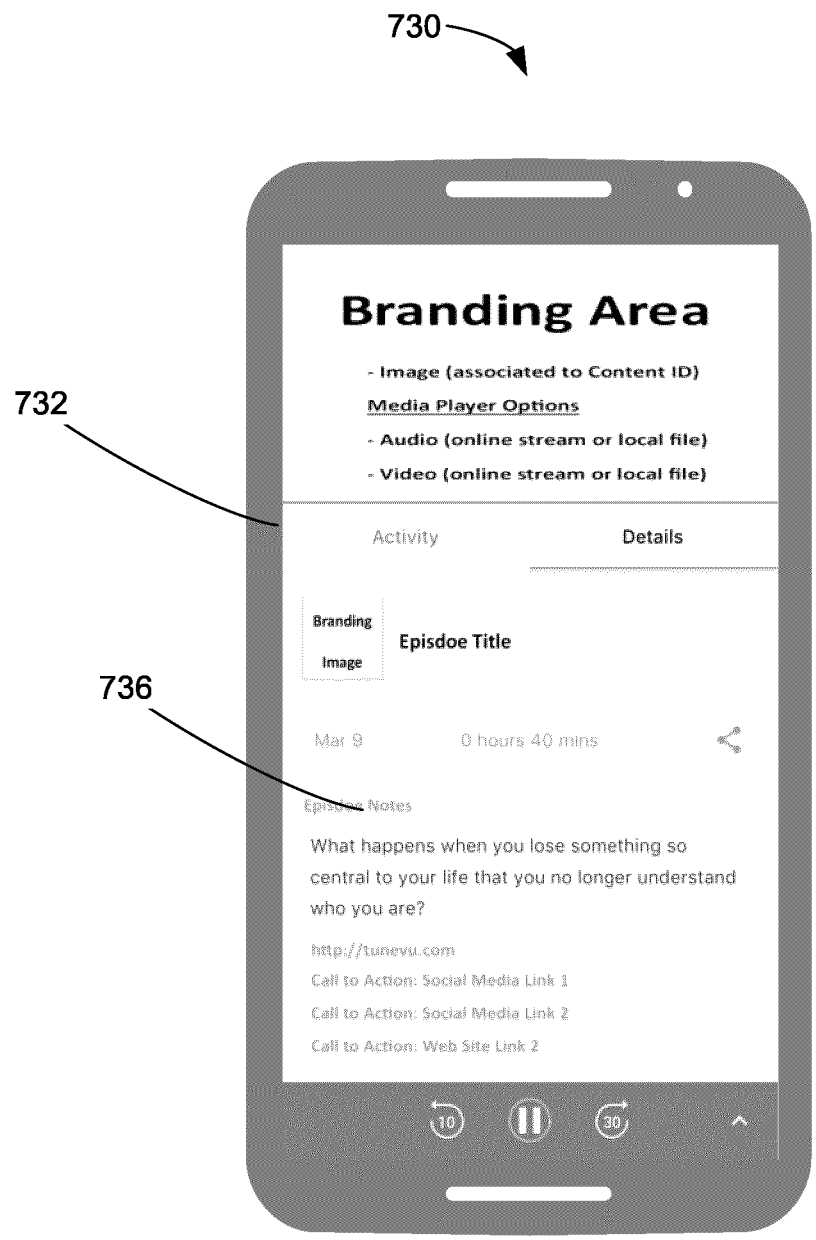

Now referring to FIG. 6D illustrated therein is an exemplary Details Tab 736 of a timeline/activity feed 732 on a client device 730. The client device 730, may be the client device 404 in FIG. 4A. The Details Tab 736 appears within the timeline timeline/activity feed 732. The Details Tab 736 displays website links, social media links, text and other meta data information associated to the Content ID (i.e. the Content ID of method 700 discussed above).

Referring back to FIG. 6A, at 706 Secondary Syndicated Content is published to the subscribed client device (404) through the WebSocket (410) Content Channel (422) associated to the Content ID. The client device (404) is subscribed to an analytics channel (424), and analytics information is passed from the client device (404) through the analytics channel (424).

Still referring to FIG. 6A, at 708 a temporal cue sent from a media player on the client device (404) or detected externally through ACR mechanism (406) is received at a server (408). The temporal cue may be a timecode, date-time stamp or time-offset corresponding to a temporal segment Primary Source Content.

At 710, the server (408) published Secondary Syndicated Content to the client device (404) up to the temporal cue received at Act 708. That is the Secondary Syndicated Content published at Act 710 is synchronized to the temporal segment(s) of Primary Source Content corresponding to the temporal cue. The synchronizing and publishing of Secondary Syndicated Content at may be repeated according Acts 714 to 724.

At 712 as a user of client device (404) navigates and scrolls through the timeline/activity feed, analytics related to user interaction with Secondary Syndicated Content are passed from the client device (404) to the server (408) over the WebSocket (410) analytics channel (424) and stored in an analytics database (416). The analytics stored in the database (416) may be viewed by an administrator/Primary Source Content owner in real-time on a dashboard web application (427) through an admin portal (425) to access the analytics database (416).

At 714, if the subsequent payload includes a Content ID and temporal cue that is associated with Secondary Syndicated Content that can be published (i.e. Secondary Syndicated Content corresponding to the Content ID and temporal cue), the Secondary Syndicated Content is published at 716. At 718, if a new temporal cue is received, the method 700 reverts to Act 714 and also remains subscribed to the content channel (422) to await subsequent Secondary Syndicated Content to be published (Act 720) and waits until a temporal cue is received within a subsequent payload (Act 722). According to an embodiment, the method 700 may include manual publishing of Secondary Syndicated Content by an administrator/Primary Source Content owner at 724.

At 726, a subsequent payload including a termination temporal cue is received. The termination temporal cue corresponds with the termination of Primary Source Content playout and/or the temporal end point of the Primary Source Content.

Figure 7A:
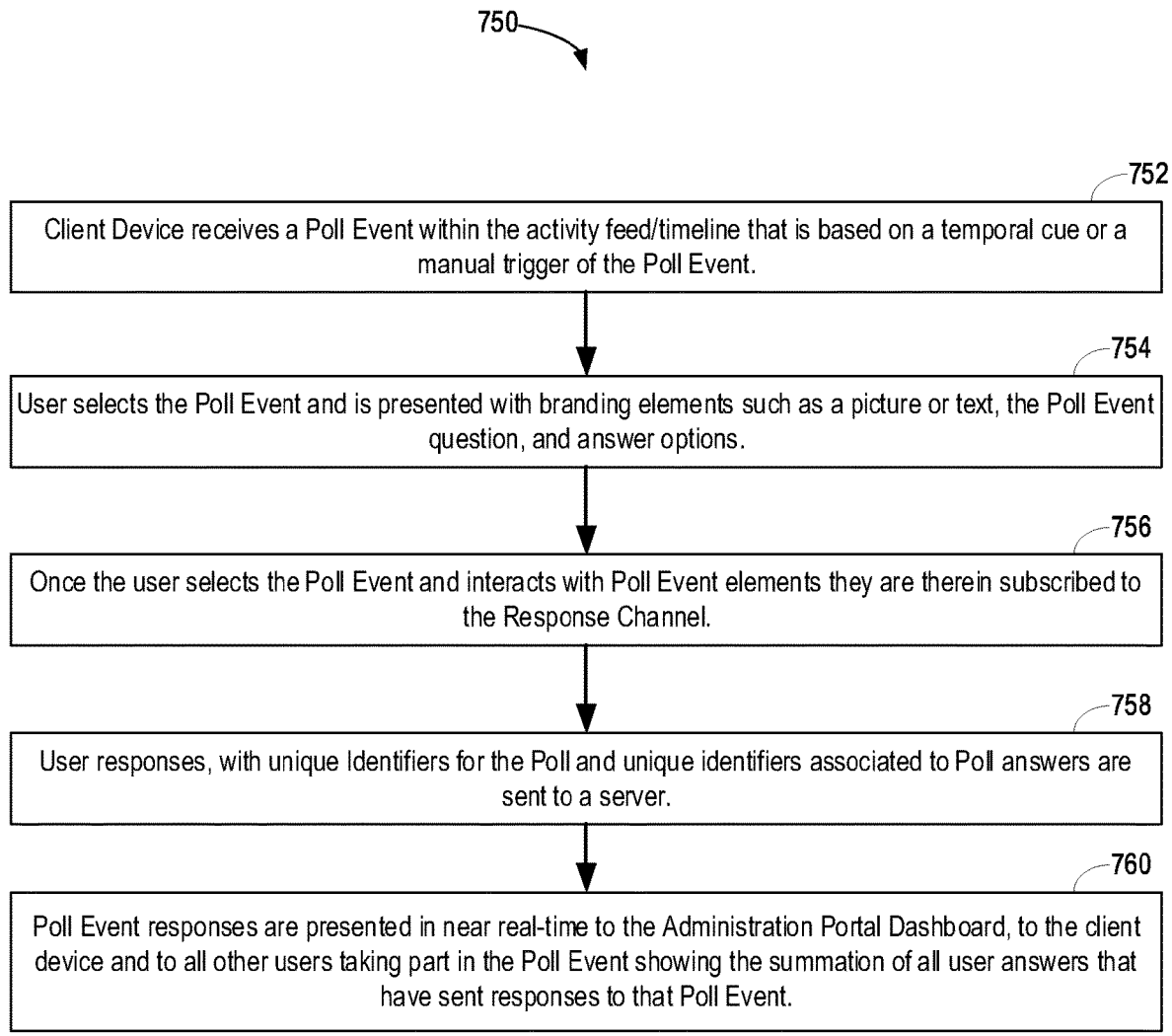
FIG. 7A is flow chart of a method for secondary content of a poll event, in accordance with an embodiment.

Referring to FIG. 7A, illustrated therein is a method 750 for providing Secondary Syndicated Content in the form of a Poll Event. The method 750 may be performed by system 100 in FIG. 3A or system 400 in FIG. 4A. The elements from FIG. 4a are identified in parenthesis for reference.

At 752, a client device (404) that is subscribed to Content Channel (422) receives Secondary Syndicated Content in the form of a Poll Event within an activity feed/timeline. The Poll Event is based on a temporal cue in Primary Source Content or a manual trigger of the Poll Event.

At 754 a user on the client device (404) selects the Poll Event and is presented with branding elements such as a picture or text, the Poll Event question, and answer options.

Figure 7B:
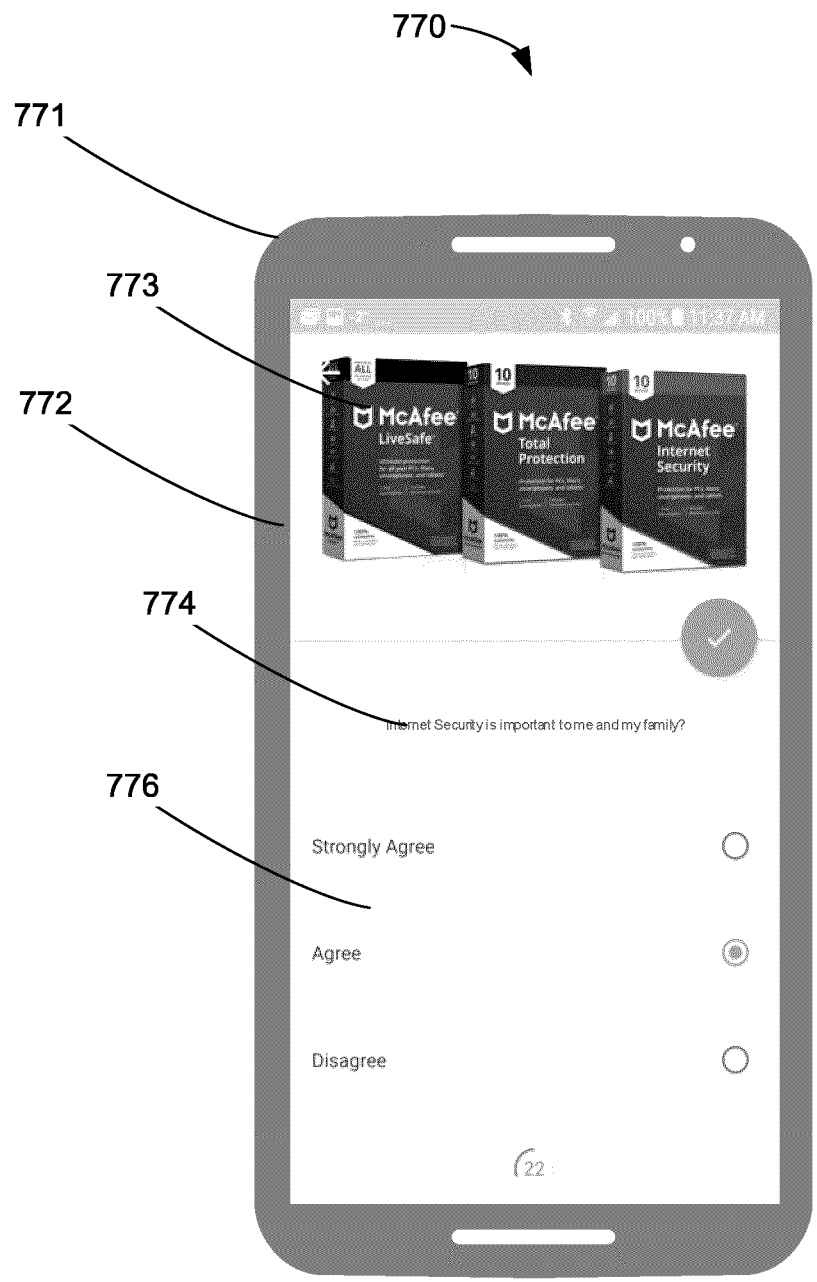
FIGS. 7B and 7C are mobile devices displaying secondary content as a poll event, in accordance with an embodiment.

Now referring to FIG. 7B, illustrated therein is an exemplary Poll Event 770 in a timeline/activity feed 772 on a client device 771. The client device 771, may be the client device 404 in FIG. 4A. The Poll Event 770 includes branding elements 773 including pictures and/or text displayed within the timeline/activity feed 772. The Poll Event 770 includes a poll question 774. The Poll Event 770 includes answer options 776.

Referring back to FIG. 7A, at 756, once the user selects the Poll Event and interacts with Poll Event elements the client device (404) is subscribed to a Websocket (410) response channel (426).

At 758, User responses with unique identifiers for the Poll and unique identifiers associated to elements within the Poll Event (i.e. poll answers) are sent to a server (408) over the response channel (426) and stored in a responses database (414).

At 760, Poll Event responses are presented in near real-time to a dashboard (427) web application, to the client device (404) and to all other users taking part in the Poll Event showing the summation of all user answers that have sent responses to that Poll Event.

Figure 7C:

Now referring to FIG. 7C illustrated therein is an exemplary Poll Event 770 showing poll event responses 778 within a timeline/activity feed 772 on a client device 771. The client device 771, may be the client device 404 in FIG. 4A.

Referring back to FIG. 7A, During the execution of method 750, as a user interacts with Poll Event elements, user and device analytics may be sent to the server (408) at any or all acts of method 750. The user and device analytics are passed from the client device (404) to the server (408) over the WebSocket (410) analytics channel (424) and stored in an analytics database (416). The analytics relating to the Poll Event stored in the analytics database (416) may be viewed by an administrator/Primary Source Content owner in real-time on a dashboard web application (427) through an admin portal (425) to access the analytics database (416).

Figure 8A:
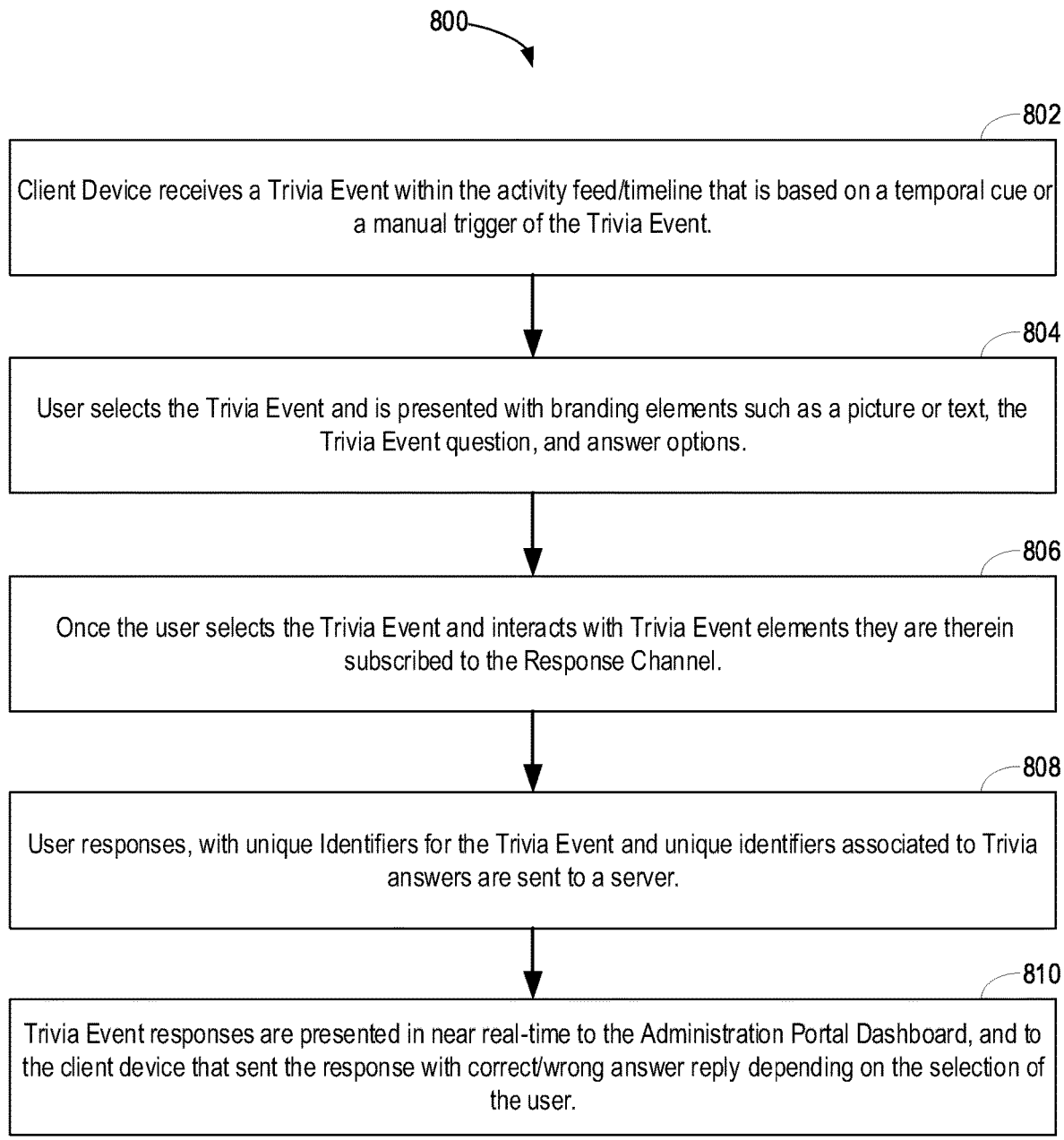
FIG. 8A is flow chart of a method for secondary content of a trivia event, in accordance with an embodiment.

Referring to FIG. 8A, illustrated there is a method 800 for providing Secondary Syndicated Content in the form of a Trivia Event. The method 800 may be performed by system 100 in FIG. 3A or system 400 in FIG. 4A. The elements from FIG. 4a are identified in parenthesis for reference.

At 802, client device (404) that is subscribed to a content channel (422) receives Secondary Syndicated Content in the form of a Trivia Event within an activity feed/timeline. The Trivia Event is based on a temporal cue in Primary Source Content or a manual trigger of the Trivia Event.

At 804, a user on the client device (404) selects the Trivia Event and is presented with branding elements such as a picture or text, the Trivia Event question, and answer options.

Figure 8B:
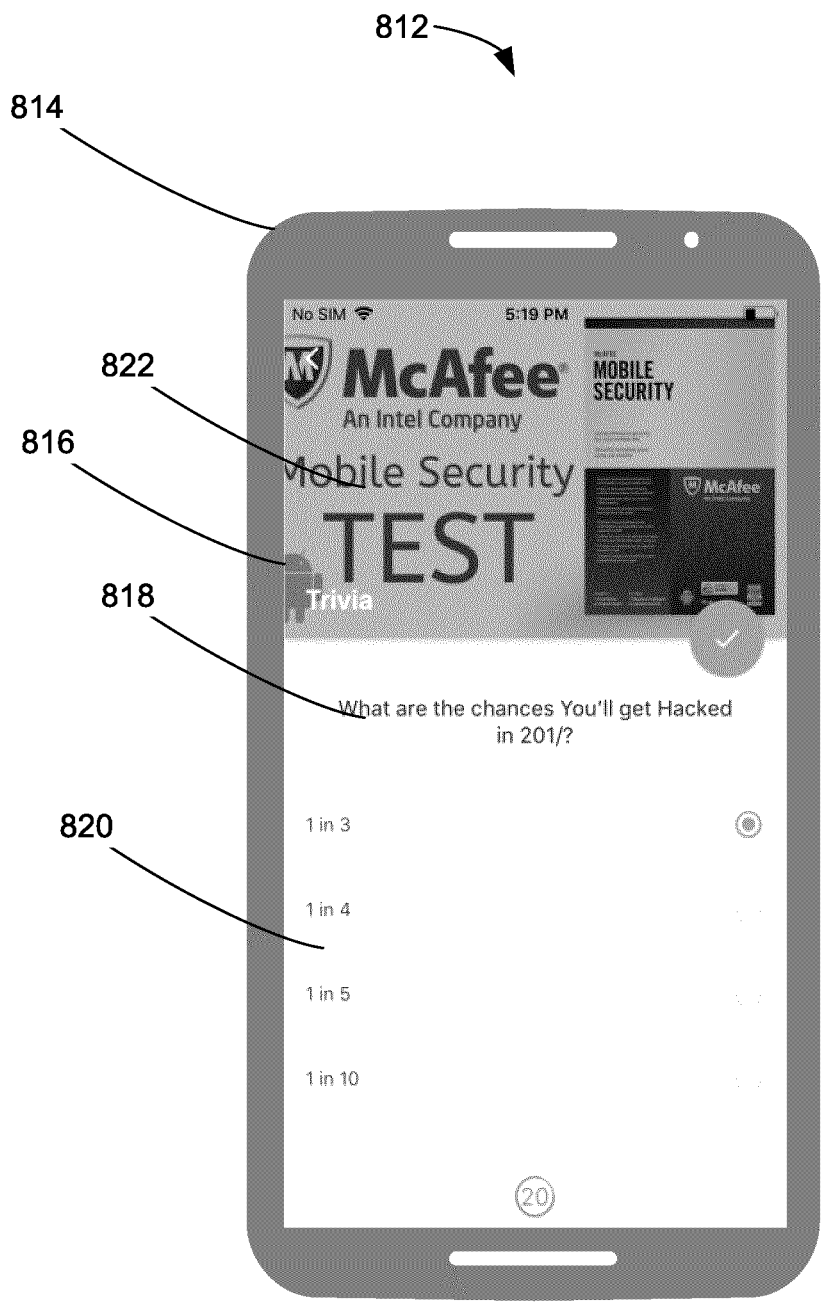
FIGS. 8B and 8C are mobile devices displaying secondary content of a trivia event, in accordance with an embodiment.

Now referring to FIG. 8B, illustrated therein is an exemplary Trivia Event 812 within a timeline/activity feed 816 on a client device 814. The client device 814, may be the client device 404 in FIG. 4A. The Trivia Event 812 includes branding elements 822 including pictures and/or text displayed within the timeline/activity feed 816. The Trivia Event 812 includes a poll question 818. The Trivia Event 812 includes answer options 820.

Referring back to FIG. 8A, at 806, once the user selects the Trivia Event and interacts with Trivia Event elements the client device (404) is subscribed to the response channel (426).

At 808, with unique identifiers for the Trivia Event and unique identifiers associated to elements within the Trivia Event (i.e. trivia answers) are sent to a server (408) over the response channel (426) and stored in a responses database (414).

At 810, Trivia Event responses are presented in near real-time to a dashboard (427) web application, to the client device (404) and to all other users taking part in the Trivia Event showing the summation of all user answers that have sent responses to that Trivia Event.

Figure 8C:
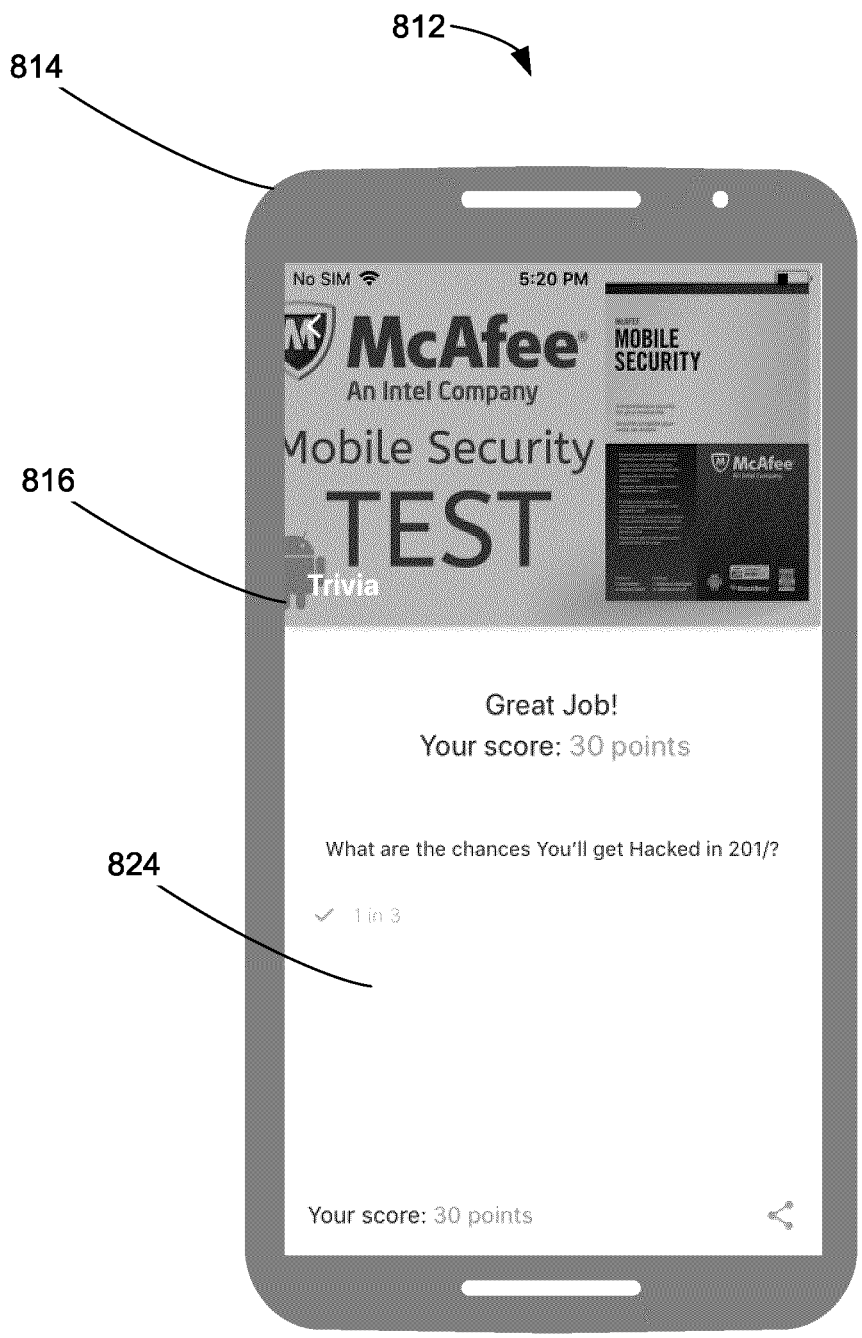

Now referring to FIG. 8C illustrated therein is an exemplary Trivia Event 812 showing poll event responses 824 within a timeline/activity feed 816 on a client device 814. The client device 814, may be the client device 404 in FIG. 4A.

Referring back to FIG. 8A, During the execution of method 800, as a user interacts with Trivia Event elements, user and device analytics may be sent to the server (408) at any or all acts of method 800. The user and device analytics are passed from the client device (404) to the server (408) over the WebSocket (410) analytics channel (424) and stored in an analytics database (416). The analytics relating to the Trivia Event stored in the analytics database (416) may be viewed by an administrator and/or Primary Source Content owner in real-time on a dashboard web application (427) through an admin portal (425) to access the analytics database (416).

Figure 9A:
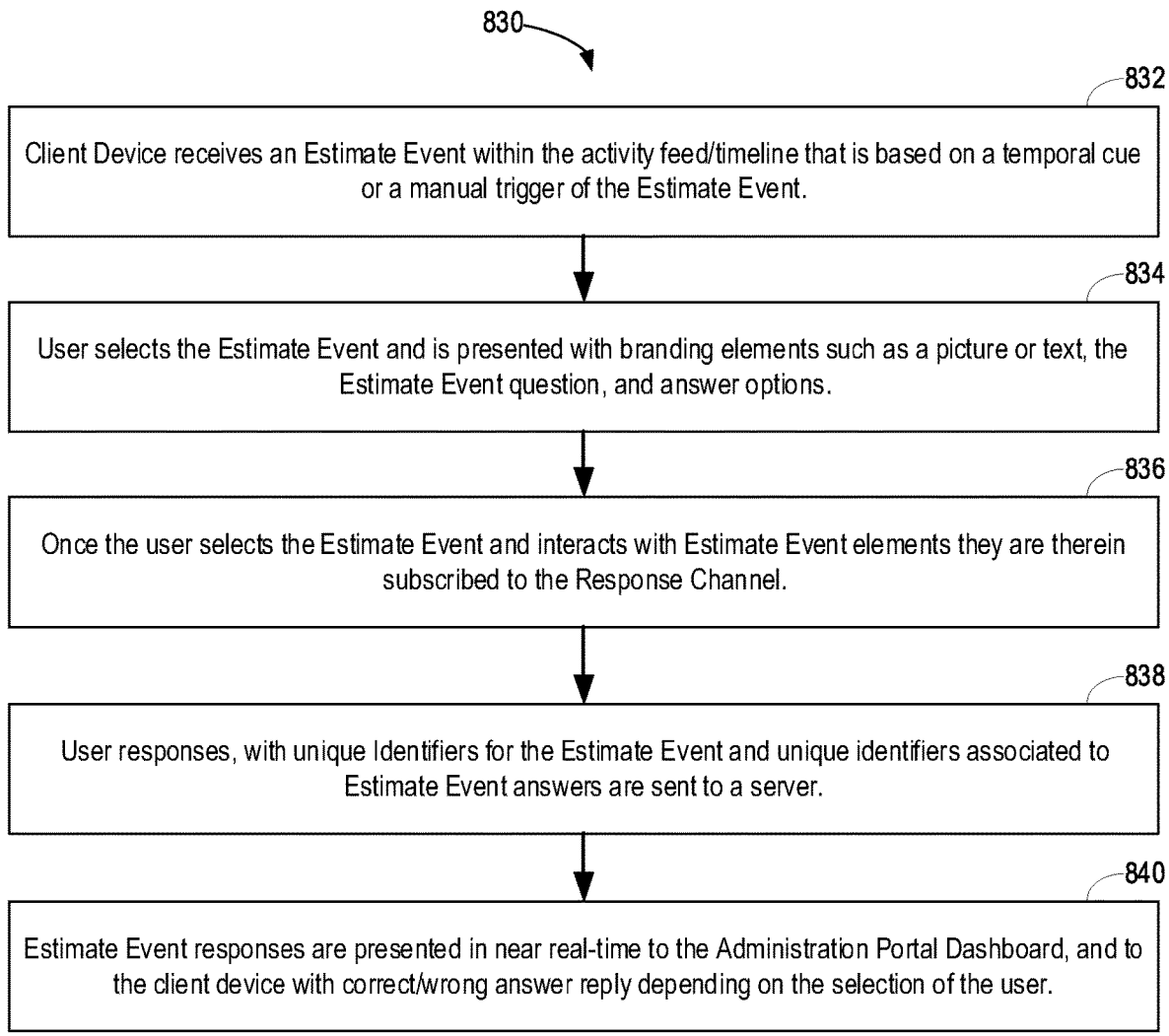
FIG. 9A is flow chart of a method for secondary content of an estimate event, in accordance with an embodiment.

Referring to FIG. 9A, illustrated therein is a method 830 for providing Secondary Syndicated Content in the form of an Estimate Event within an activity feed/timeline. The method 830 may be performed by system 100 in FIG. 3A or system 400 in FIG. 4A. The elements from FIG. 4*a* are identified in parenthesis for reference.

At 832, a client device (404) that is subscribed to Content Channel (422) receives Secondary Syndicated Content in the form of an Estimate Event within an activity feed/timeline. The Estimate Event is based on a temporal cue in Primary Source Content or a manual trigger of the Estimate Event.

At 834, a user on the client device (404) selects the Estimate Event and is presented with branding elements such as a picture or text, the Estimate Event question, and answer options.

Figure 9B:
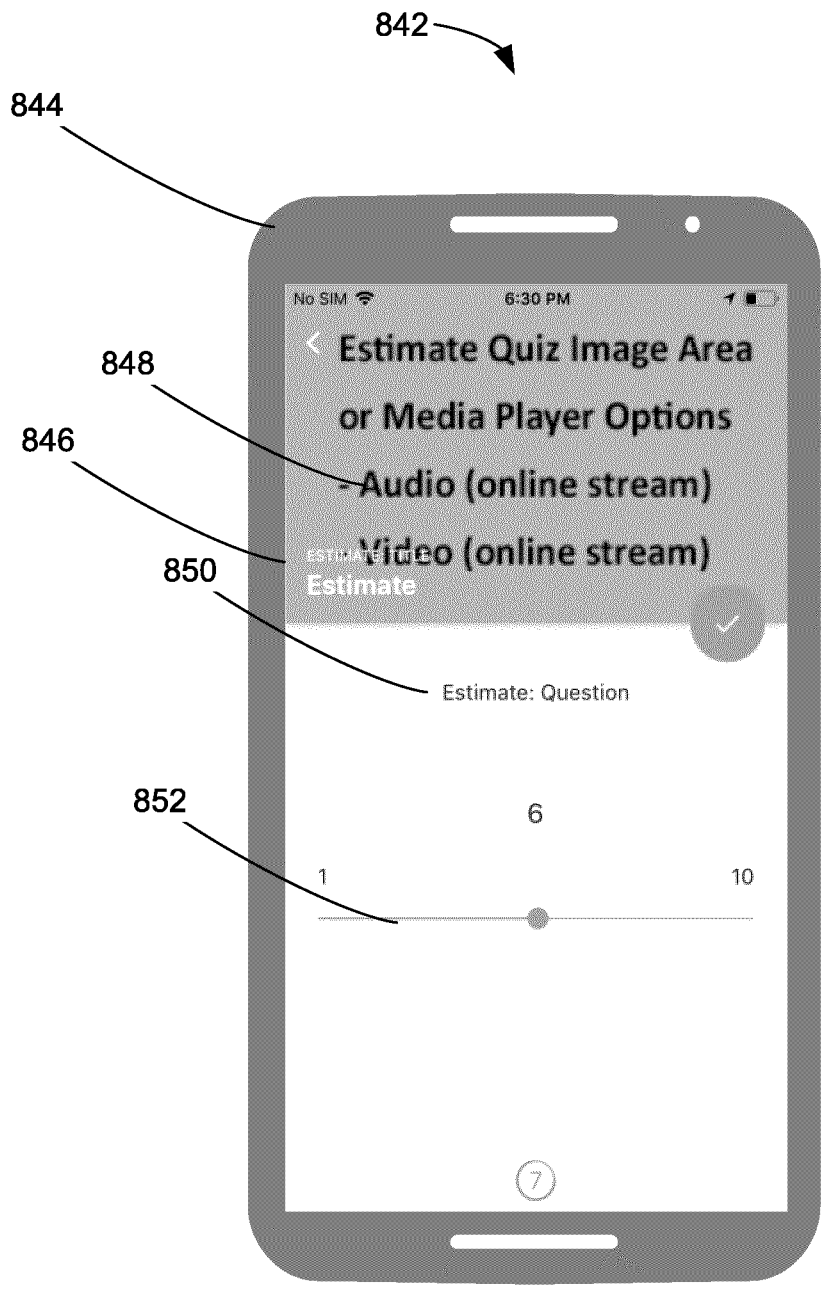
FIGS. 9B and 9C are mobile devices displaying secondary content of an estimate event, in accordance with an embodiment.

Now referring to FIG. 9B, illustrated therein is an exemplary Estimate Event 842 in a timeline/activity feed 846 on a client device 844. The client device 844, may be the client device 404 in FIG. 4A. The Estimate Event 842 includes branding elements 848 including pictures and/or text displayed within the timeline/activity feed 846. The Estimate Event 842 includes an Estimate Event question 850. The Estimate Event 842 includes answer options 852.

Referring back to FIG. 9A, at 836 once the user selects the Estimate Event and interacts with Estimate Event elements the client device (404) is subscribed to a Websocket (410) response channel (426).

At 838, user responses with unique identifiers for the Estimate Event and unique identifiers associated to elements within the Estimate Event (i.e. estimate answers) are sent to a server (408) over the response channel (426) and stored in a responses database (414).

At 840, Estimate Event responses are presented in near real-time to a dashboard (427) web application, to the client device (404) and to all other users taking part in the Estimate Event showing the summation of all user answers that have sent responses to that Estimate Event.

Figure 9C:
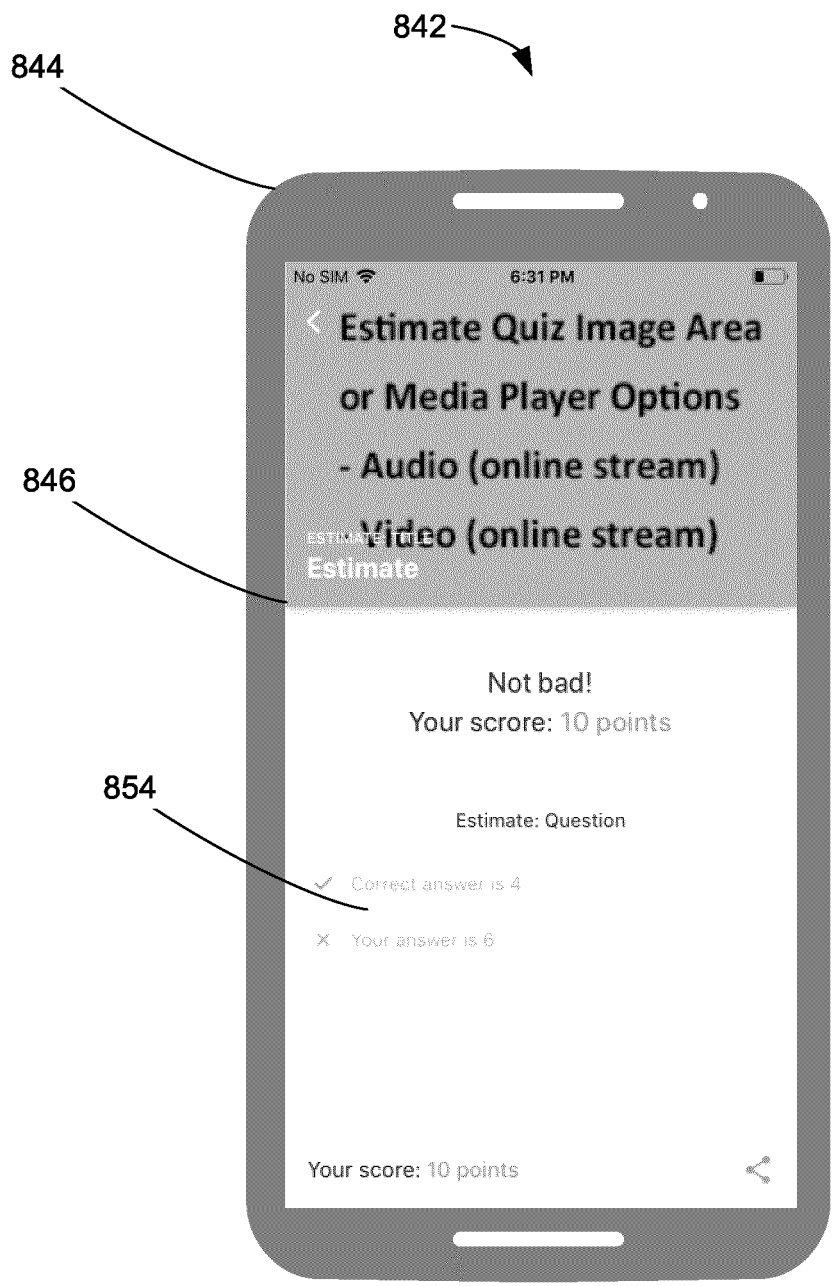

Now referring to FIG. 9C illustrated therein is an exemplary Estimate Event 842 showing Estimate Event responses 854 within a timeline/activity feed 846 on a client device 844. The client device 844, may be the client device 404 in FIG. 4A.

Referring back to FIG. 9A, During the execution of method 830, as a user interacts with Estimate Event elements, user and device analytics may be sent to the server (408) at any or all acts of method 750. The user and device analytics are passed from the client device (404) to the server (408) over the WebSocket (410) analytics channel (424) and stored in an analytics database (416). The analytics relating to the Estimate Event stored in the analytics database (416) may be viewed by an administrator/Primary Source Content owner in real-time on a dashboard web application (427) through an admin portal (425) to access the analytics database (416).

Figure 10A:
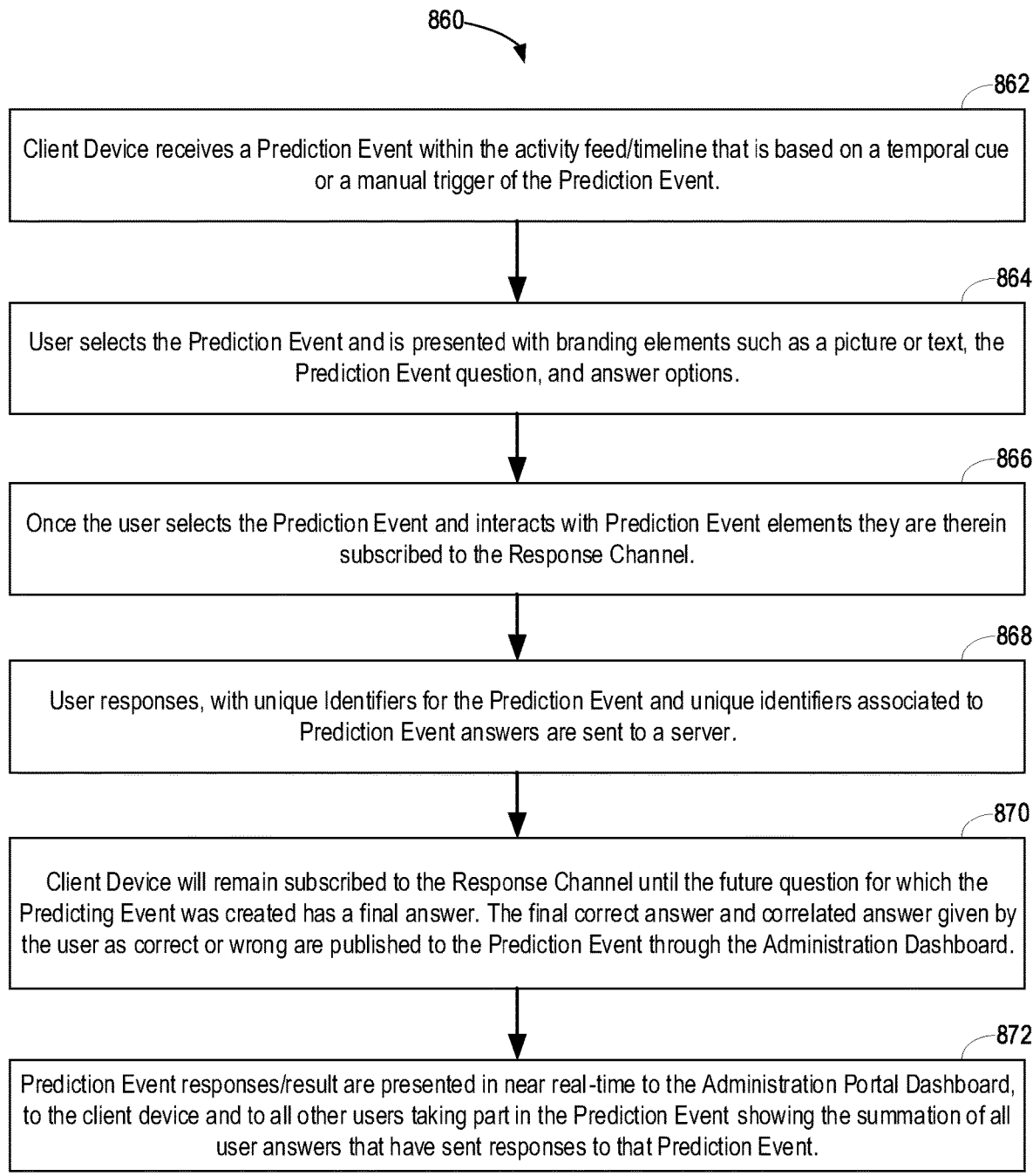
FIG. 10A is flow chart of a method for secondary content of a prediction event, in accordance with an embodiment.

Referring to FIG. 10A, illustrated therein is a method 860 for providing Secondary Syndicated Content in the form of a Prediction Event. The method 860 may be performed by system 100 in FIG. 3A or system 400 in FIG. 4A. The elements from FIG. 4*a* are identified in parenthesis for reference.

At 862, a client device (404) that is subscribed to Content Channel (422) receives Secondary Syndicated Content in the form of a Prediction Event within an activity feed/timeline. The Prediction Event is based on a temporal cue in Primary Source Content or a manual trigger of the Prediction Event.

At 864 a user on the client device (404) selects the Prediction Event and is presented with branding elements such as a picture or text, the Prediction Event question, and answer options.

Figure 10B:
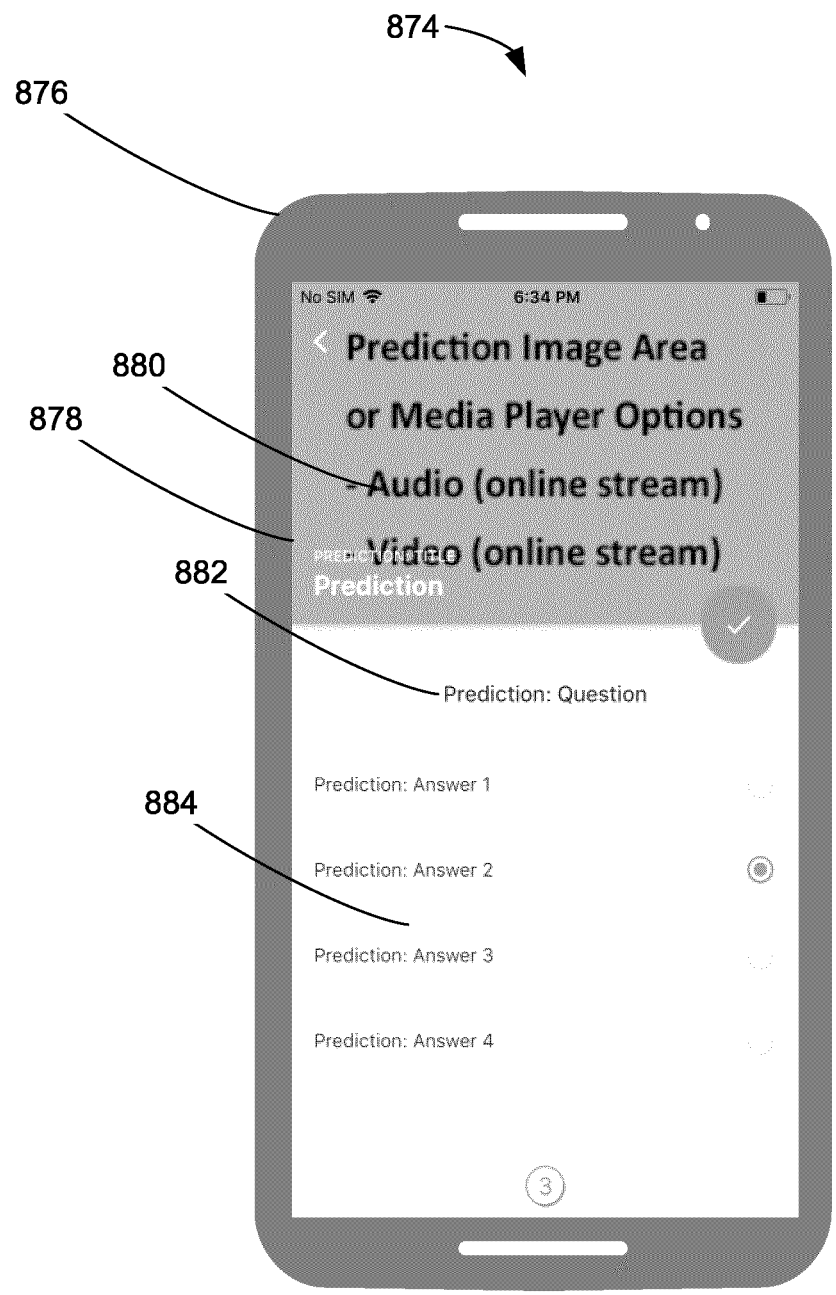
FIGS. 10B and 10C are mobile devices displaying secondary content of a prediction event, in accordance with an embodiment.

Now referring to FIG. 10B, illustrated therein is an exemplary Prediction Event 874 in a timeline/activity feed 878 on a client device 876. The client device 876, may be the client device 404 in FIG. 4A. The Prediction Event 874 includes branding elements 880 including pictures and/or text displayed within the timeline/activity feed 878. The Prediction Event 874 includes a Prediction question 882. The Prediction Event 874 includes answer options 884.

Referring back to FIG. 10A, at 866, once the user selects the Prediction Event and interacts with Prediction Event elements the client device (404) is subscribed to a Websocket (410) response channel (426).

At 868, User responses with unique identifiers for the Prediction and unique identifiers associated to elements within the Prediction Event (i.e. Prediction answers) are sent to a server (408) over the response channel (426) and stored in a responses database (414).

At 870, the Client Device will remain subscribed to the response channel (426) until the future question for which the Predicting Event was created has a final answer. The final correct answer and correlated answer given by the user as correct or wrong are published to the Administration Dashboard.

At 872, Prediction Event responses are presented in near real-time to a dashboard (427) web application, to the client device (404) and to all other users taking part in the Prediction Event showing the summation of all user answers that have sent responses to that Prediction Event.

Figure 10C:
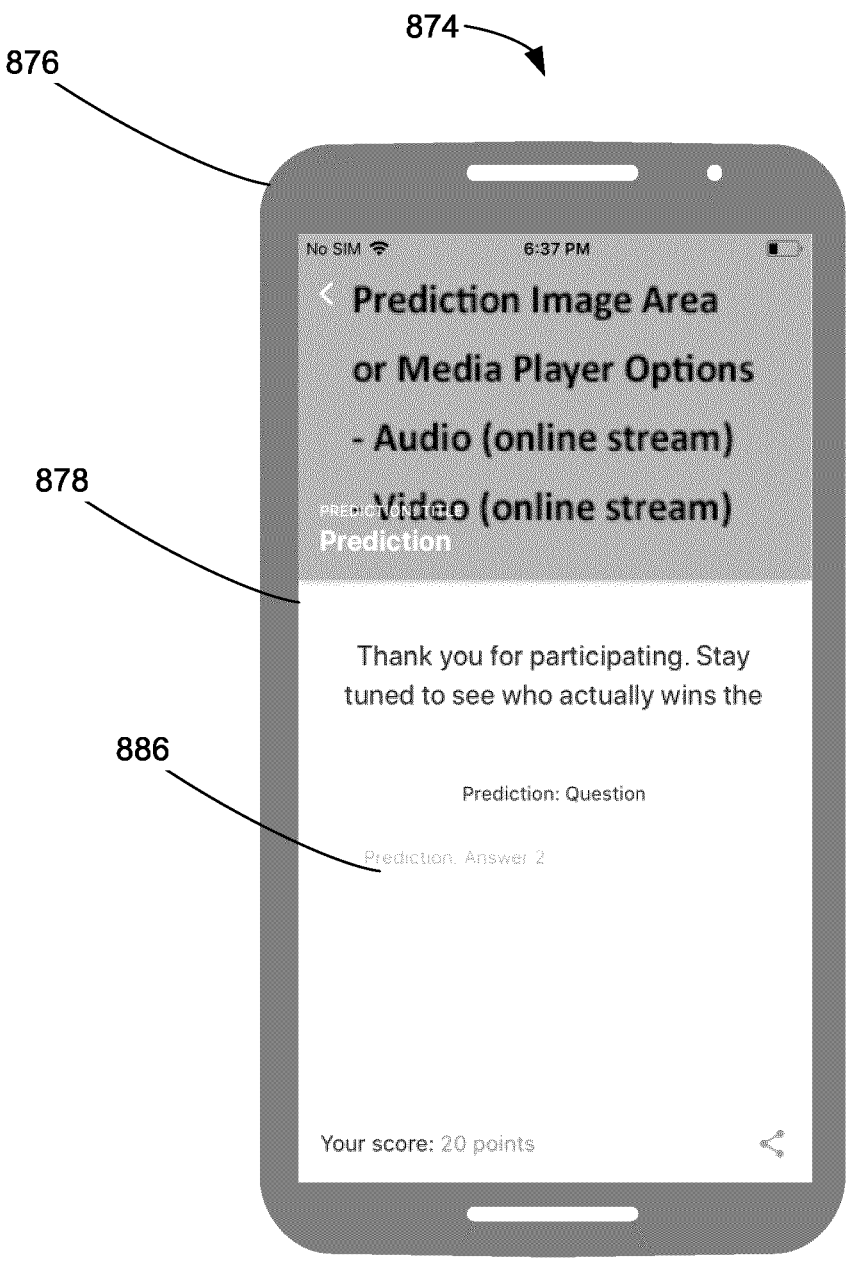

Now referring to FIG. 10C illustrated therein is an exemplary Prediction Event 874 showing Prediction event responses 886 within a timeline/activity feed 878 on a client device 876. The client device 876, may be the client device 404 in FIG. 4A.

Referring back to FIG. 10A, during the execution of method 860, as a user interacts with Prediction Event elements, user and device analytics may be sent to the server (408) at any or all acts of method 750. The user and device analytics are passed from the client device (404) to the server (408) over the WebSocket (410) analytics channel (424) and stored in an analytics database (416). The analytics relating to the Prediction Event stored in the analytics database (416) may be viewed by an administrator/Primary Source Content owner in real-time on a dashboard web application (427) through an admin portal (425) to access the analytics database (416).

Figure 11A:
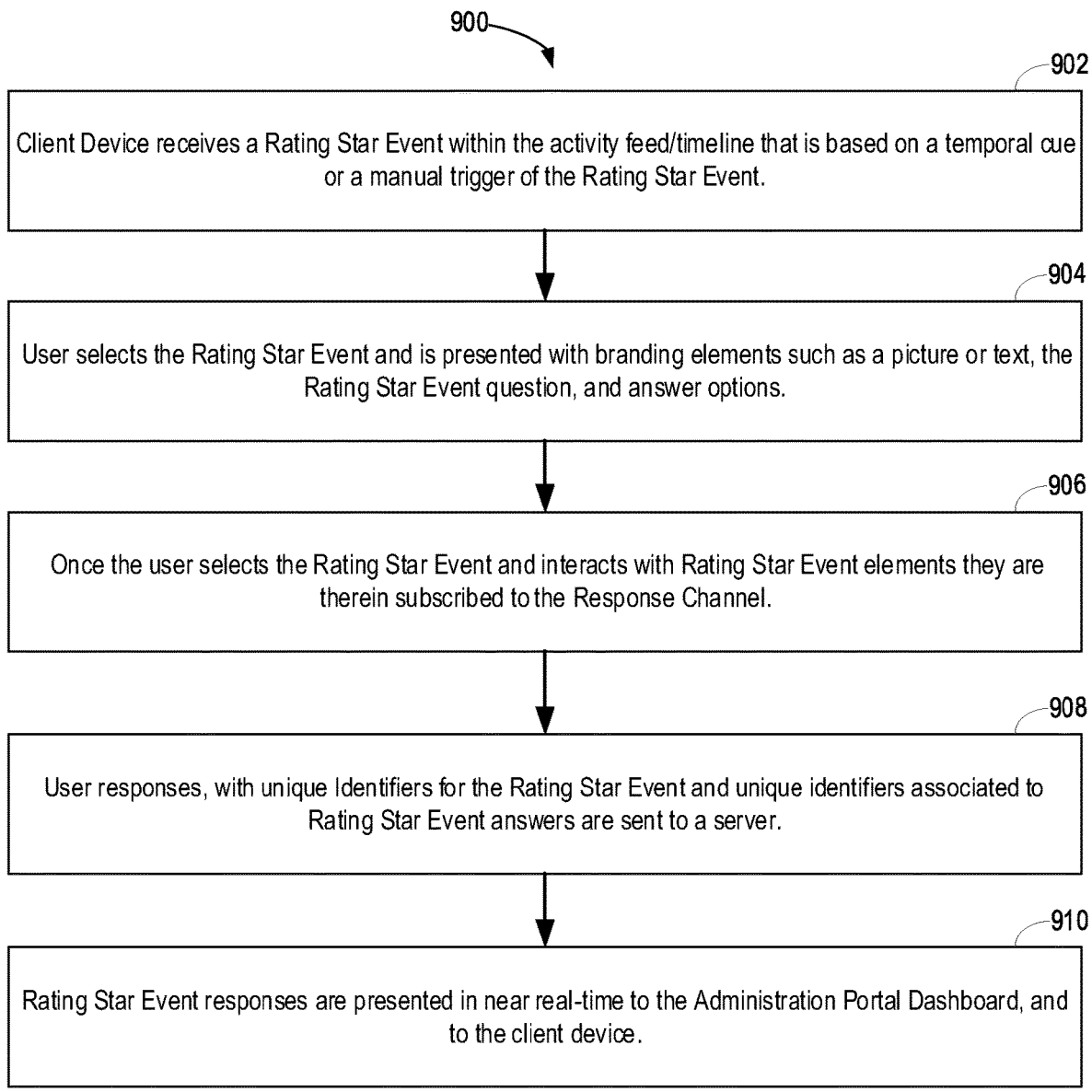
FIG. 11A is flow chart of a method for secondary content of a rating star event, in accordance with an embodiment.

Referring to FIG. 11A, illustrated therein is a method 900 for providing Secondary Syndicated Content in the form of a Rating Star Event. The method 900 may be performed by system 100 in FIG. 3A or system 400 in FIG. 4A. The elements from FIG. 4*a* are identified in parenthesis for reference.

At 902, a client device (404) that is subscribed to Content Channel (422) receives Secondary Syndicated Content in the form of a Rating Star Event within an activity feed/timeline. The Rating Star Event is based on a temporal cue in Primary Source Content or a manual trigger of the Rating Star Event.

At 904 a user on the client device (404) selects the Rating Star Event and is presented with branding elements such as a picture or text, the Rating Star Event question, and answer options.

Figure 11B:
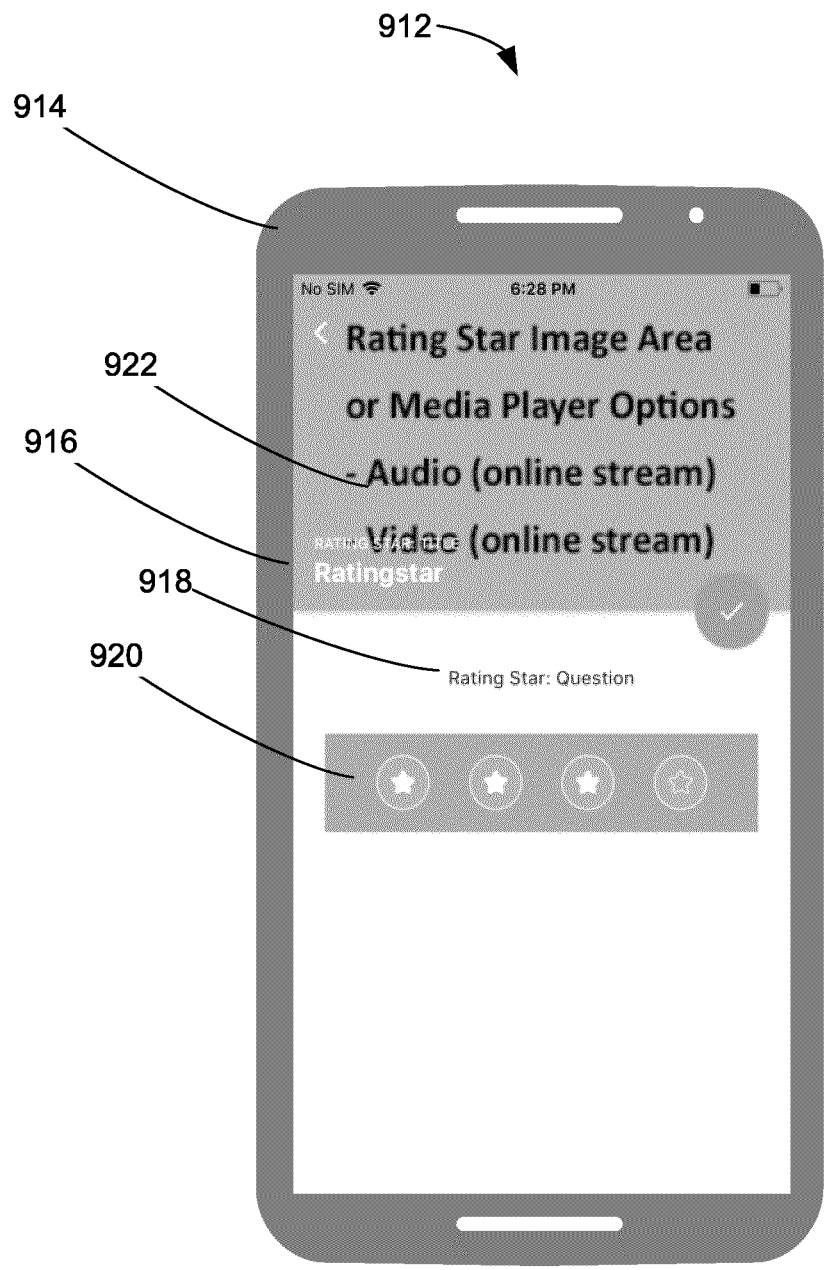
FIGS. 11B and 11C are mobile devices displaying secondary content of a rating star event, in accordance with an embodiment.

Now referring to FIG. 11B, illustrated therein is an exemplary Rating Star Event 912 in a timeline/activity feed 916 on a client device 914. The client device 914, may be the client device 404 in FIG. 4A. The Rating Star Event 912 includes branding elements 922 including pictures and/or text displayed within the timeline/activity feed 916. The Rating Star Event 912 includes a Rating Star question 918. The Rating Star Event 912 includes answer options 920.

Referring back to FIG. 11A, at 906, once the user selects the Rating Star Event and interacts with Rating Star Event elements the client device (404) is subscribed to a Websocket (410) response channel (426).

At 908, User responses with unique identifiers for the Rating Star and unique identifiers associated to elements within the Rating Star Event (i.e. Rating Star answers) are sent to a server (408) over the response channel (426) and stored in a responses database (414).

At 910, Rating Star Event responses are presented in near real-time to a dashboard (427) web application and to the client device (404).

Figure 11C:
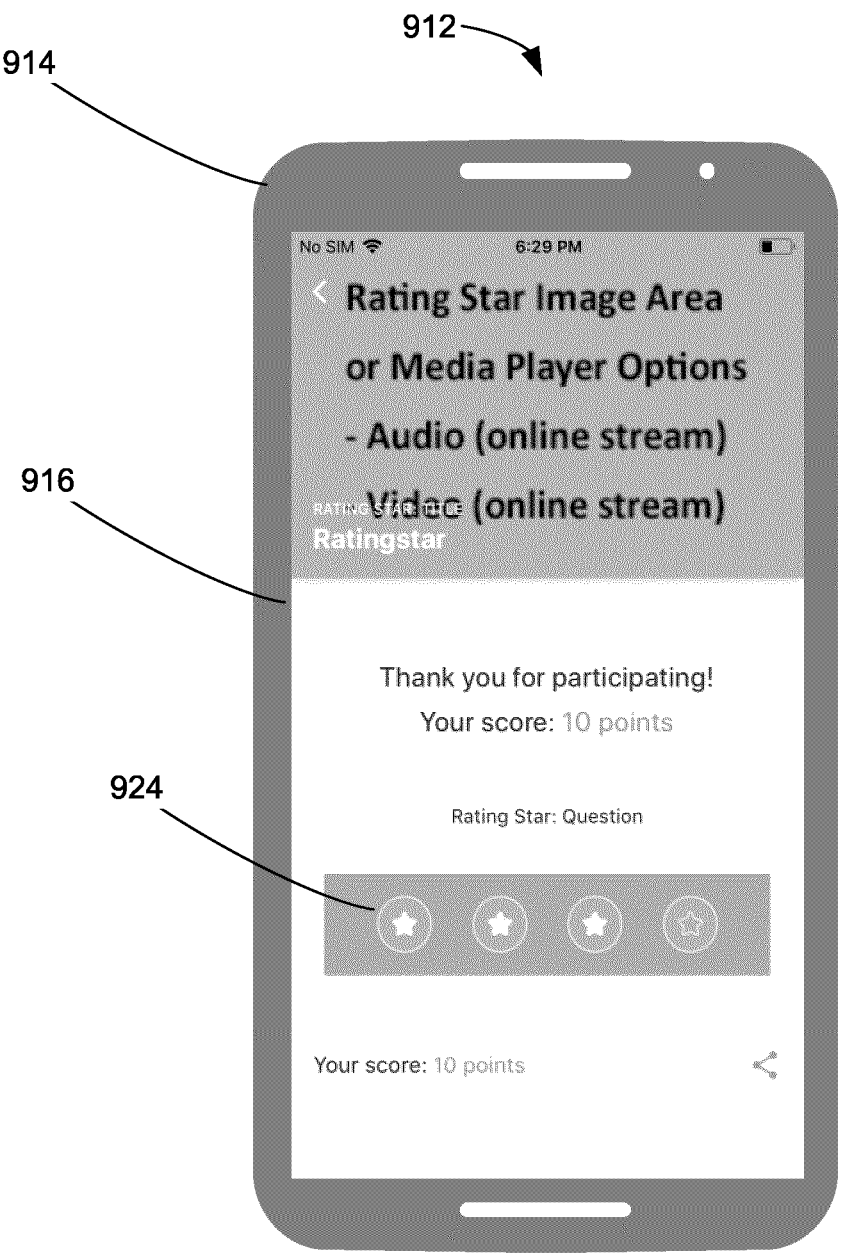

Now referring to FIG. 11C illustrated therein is an exemplary Rating Star Event 912 showing Rating Star event responses 924 within a timeline/activity feed 916 on a client device 914. The client device 914, may be the client device 404 in FIG. 4A.

Referring back to FIG. 11A, During the execution of method 900, as a user interacts with Rating Star Event elements, user and device analytics may be sent to the server (408) at any or all acts of method 900. The user and device analytics are passed from the client device (404) to the server (408) over the WebSocket (410) analytics channel (424) and stored in an analytics database (416). The analytics relating to the Rating Star Event stored in the analytics database (416) may be viewed by an administrator and/or Primary Source Content owner in real-time on a dashboard web application (427) through an admin portal (425) to access the analytics database (416).

Figure 12A:
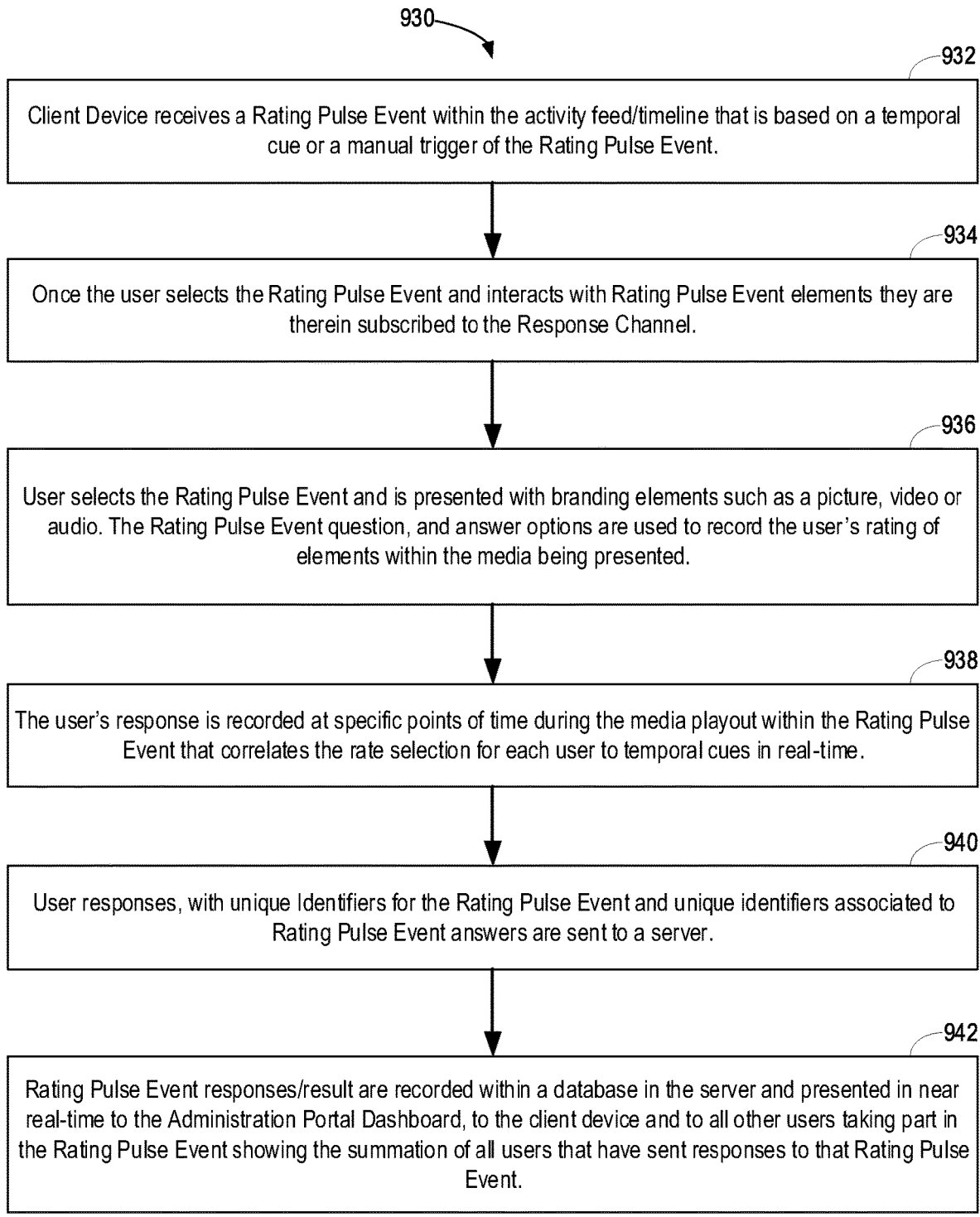
FIG. 12A is flow chart of a method for secondary content of a rating pulse event, in accordance with an embodiment.

Referring to FIG. 12A illustrated therein is a method 930 for providing Secondary Syndicated Content in the form of a Rating Pulse Event. The method 930 may be performed by system 100 in FIG. 3A or system 400 in FIG. 4A. The elements from FIG. 4a are identified in parenthesis for reference.

At 932, a client device (404) that is subscribed to a Content Channel (422) receives Secondary Syndicated Content in the form of a Rating Pulse Event within an activity feed/timeline. The rating Pulse Event is based on a temporal cue in Primary Source Content or a manual trigger of the Poll Event.

At 934 once a user on the client device (404) selects the Rating Pulse Event, the client device (404) is subscribed to the response channel (426).

At 936, the user is presented with branding elements such as a picture, video or audio, the Rating Pulse Event question, and answer options which are scale of numbers (e.g. 1-5) to record the user's rating of elements within the media being presented. The presented media may be presented externally, locally on the client device (404), or within the Rating Pulse Event itself as video or audio media.

Figure 12B:
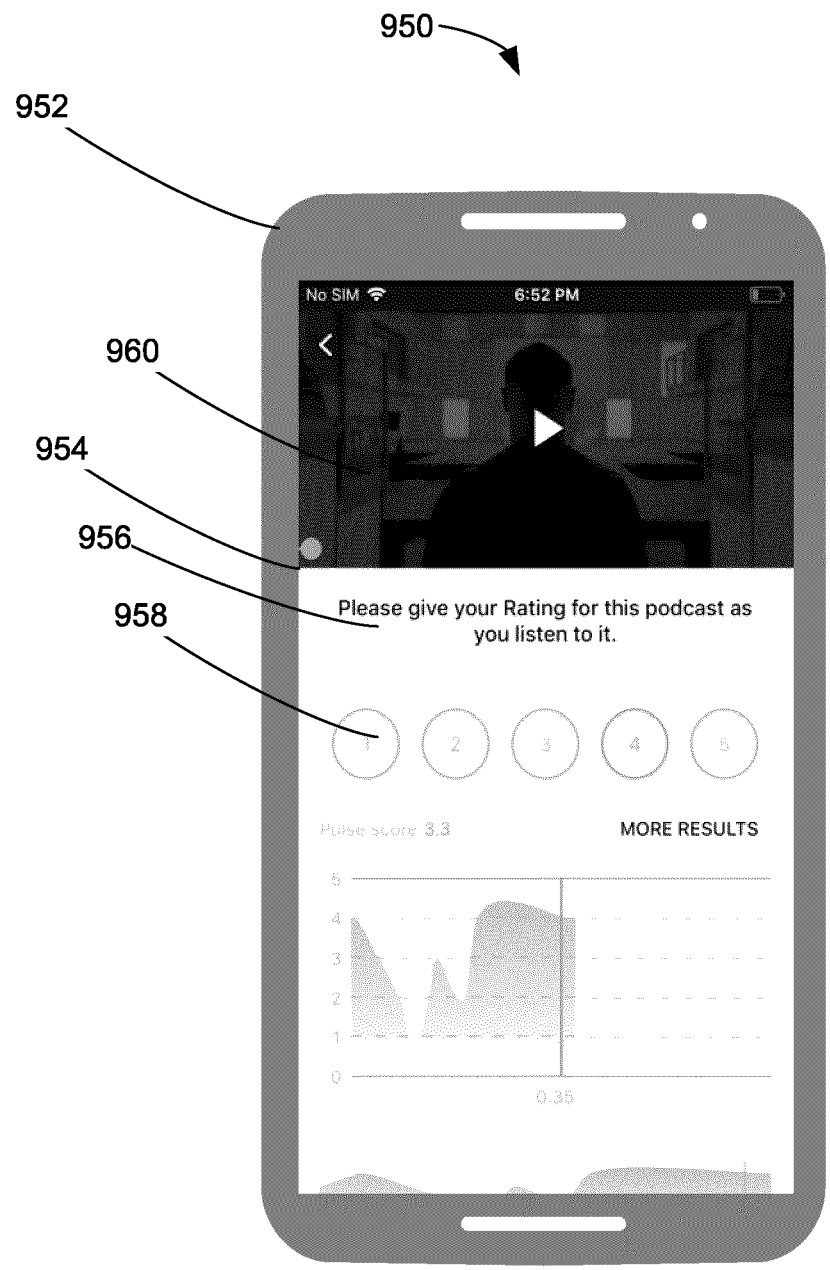
FIGS. 12B and 12C are mobile devices displaying secondary content of a rating pulse event, in accordance with an embodiment.

Now referring to FIG. 12B, illustrated therein is an exemplary Rating Pulse Event 950 in a timeline/activity feed 954 on a client device 952. The client device 952, may be the client device 404 in FIG. 4A. The Rating Pulse Event 950 includes the presented media 960 displayed within the timeline/activity feed 954. According to other embodiments, branding elements may be presented where the presented media 960 is depicted in FIG. 12B. The Rating Pulse Event 950 includes a Rating Pulse question 956. The Rating Pulse Event 950 includes answer options 958.

Referring back to FIG. 12A, at 938, the user's responses is recorded at specific points of time during the media playout within the Rating Pulse Event that correlates the response selection for each user to temporal cues in real-time.

At 940, User responses with unique identifiers for the Rating Pulse and unique identifiers associated to elements within the Rating Pulse Event (i.e. Rating Pulse answers) are sent to a server (408) over the response channel (426) and stored in a responses database (414).

At 942, Rating Pulse Event responses are presented in near real-time to a dashboard (427) web application, to the client device (404) and to all other users taking part in the Rating Pulse Event showing the summation of all user answers that have sent responses to that Rating Pulse Event.

Figure 12C:
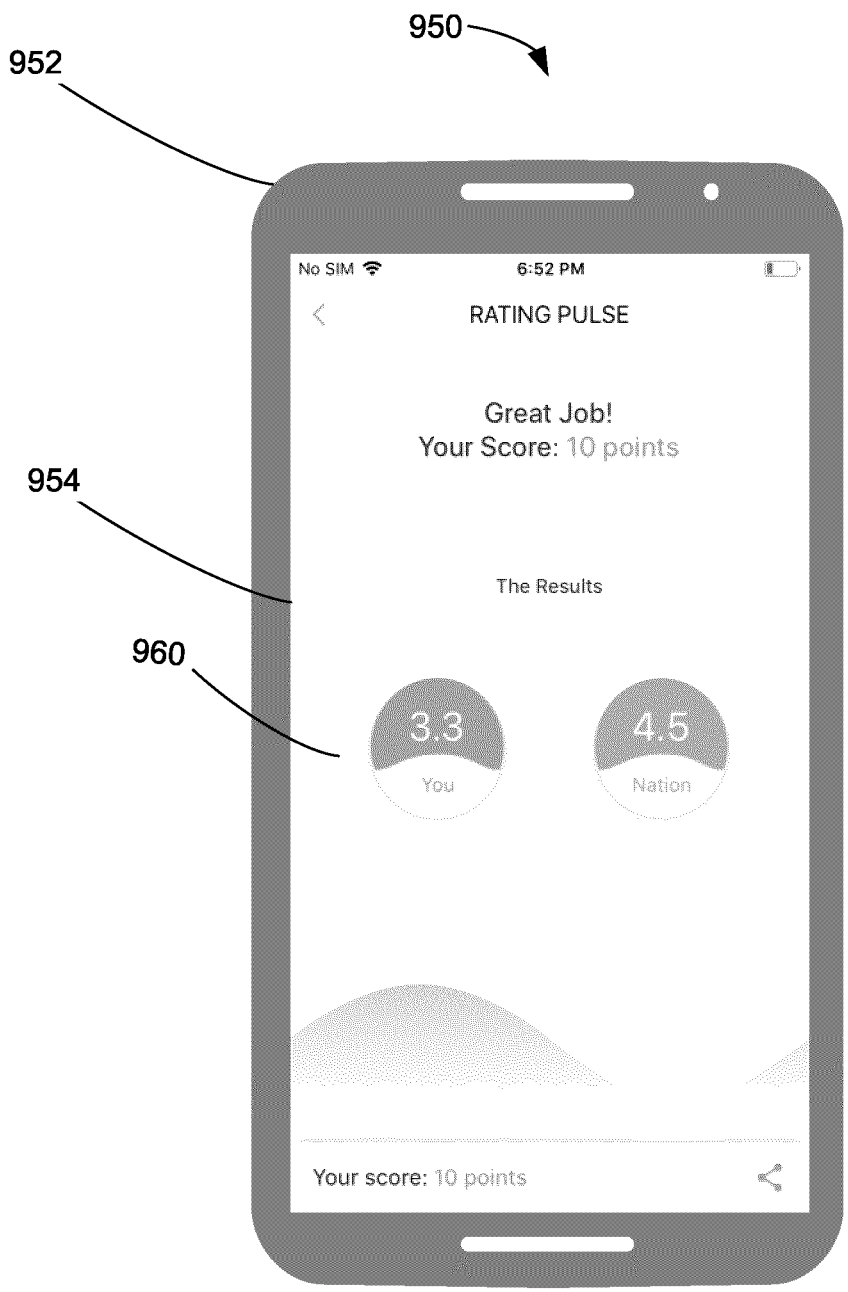

Now referring to FIG. 12C illustrated therein is an exemplary Rating Pulse Event 950 showing Rating Pulse event responses 960 within a timeline/activity feed 954 on a client device 952. The client device 952, may be the client device 404 in FIG. 4A.

Referring back to FIG. 12A, During the execution of method 930, as a user interacts with Rating Pulse Event elements, user and device analytics may be sent to the server (408) at any or all acts of method 930. The user and device analytics are passed from the client device (404) to the server (408) over the WebSocket (410) analytics channel (424) and stored in an analytics database (416). The analytics relating to the Rating Pulse Event stored in the analytics database (416) may be viewed by an administrator/Primary Source Content owner in real-time on a dashboard web application (427) through an admin portal (425) to access the analytics database (416).

Figure 13A:
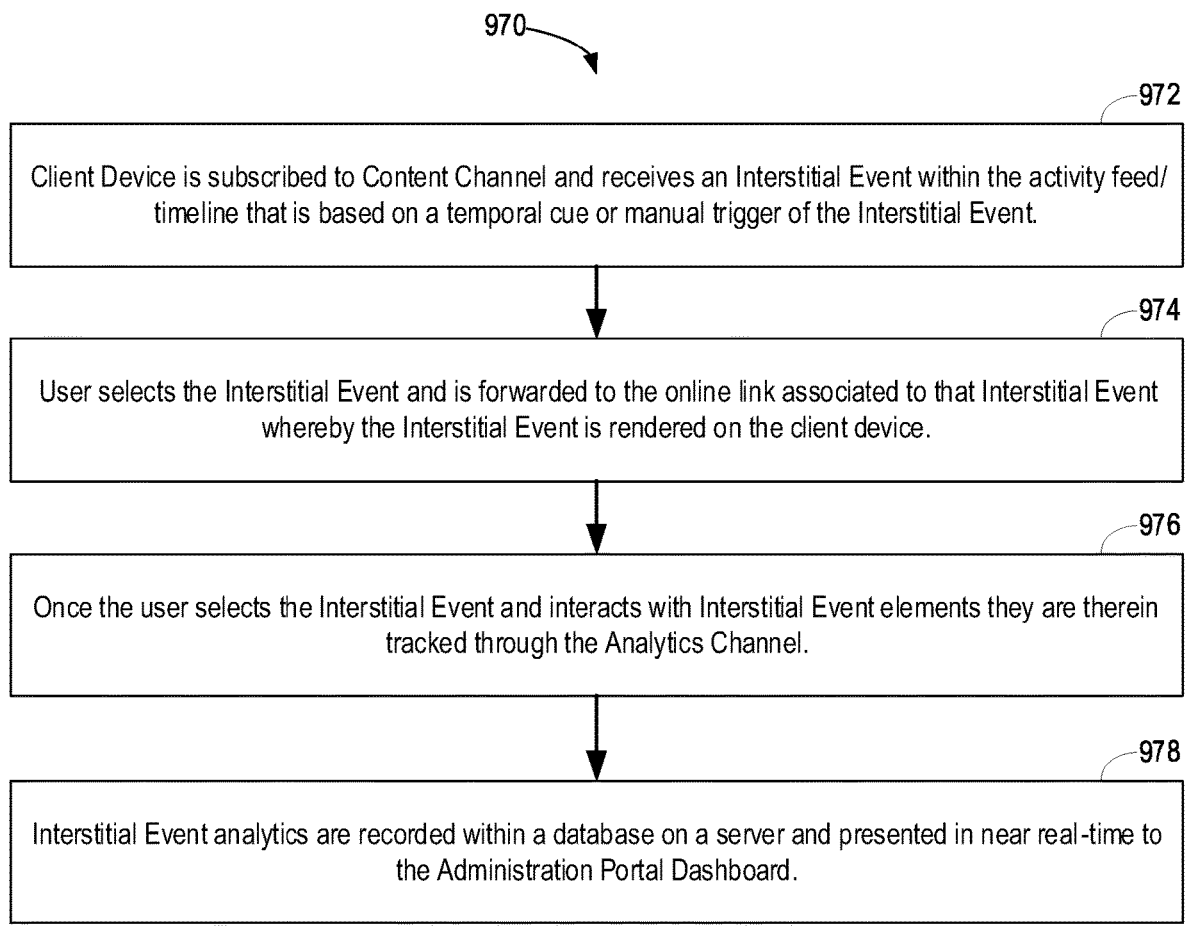
FIG. 13A is flow chart of a method for secondary content of an interstitial event, in accordance with an embodiment.

Referring to FIG. 13A, illustrated therein is a method 970 for providing Secondary Syndicated Content in the form of an Interstitial Event. The interstitial event may be in the form of a hyperlink to a webpage, an audio file or a video file. The method 970 may be performed by system 100 in FIG. 3A or system 400 in FIG. 4A. The elements from FIG. 4a are identified in parenthesis for reference.

At 972, a client device (404) that is subscribed to a content channel (422) receives an Interstitial Event within the activity feed/timeline based on a temporal cue or manual trigger of the Interstitial Event.

At 974, the User selects the Interstitial Event and is forwarded to the online link associated to that Interstitial Event, whereby the Interstitial Event is rendered on the client device (404). Where the Interstitial Event is a hyperlink to a webpage, the webpage may be rendered on a browser on the client device (404). Where the Interstitial Event is an audio file or a video file, the audio or video may be rendered by a media player on the client device (404).

At 976, once the user selects the Interstitial Event and interacts with Interstitial Event elements, the client device (404) is subscribed to an analytics channel (424).

At 978, user and client device (404) analytics related to the user's interaction with the Interstitial Event are passed from the client device (404) to a server (408) through the analytics channel (424) and stored in a database (416) and presented in near real-time to the Dashboard web application (427). The analytics relating to the interstitial Event stored in the analytics database (416) may be viewed by an administrator and/or Primary Source Content owner in real-time on a dashboard web application (427) through an admin portal (425) to access the analytics database (416).

Referring to FIG. 13A, illustrated therein is a method 970 for providing Secondary Syndicated Content in the form of an Interstitial Event. The interstitial event may be in the form of a hyperlink to a webpage, an audio file or a video file. The method 970 may be performed by system 100 in FIG. 3A or system 400 in FIG. 4A. The elements from FIG. 4*a* are identified in parenthesis for reference.

At 972, a client device (404) that is subscribed to a content channel (422) receives an Interstitial Event within the activity feed/timeline based on a temporal cue or manual trigger of the Interstitial Event.

At 974, the User selects the Interstitial Event and is forwarded to the online link associated to that Interstitial Event, whereby the Interstitial Event is rendered on the client device (404). Where the Interstitial Event is a hyperlink to a webpage, the webpage may be rendered on a browser on the client device (404). Where the Interstitial Event is an audio file or a video file, the audio or video may be rendered by a media player on the client device (404).

At 976, once the user selects the Interstitial Event and interacts with Interstitial Event elements, the client device (404) is subscribed to an analytics channel (424).

At 978, user and client device (404) analytics related to the user's interaction with the Interstitial Event are passed from the client device (404) to a server (408) through the analytics channel (424) and stored in a database (416) and presented in near real-time to a Dashboard web application (427). The analytics relating to the interstitial Event stored in the analytics database (416) may be viewed by an administrator and/or Primary Source Content owner in real-time on a dashboard web application (427) through an admin portal (425) to access the analytics database (416).

Figure 13B:
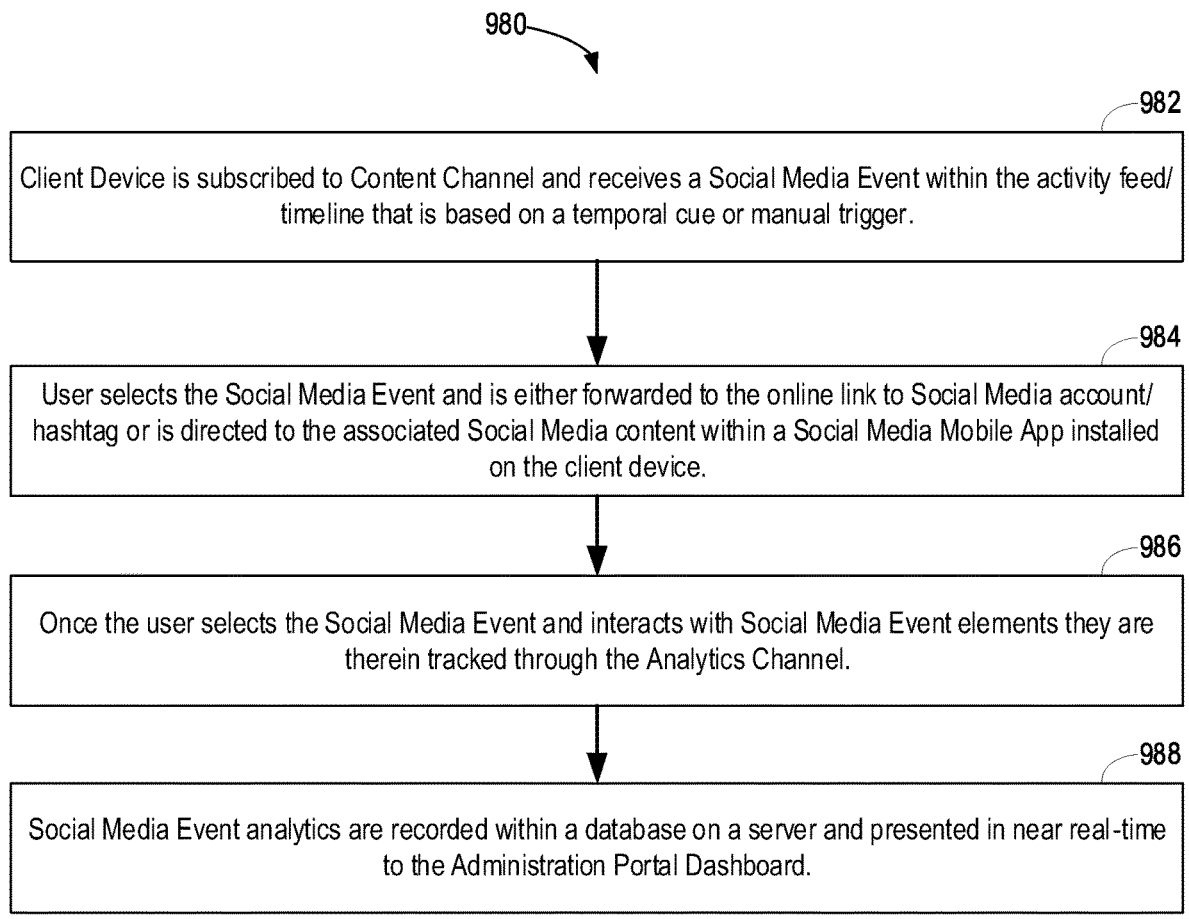
FIG. 13B is flow chart of a method for secondary content of a social media event, in accordance with an embodiment.

Referring to FIG. 13B, illustrated therein is a method 980 for providing Secondary Syndicated Content in the form of a Social Media Event. The Social Media Event may be directing the user to a Social Media page (i.e. Facebook, Instagram, SnapChat, Linkedin, and the like) or account. The method 980 may be performed by system 100 in FIG. 3A or system 400 in FIG. 4A. The elements from FIG. 4*a* are identified in parenthesis for reference.

At 982, a client device (404) that is subscribed to a content channel (422) receives a Social Media Event within the activity feed/timeline based on a temporal cue or manual trigger of the Social Media Event. The Social Media Event may be a hyperlink to a Social Media page or account or a Social Media hashtag.

At 984, the User selects the Social Media Event and is either forwarded to the online link associated to the Social Media account/hashtag on a web browser on the client device (404), or is directed to the associated Social Media content within a Social Media Mobile App (i.e. Facebook, Instagram, SnapChat, Linkedin, and the like) installed on the client device (404).

At 986, once the user selects the Social Media Event and interacts with Social Media Event elements, the client device (404) is subscribed to an analytics channel (424).

At 988, user and client device (404) analytics related to the user's interaction with the Social Media Event are passed from the client device (404) to a server (408) through the analytics channel (424) and stored in a database (416) and presented in near real-time to a Dashboard web application (427). The analytics relating to the Social Media Event stored in the analytics database (416) may be viewed by an administrator and/or Primary Source Content owner in real-time on a dashboard web application (427) through an admin portal (425) to access the analytics database (416).

Figure 14A:
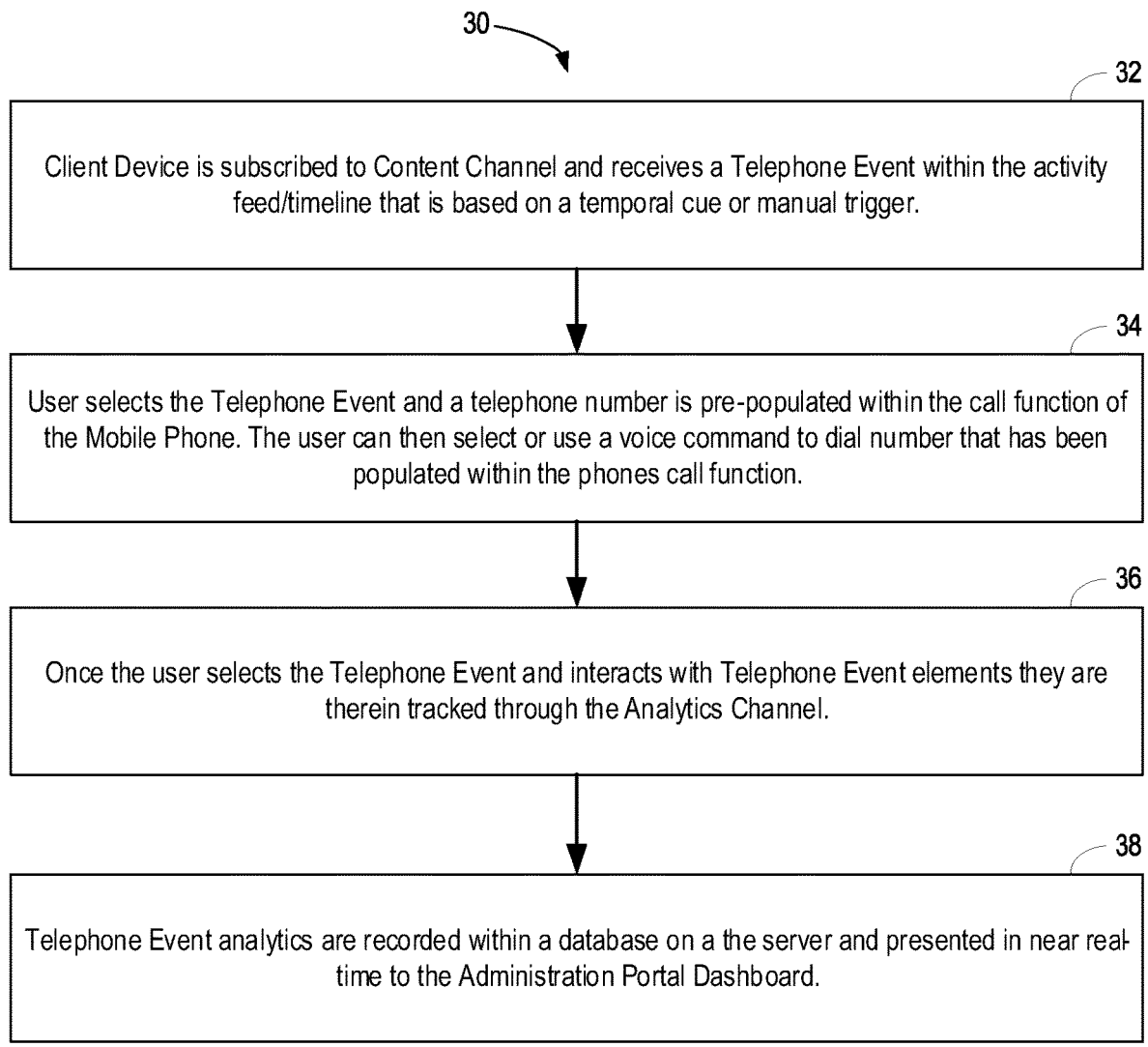
FIG. 14A is flow chart of a method for secondary content of a telephone event, in accordance with an embodiment.

Referring to FIG. 14A, illustrated therein is a method 30 for providing Secondary Syndicated Content in the form of a Telephone Event. The method 30 may be performed by system 100 in FIG. 3A or system 400 in FIG. 4A. The elements from FIG. 4*a* are identified in parenthesis for reference.

At 32, a client device (404) that is subscribed to a content channel (422) receives a Telephone Event within the activity feed/timeline based on a temporal cue or manual trigger of the Telephone Event. The client device (404) may be any device capable of making telephone calls such as a smartphone or call-enabled tablet or computer.

At 34, the user selects the Telephone Event and a telephone number is pre-populated within the call function of the client device (404). The user can then use a touch or voice command to dial the number that has been populated within the client device (404) call function.

At 36, once the user selects the Telephone Event and interacts with Telephone Event elements, the client device (404) is subscribed to an analytics channel (424).

At 38, user and client device (404) analytics related to the user's interaction with the Telephone Event are passed from the client device (404) to a server (408) through the analytics channel (424) and stored in a database (416) and presented in near real-time to a Dashboard web application (427). The analytics relating to the Telephone Event stored in the analytics database (416) may be viewed by an administrator and/or Primary Source Content owner in real-time on a dashboard web application (427) through an admin portal (425) to access the analytics database (416).

Figure 14B:
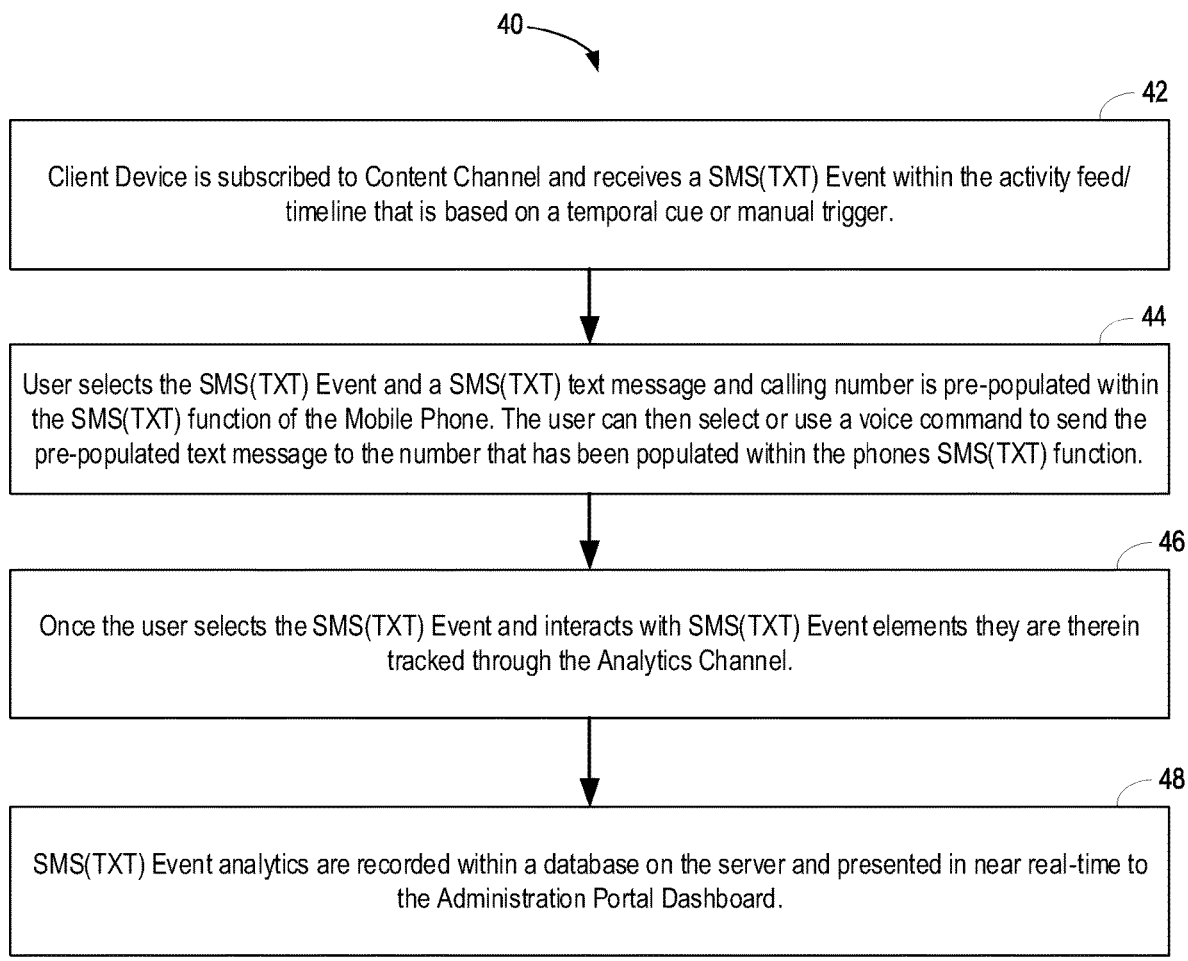
FIG. 14B is flow chart of a method for secondary content of a SMS text event, in accordance with an embodiment.

Referring to FIG. 14B, illustrated therein is a method 40 for providing Secondary Syndicated Content in the form of a SMS (TXT) Event. The method 40 may be performed by system 100 in FIG. 3A or system 400 in FIG. 4A. The elements from FIG. 4*a* are identified in parenthesis for reference.

At 42, a client device (404) that is subscribed to a content channel (422) receives a SMS (TXT) Event within the activity feed/timeline based on a temporal cue or manual trigger of the SMS (TXT) Event. The client device (404) may be any device capable of sending SMS (TXT) messages such as a smartphone or SMS (TXT)-enabled tablet or computer.

At 44, the user selects the SMS (TXT) Event and a SMS (TXT) text message and calling number is pre-populated within the SMS (TXT) function of the client device (404). The user can then select or use a touch or voice command to send the pre-populated text message to the number that has been populated within the client device (404) SMS (TXT) function.

At 46, once the user selects the SMS (TXT) Event and interacts with SMS (TXT) Event elements, the client device (404) is subscribed to an analytics channel (424).

At 48, user and client device (404) analytics related to the user's interaction with the SMS (TXT) Event are passed from the client device (404) to a server (408) through the analytics channel (424) and stored in a database (416) and presented in near real-time to a Dashboard web application (427). The analytics relating to the SMS (TXT) Event stored in the analytics database (416) may be viewed by an administrator and/or Primary Source Content owner in real-time on a dashboard web application (427) through an admin portal (425) to access the analytics database (416).

Figure 14C:
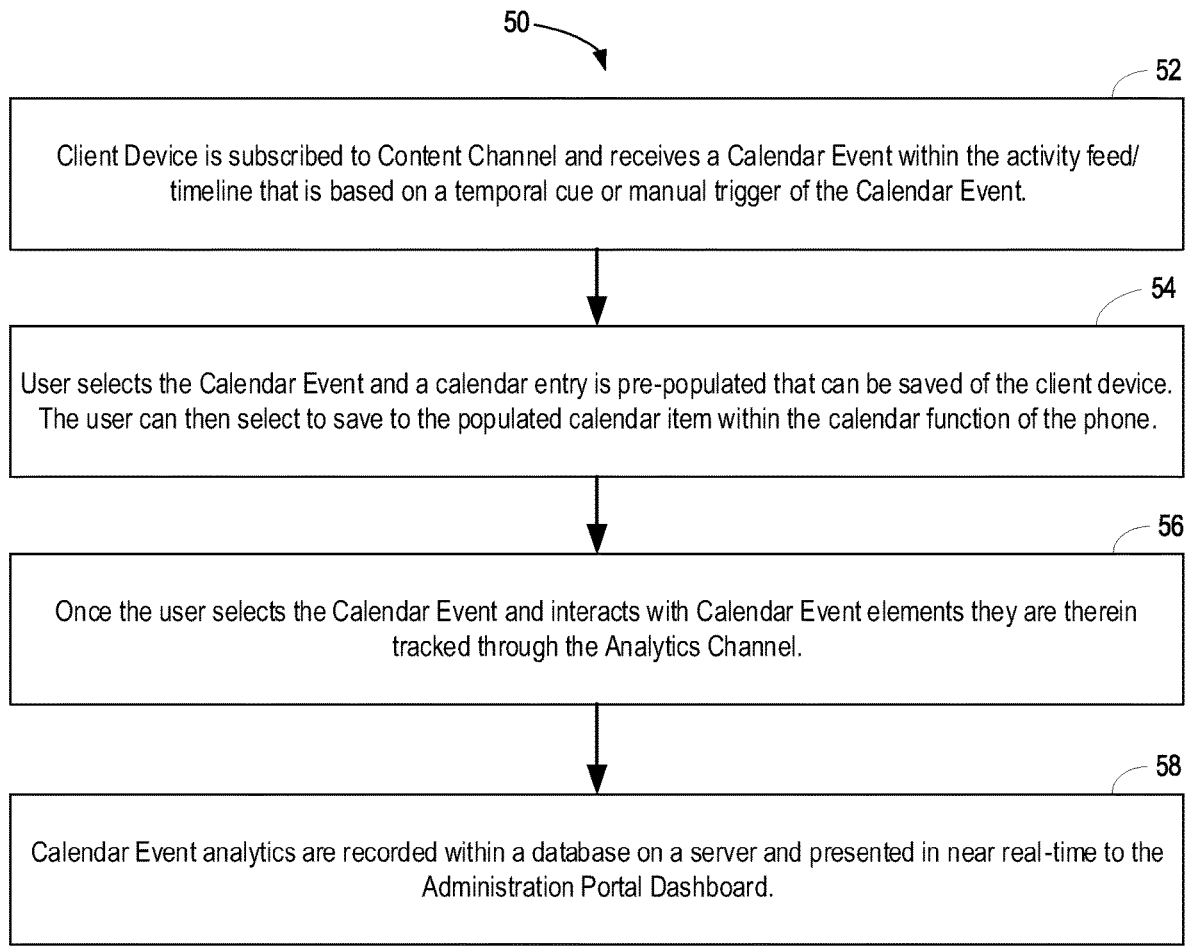
FIG. 14C is flow chart of a method for secondary content of a calendar event, in accordance with an embodiment.
Figure 15C:
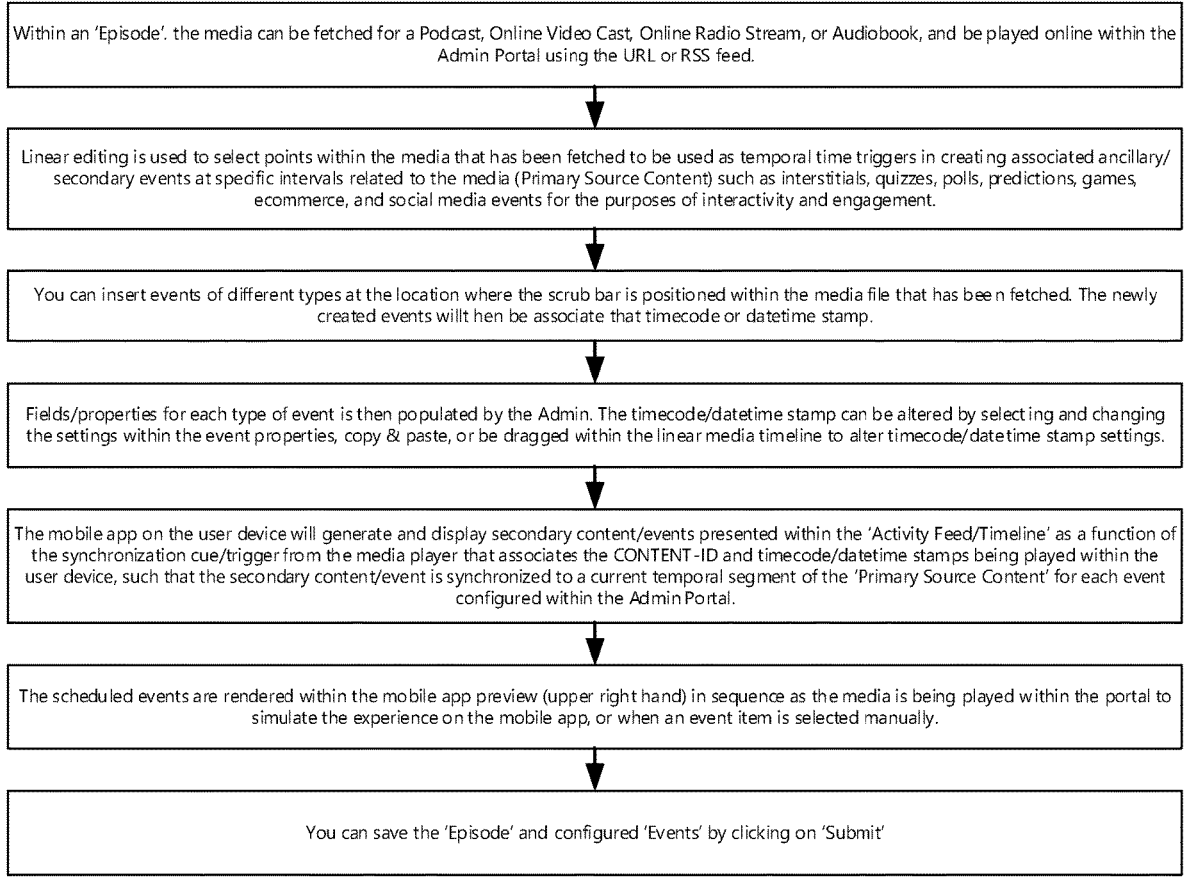
FIGS. 15A to 15N are flow chart and screen shot of a method for generating secondary syndicated content from primary source content, in accordance with an embodiment.
Figure 15I:
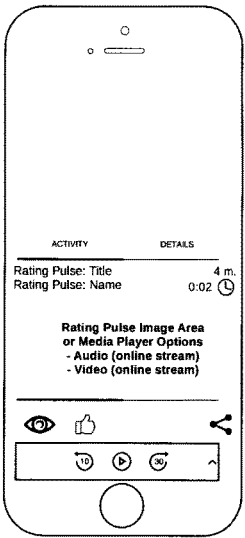
Figure 15L:
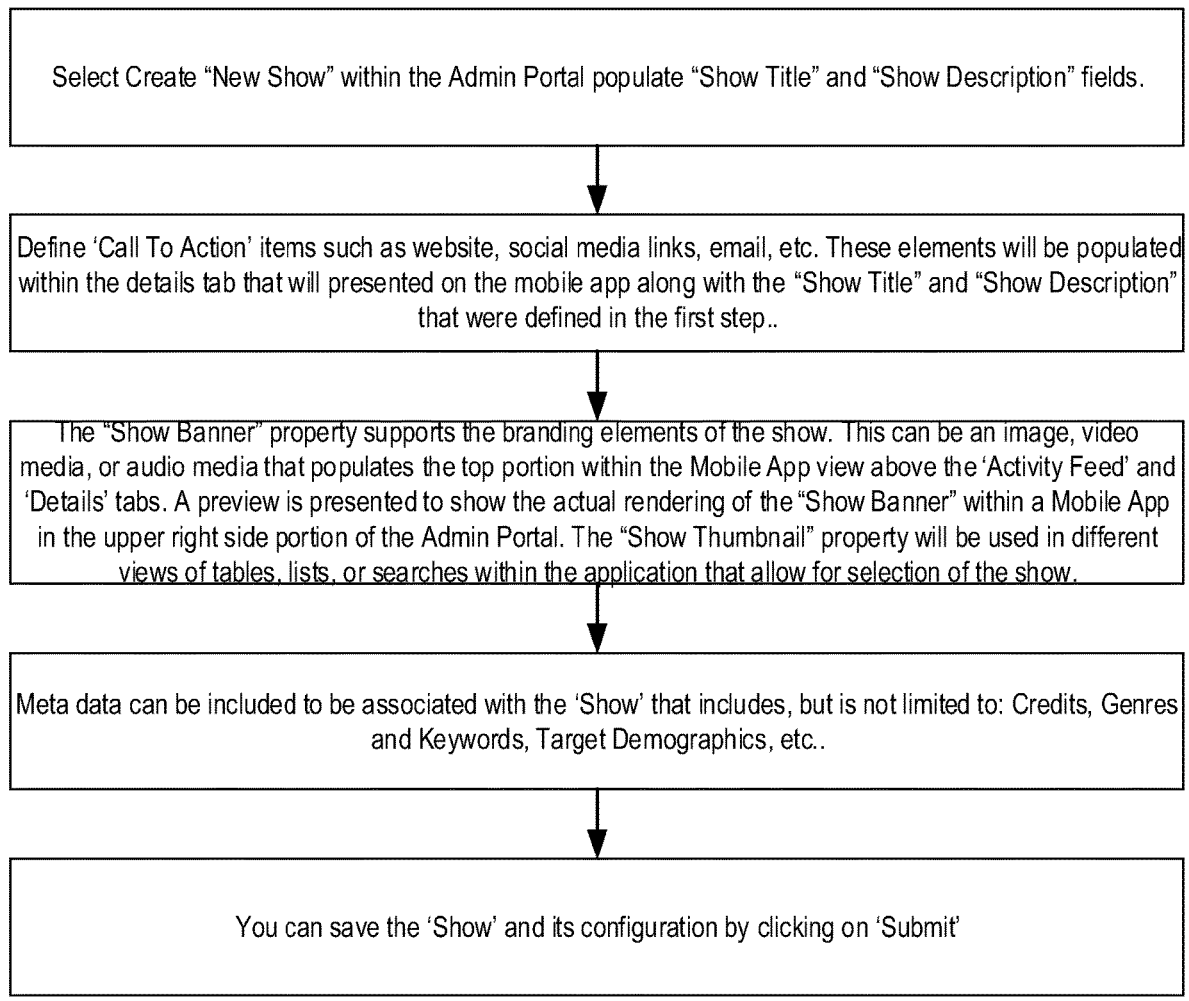
Figure 15M:
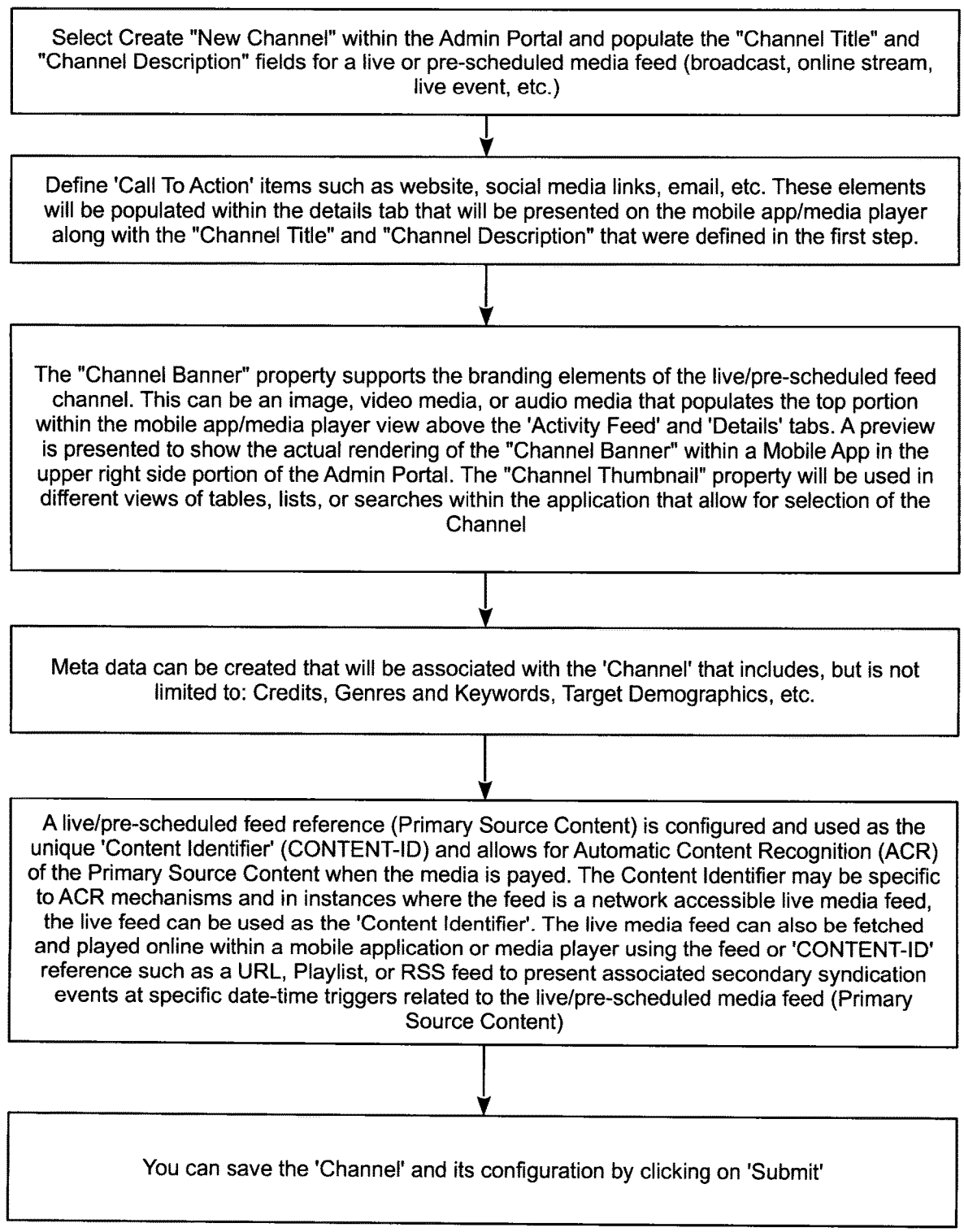
Figure 15N:
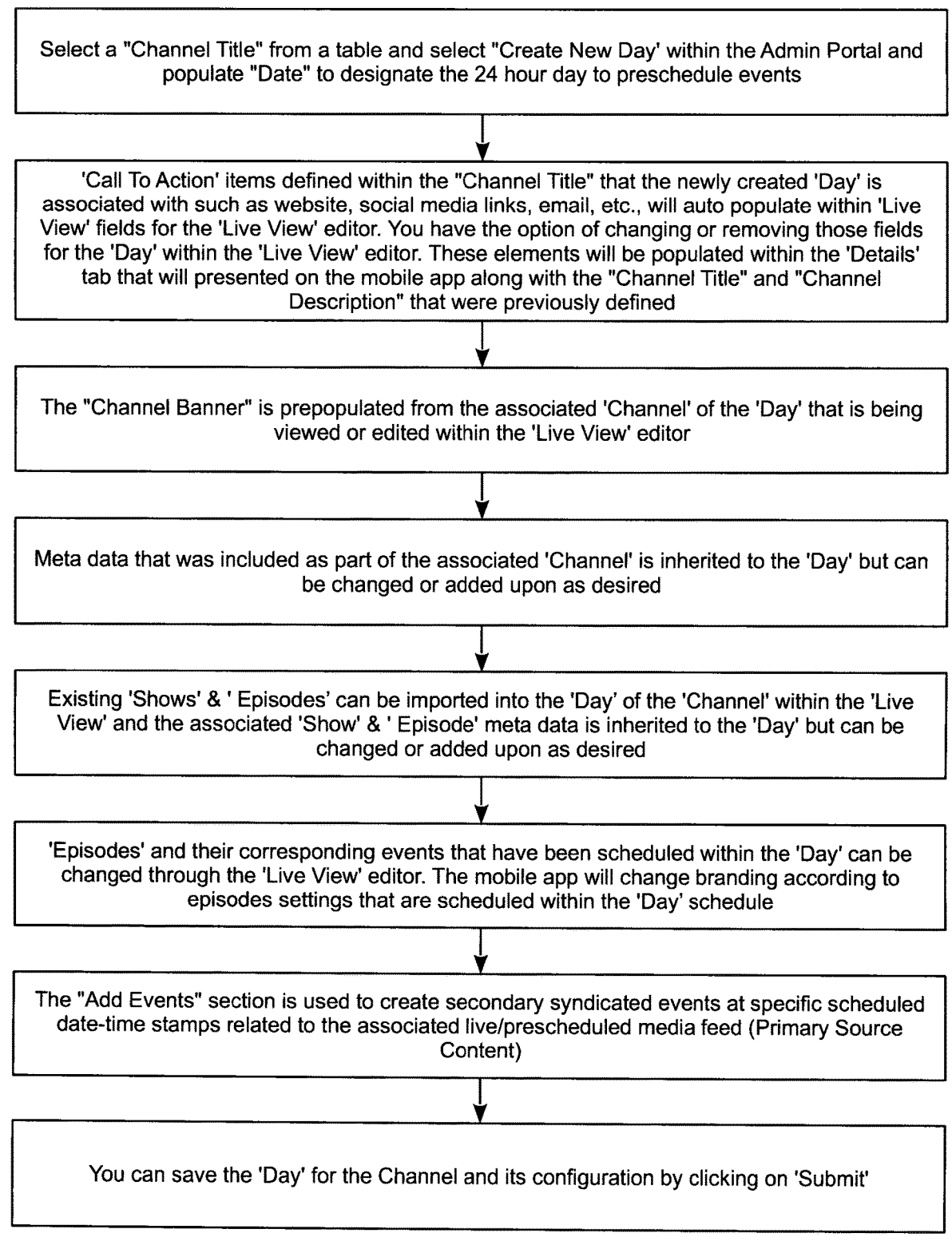
Figure 16B:
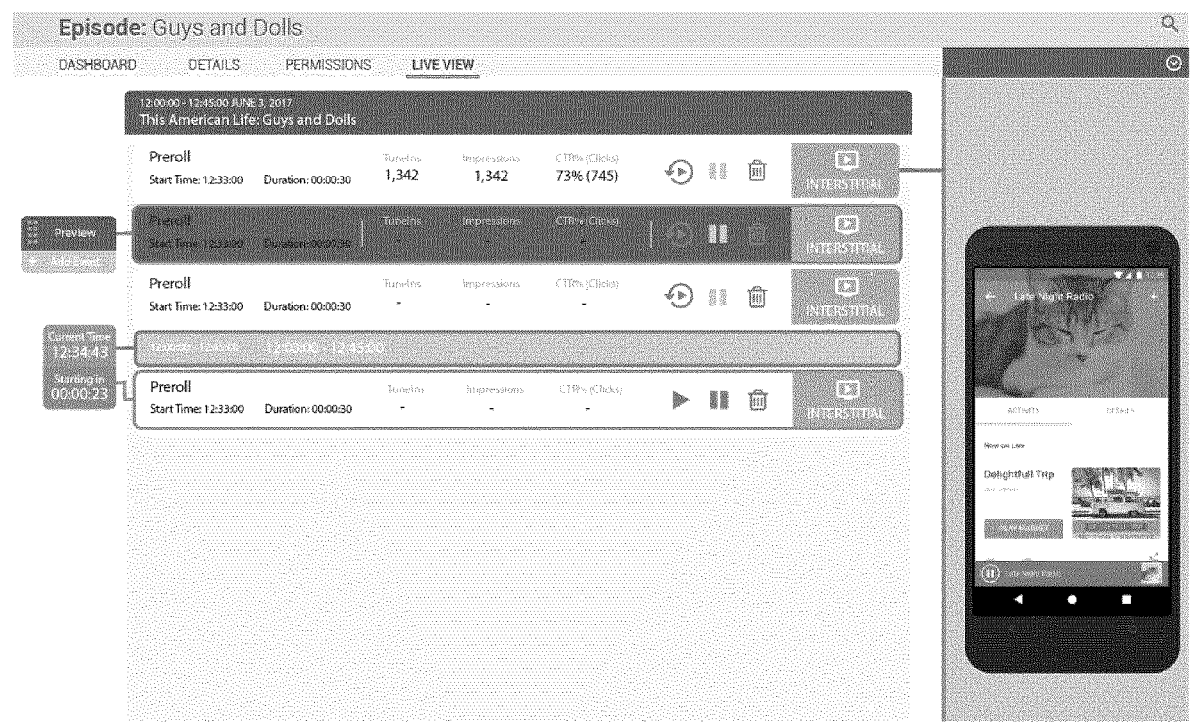
Figure 16C:
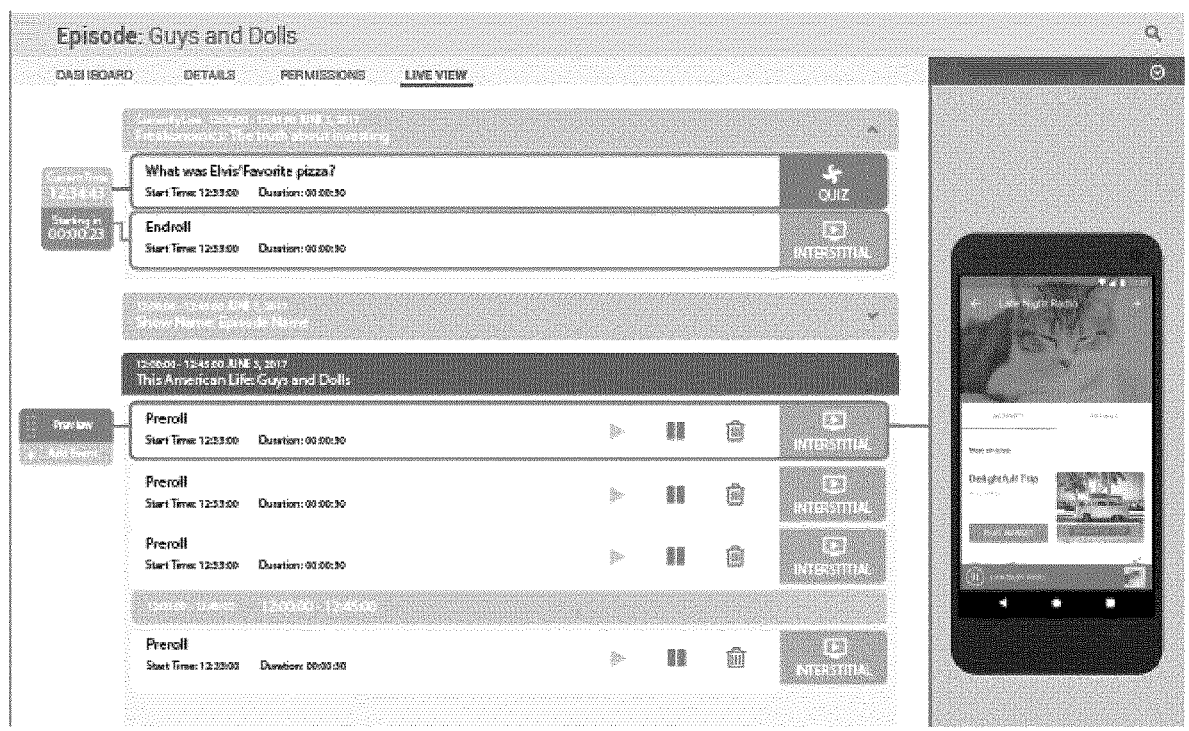
Figure 16D:
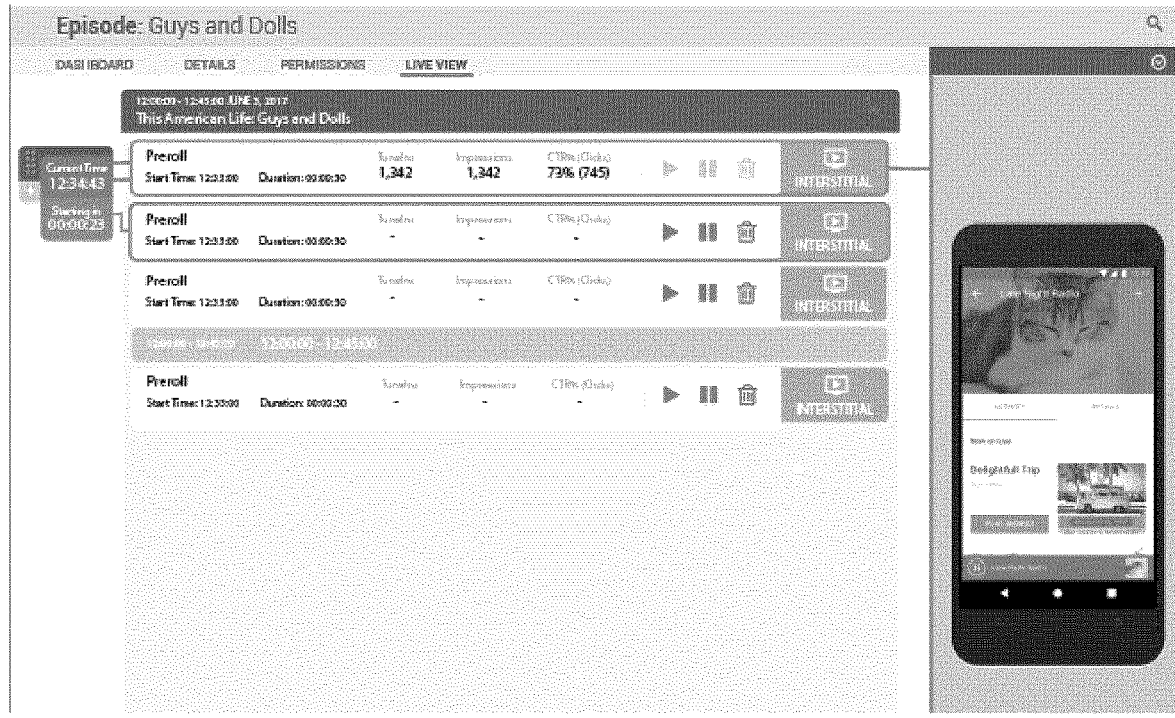
Figure 16E:
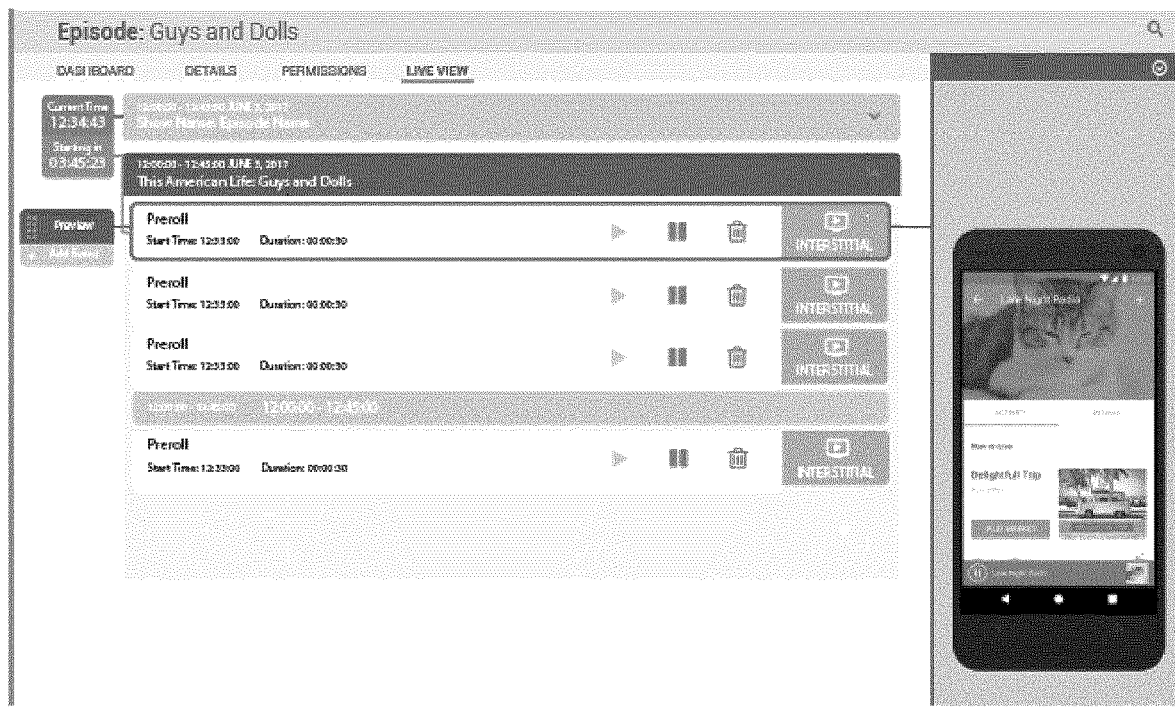

Referring to FIG. 14C, illustrated therein is a method 50 for providing Secondary Syndicated Content in the form of a Calendar Event. The method 50 may be performed by system 100 in FIG. 3A or system 400 in FIG. 4A. The elements from FIG. 4a are identified in parenthesis for reference.

At 52, a client device (404) that is subscribed to a content channel (422) receives a Calendar Event within the activity feed/timeline based on a temporal cue or manual trigger of the Calendar Event.

At 54, the user selects the Calendar Event and a calendar entry (including title, date, time, subject, notification, location, etc.) is pre-populated within the calendar function of the client device (404). The user can then select to save the pre-populated calendar entry within the calendar function of the client device (404).

At 56, once the user selects the Calendar Event and interacts with Calendar Event elements, the client device (404) is subscribed to an analytics channel (424).

At 58, user and client device (404) analytics related to the user's interaction with the Calendar Event are passed from the client device (404) to a server (408) through the analytics channel (424) and stored in a database (416) and presented in near real-time to a Dashboard web application (427). The analytics relating to the Calendar Event stored in the analytics database (416) may be viewed by an administrator and/or Primary Source Content owner in real-time on a dashboard web application (427) through an admin portal (425) to access the analytics database (416).

Figure 15B:
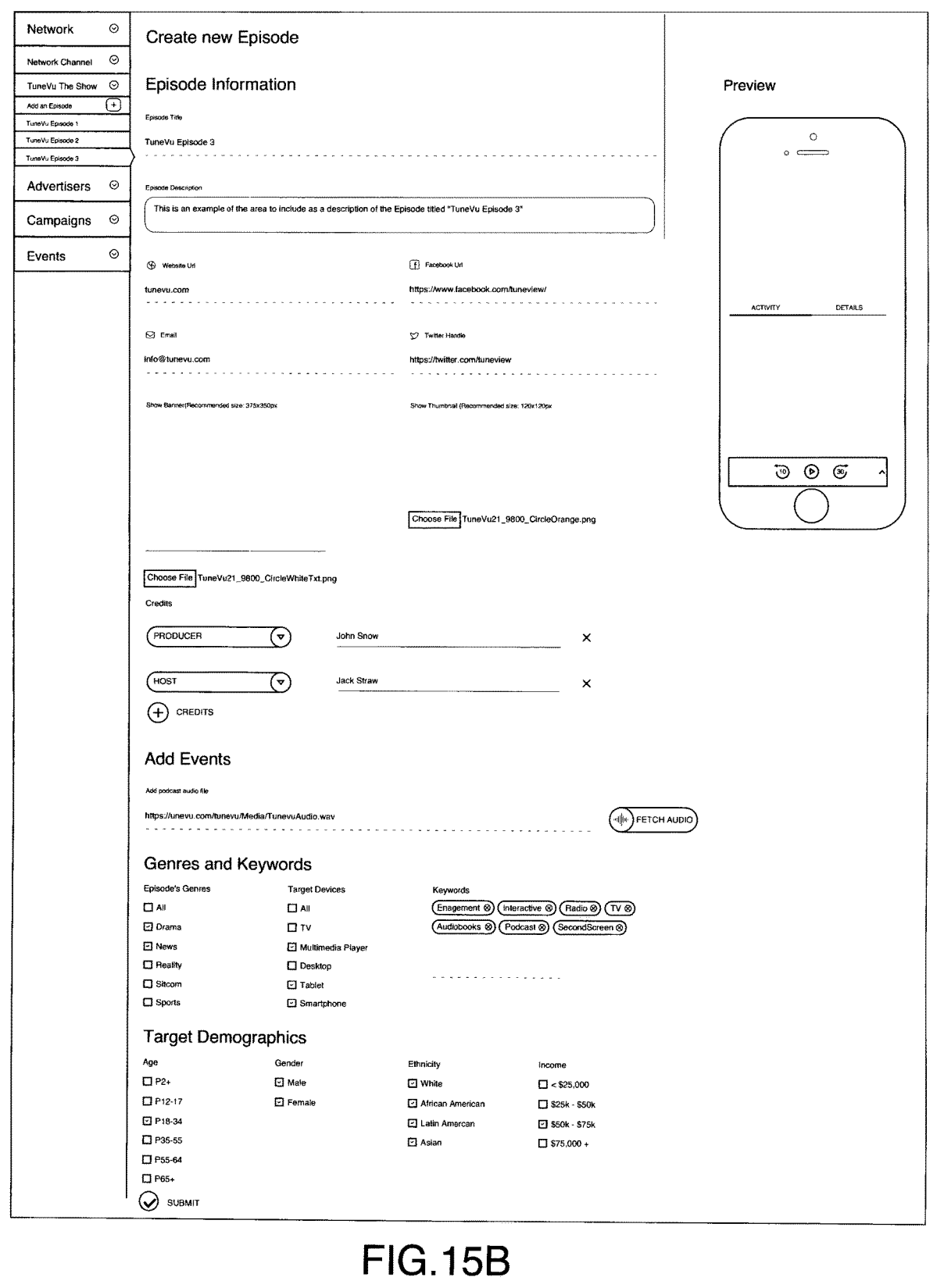
Figure 15D:
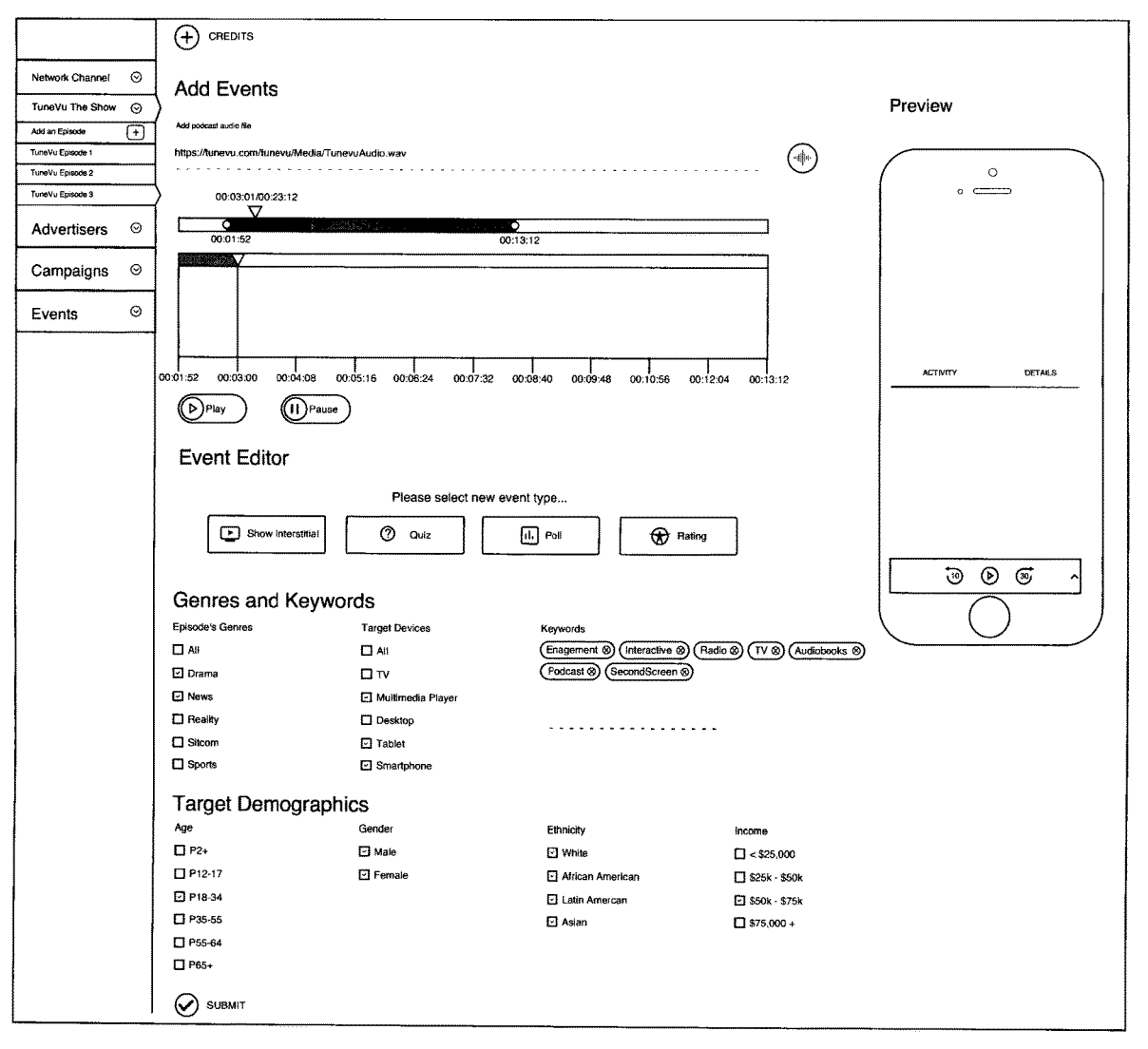
Figure 15E:
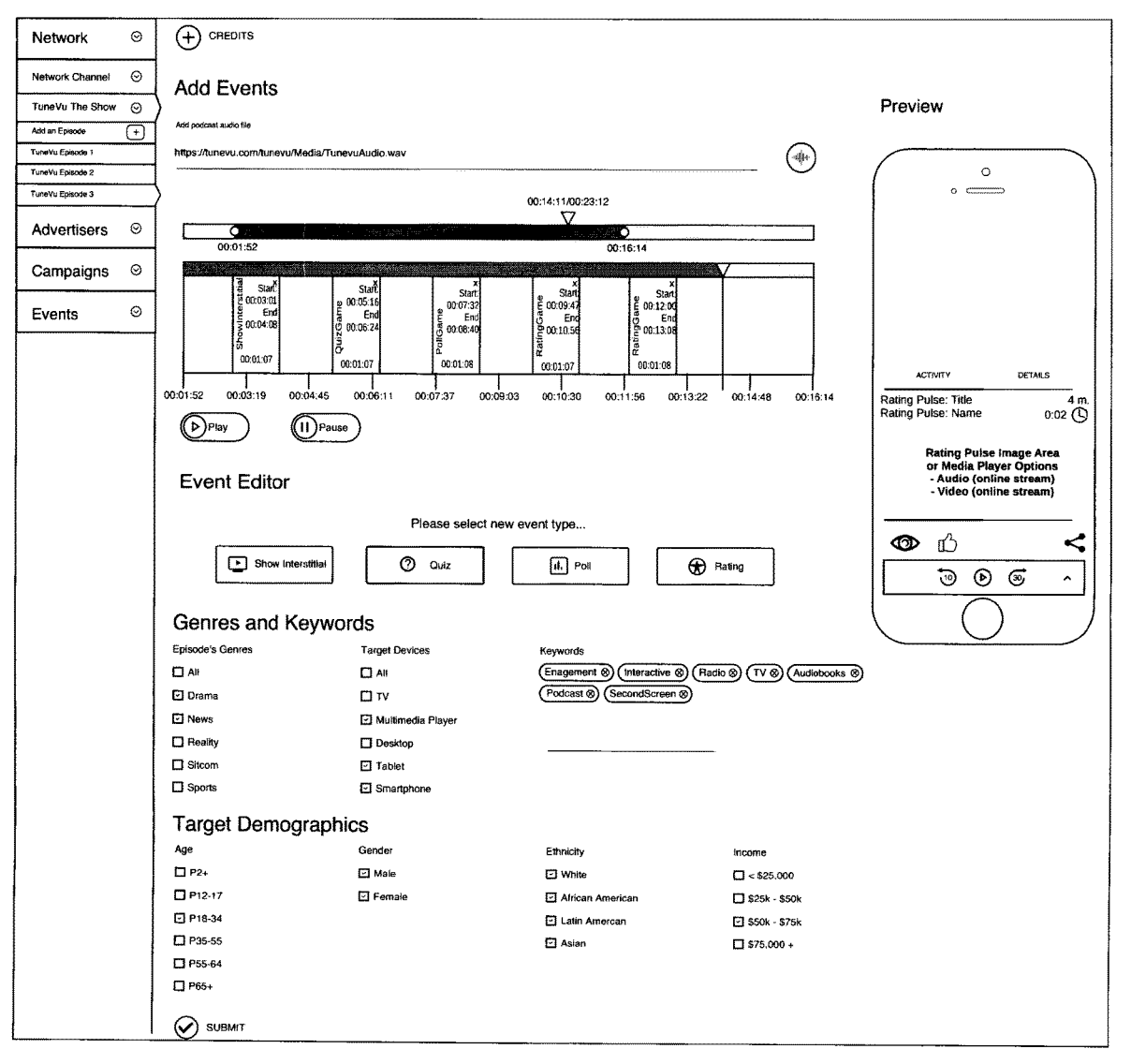
Figure 15F:
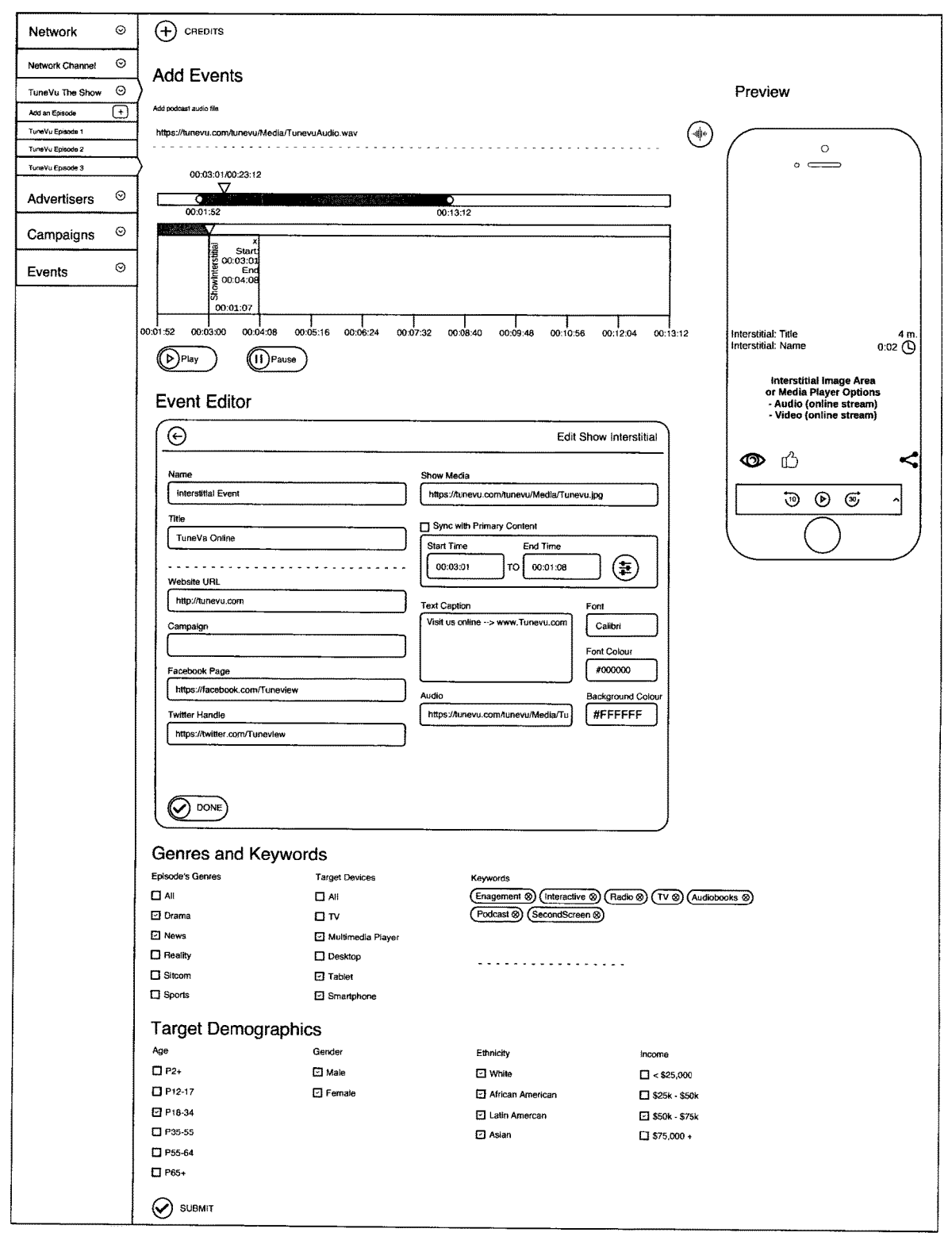
Figure 15G:
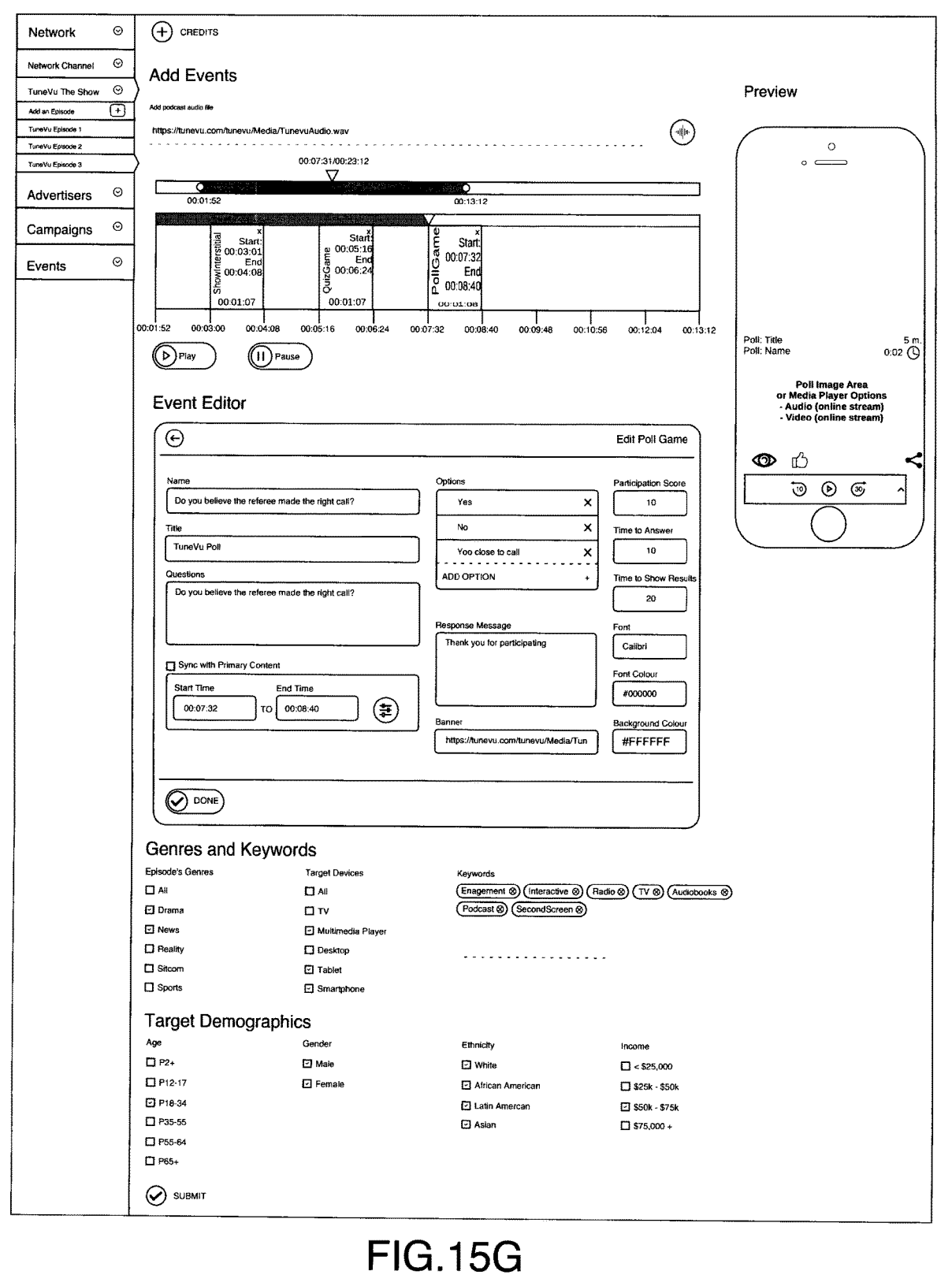
Figure 15H:
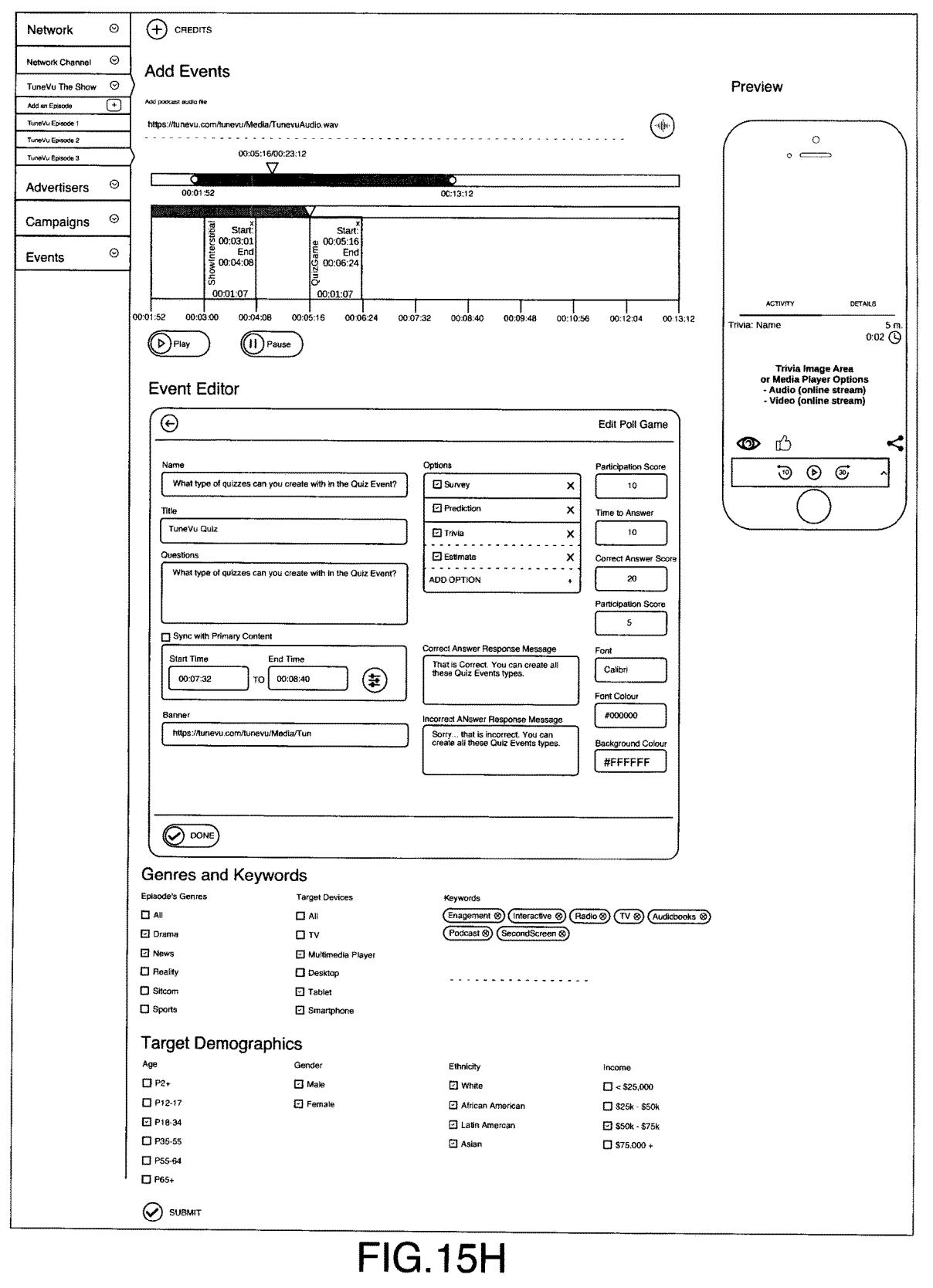
Figure 15J:
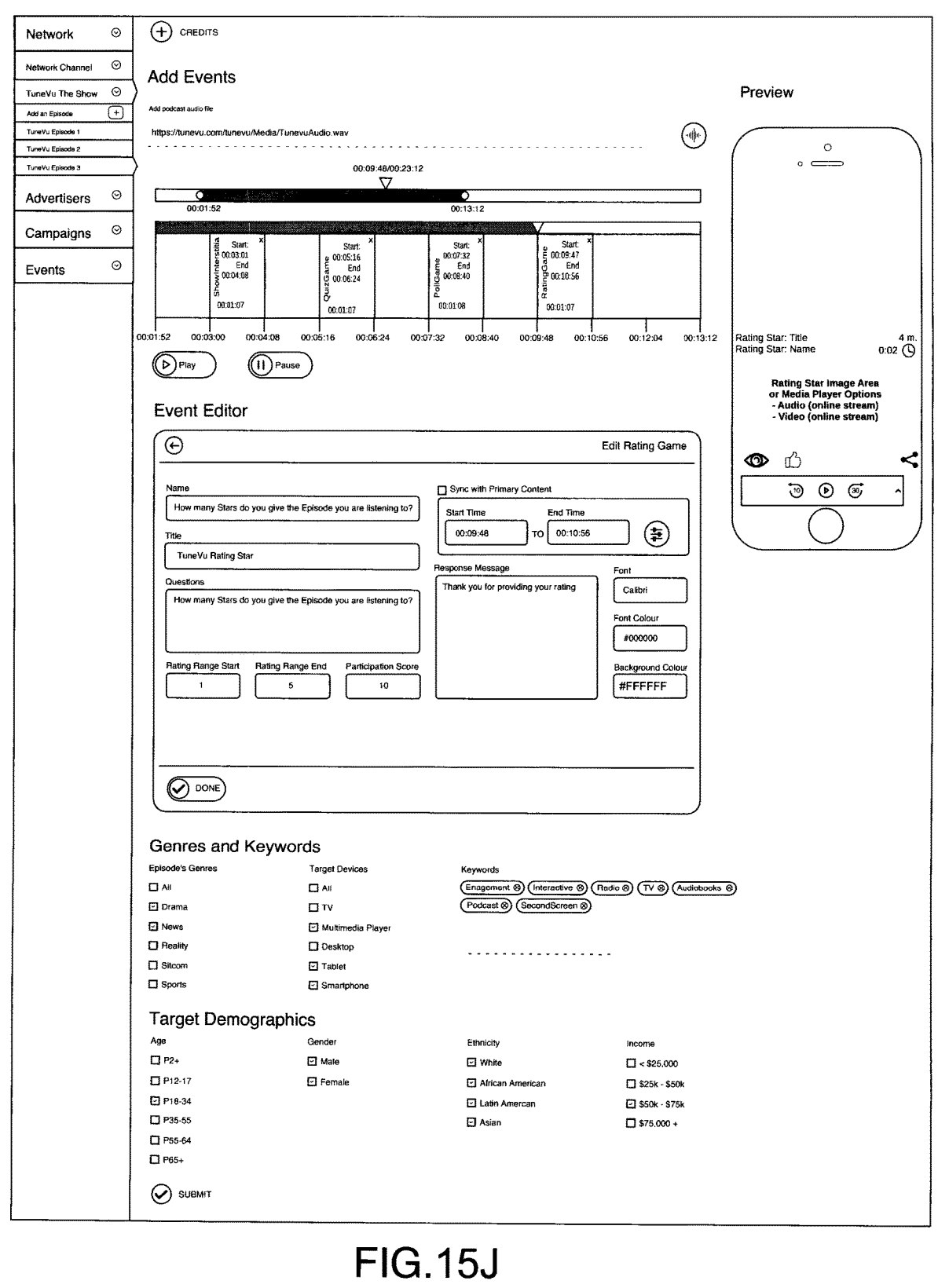

FIGS. 15A to 15M describes systems for configuring and managing secondary syndicated content associated to Primary Source Content. For example, the process includes:

Select a "Show Title" from a table and select "Create New Episode" within the Admin Portal and populate "Episode Title" and "Episode Description" fields.

Call to Action' items defined within the "Show Title" that the newly created 'Episode' is associated with such as website, social media links, email, etc., will auto populate within Episode fields. There is the option of changing or removing those fields for the 'Episode', and as with the 'Show', these elements will be populated within the Details' tab that will presented on the mobile app along with the "Episode Title" and "Episode Description" that were defined in the first step.

The "Show Banner" is prepopulated form the associated 'Show' of the 'Episode'.

Meta data that was included as part of the associated 'Show' is inherited to the 'Episode' but can be changed or added upon as desired.

For Podcasts, online/on-demand video casts, online/on-demand radio streams, and audiobooks. The "Add Events" section is used to specify a URL, URI, directory or database references, or RSS feed (Primary Source Content) that will be used as the unique 'Content Identifier' (CONTENT ID) and allow for Automatic Content Recognition (ACR) of the 'Primary Source Content' when the media is played can be played externally or on the device locally. The media is then fetched and played online within the Admin Portal using the URL or RSS feed to create associated ancillary/secondary events at specific intervals related to the media (Primary Source Content); and The device can save the 'Episode' and its configuration by clicking on 'Submit'.

For example, the process includes:

Within an 'Episode'. the media can be fetched for Podcasts, online/on-demand video casts, online/on-demand radio streams, and audiobooks, and be played online within the Admin Portal using the URL, URI, directory or database reference or RSS feed.

Linear editing is used to select points within the media that has been fetched to be used as temporal time triggers in creating associated ancillary/secondary events at specific intervals related to the media (Primary Source Content) such as interstitials, quizzes, polls, predictions, games, ecommerce, and social media events for the purposes of interactivity and engagement.

The device can insert events of different types at the location where the scrub bar is positioned within the media file that has been fetched. The newly created events will then be associate that timecode or datetime stamp.

Fields/properties for each type of event is then populated by the Admin. The timecode/datetime stamp can be altered by selecting and changing the settings within the event properties, copy & paste, or be dragged within the linear media timeline to alter timecode/datetime stamp settings.

The mobile app on the client device will generate and display secondary syndicated content/events presented within the 'Activity Feed/Timeline' as a function of the synchronization cue/trigger from the media player that associates the CONTENT ID and timecode/datetime stamps being played within the client device, such that the secondary syndicated content/event is synchronized to a current temporal segment of the 'Primary Source Content' for each event configured within the Admin Portal.

The scheduled events are rendered within the mobile app preview (upper right hand) in sequence as the media is being played within the portal to simulate the experience on the mobile app, or when an event item is selected manually.

The device can save the 'Episode' and configured 'Events' by clicking on 'Submit'.

For example, the process includes:

Select Create "New Show" within the Admin Portal populate "Show Title" and "Show Description" fields.

Define 'Call to Action' items such as website, social media links, email, etc. These elements will be populated within the details tab that will presented on the mobile app along with the "Show Title" and "Show Description" that were defined in the first step.

The "Show Banner" property supports the branding elements of the show. This can be an image, video media, or audio media that populates the top portion within the Mobile App view above the 'Activity Feed' and Details' tabs. A preview is presented to show the actual rendering of the "Show Banner" within a Mobile App in the upper right-side portion of the Admin Portal. The "Show Thumbnail" property will be used in different views of tables, lists, or searches within the application that allow for selection of the show.

Meta data can be included to be associated with the 'Show' that includes, but is not limited to: Credits, Genres and Keywords, Target Demographics, etc.

The device can save the 'Show' and its configuration by clicking on 'Submit'.

Referring now to FIG. 16A-16E, there is provided a process performed on the devices and systems described herein. For example, the process includes:

Select Create "New Channel" within the Admin Portal and populate the "Channel Title" and "Channel Description" fields for a live or pre-scheduled media feed (broadcast, online stream, live event, etc.).

Define 'Call To Action' items such as website, social media links, email, etc. These elements will be populated within the details tab that will presented on the mobile app/media player along with the "Channel Title" and "Channel Description" that were defined in the first step.

The "Channel Banner" property supports the branding elements of the live/pre-scheduled feed channel. This can be an image, video media, or audio media that populates the top portion within the mobile app/media player view above the 'Activity Feed' and Details' tabs. A preview is presented to show the actual rendering of the "Channel Banner" within a Mobile App in the upper right-side portion of the Admin Portal. The "Channel Thumbnail" property will be used in different views of tables, lists, or searches within the application that allow for selection of the Channel.

Meta data can be created that will be associated with the 'Channel' that includes, but is not limited to: Credits, Genres and Keywords, Target Demographics, etc.

A live/pre-scheduled feed reference (Primary Source Content) is configured and used as the unique 'Content Identifier' (CONTENT-ID) and allows for Automatic Content Recognition (ACR) of the 'Primary Source Content' when the media is played. The 'Content Identifier' may be specific to ACR mechanisms and in instances where the feed is a network accessible live media feed, the live feed can be used as the 'Content Identifier'. The live media feed can also be fetched and played online within a mobile application or media player using the feed or 'CONTENT-ID' reference such as a URL, URI, Playlist, or RSS feed to present associated secondary syndication events at specific date-time triggers related to the live/pre-scheduled media feed (Primary Source Content).

The user saves the 'Channel' and the configuration by clicking on 'Submit'.

For example, the process includes:

Select a "Channel Title" from a table and select "Create New Day" within the Admin Portal and populate "Date" to designate the 24 hour day to pre-schedule events.

'Call To Action' items defined within the "Channel Title" that the newly created 'Day' is associated with such as website, social media links, email, etc., will auto populate within 'Live View' fields for the 'Live View' editor. The user has the option of changing or removing those fields for the 'Day' within the 'Live View' editor. These elements will be populated within the Details' tab that will presented on the mobile app along with the "Channel Title" and "Channel Description" that were previously defined.

The "Channel Banner" is prepopulated from the associated 'Channel' of the 'Day' that is being viewed or edited within the 'Live View' editor.

Meta data that was included as part of the associated 'Channel' is inherited to the 'Day' but can be changed or added upon as desired.

Existing 'Shows' & 'Episodes' can be imported into the 'Day' of the 'Channel' within the 'Live View' and the associated 'Show' & 'Episode' meta data is inherited to the 'Day' but can be changed or added upon as desired.

'Episodes' and their corresponding events that have been scheduled within the 'Day' can be changed through the 'Live View' editor. The mobile app will change branding according to episode settings that are scheduled within the 'Day' schedule.

The "Add Events" section is used to create secondary syndicated events at specific scheduled date-time stamps related to the associated live/pre-scheduled media feed (Primary Source Content).

The user can save the 'Day' for the Channel and its configuration by clicking on 'Submit'.

While the above description provides examples of one or more apparatus, methods, or systems, it will be appreciated that other apparatus, methods, or systems may be within the scope of the claims as interpreted by one of skill in the art.

The invention claimed is:

1. A method for providing secondary syndicated content on a client device, wherein the secondary syndicated content is associated to Primary Source Content, the method comprising:
   discovering the primary source content on the client device;
   recognizing a content identifier intrinsic to the primary source content during playout of the primary source content;
   automatically subscribing to a communication channel associated with the content identifier, upon recognizing the content identifier;
   recognizing at least one temporal cue within the primary source content, wherein the at least one temporal cue corresponds to a temporal segment of the primary source content; and
   providing secondary syndicated content to the client device over the communication channel as a function of the temporal cue, such that the secondary syndicated content is synchronized to the temporal segment of the primary source content.

2. The method of claim 1, wherein the primary source content comprises one or more of: broadcast media, digital online on-demand media, digital signage, a podcast, music, an audiobook, downloaded offline digital media or online streaming media.

3. The method of claim 1, wherein the secondary syndicated content comprises any one or more of: prediction forms, polls, statistics, ratings, reviews, news, trivia, social media data, biographies, scheduled events, video clips, audio tracks, product placement, advertisements and interactive ads.

4. The method of claim 1, wherein the primary source content is rendered on the client device.

5. The method of claim 1, wherein the primary source content is rendered by an external device and is discoverable by the client device.

6. The method of claim 1, wherein the Primary Source Content is discovered by an automatic content recognition (ACR) technique.

7. The method of claim 1, wherein the content identifier is one of: a universal resource locator (URL), a uniform resource identifier (URI), an RSS feed, a database reference, a directory reference, an audio watermark or an audio fingerprint.

8. The method of claim 1, wherein the temporal cue is one or more of: a timecode, a date-time stamp or a time-offset.

9. The method of claim 1, wherein the communication channel is maintained on a communication network through a WebSocket connection.

10. The method of claim 1, wherein the communication channel implements a publish-subscribe messaging pattern.

11. The method of claim 1, wherein the secondary syndicated content is provided via the communication channel.

12. The method of claim 1, wherein the secondary syndicated content is provided in near real-time to the client device upon recognition of the temporal cue.

13. The method of claim 1, further comprising subscribing to an ancillary response channel.

14. The method of claim 13, further comprising identifying the client device and monitoring real-time user responses and engagement with the secondary syndicated content.

15. The method of claim 1, further comprising subscribing to an ancillary analytics channel.

16. The method of claim 15, further comprising identifying the client device and monitoring real-time user and device analytics.

17. A method for providing secondary syndicated content associated to primary content on a client device, the method comprising:
- receiving pre-scheduled interactive content comprising secondary syndicated content associated to primary source content;
- storing the interactive content in a database;
- receiving from a client device, a request to subscribe to a communication channel during playout of the primary source content on the client device, the request specifying a content identifier intrinsic to the primary source content and a temporal cue within the Primary Source Content;
- matching the request to Secondary Syndicated Content associated with the content identifier;
- automatically subscribing the client device to the communication channel associated with the content identifier, upon recognizing the content identifier;
- retrieving the secondary syndicated content from the database; and
- transmitting the Secondary Syndicated Content to the client device over the communication channel as a function of the temporal cue, such that the Secondary Syndicated Content is synchronized to a current temporal segment of the Primary Source Content being delivered on the client device, wherein the primary source content and the secondary syndicated content are simultaneously viewable on the client device.

18. A device for providing secondary syndicated content associated to Primary Source Content, the device comprising:
- a display for presenting content;
- a memory for storing processor-executable instructions; and
- a processor operatively coupled to the memory, wherein upon execution of the processor-executable instructions, the processor configures the device for:
  - discovering primary source content rendered by an external device or from within the device itself;
  - recognizing a content identifier intrinsic to the primary source content and a temporal cue within the primary source content during playout of the primary source content;
  - automatically subscribing to a communication channel associated with the content identifier, upon recognizing the content identifier;
  - receiving secondary syndicated content over the communication channel; and
  - displaying the secondary syndicated content on the display as a function of the temporal cue, such that the secondary syndicated content is synchronized to a current temporal segment of the primary source content corresponding to the temporal cue.

19. The device of claim 18, wherein the communication channel is maintained on the communication network through a WebSocket associated with the content identifier of the Primary Source Content.

20. The device of claim 19, wherein the communication channel implements a publish-subscribe messaging pattern.

* * * * *